(12) United States Patent  (10) Patent No.: US 8,590,115 B2
Lumsden  (45) Date of Patent: Nov. 26, 2013

(54) SECURING DEVICE

(75) Inventor: Bronwyn Lumsden, Murrays Run (AU)

(73) Assignee: Pink Chilli Pty Ltd, Dungog, NSW (AU)

( * ) Notice: Subject to any disclaimer, the term of this patent is extended or adjusted under 35 U.S.C. 154(b) by 657 days.

(21) Appl. No.: 12/672,484

(22) PCT Filed: Aug. 6, 2008

(86) PCT No.: PCT/AU2008/001138
§ 371 (c)(1),
(2), (4) Date: Apr. 5, 2010

(87) PCT Pub. No.: WO2009/018614
PCT Pub. Date: Feb. 12, 2009

(65) Prior Publication Data
US 2010/0205785 A1  Aug. 19, 2010

(51) Int. Cl.
F16G 11/00 (2006.01)
(52) U.S. Cl.
USPC .................................. 24/132 WL; 24/132 R
(58) Field of Classification Search
USPC ............. 24/115 H, 122.6, 129 R, 130, 132 R, 24/132 WL; 174/88 R; 439/400, 404
See application file for complete search history.

(56) References Cited

U.S. PATENT DOCUMENTS

| | | | |
|---|---|---|---|
| 1,392,816 A * | 10/1921 | Crocker | 24/517 |
| 1,708,470 A * | 4/1929 | Eckert et al. | 403/391 |
| 1,825,074 A * | 9/1931 | Knapp | 403/390 |
| 2,607,094 A * | 8/1952 | Nicosia | 403/274 |
| 3,354,517 A * | 11/1967 | Levinsky | 403/275 |
| 3,835,505 A | 9/1974 | Shewbridge | |
| 5,138,852 A * | 8/1992 | Corcoran | 70/16 |
| 5,245,730 A | 9/1993 | Martin | |
| 5,263,671 A | 11/1993 | Baum | |
| 5,669,590 A * | 9/1997 | Przewodek | 248/68.1 |
| 5,671,508 A * | 9/1997 | Murai | 24/115 K |
| 6,827,600 B2 * | 12/2004 | Negishi et al. | 439/404 |
| 6,863,558 B2 * | 3/2005 | Negishi et al. | 439/404 |
| 6,899,304 B2 * | 5/2005 | Bellmore et al. | 248/65 |
| 6,925,951 B1 | 8/2005 | DeLong | |
| 6,942,532 B2 * | 9/2005 | Snyder | 441/75 |
| 7,013,535 B2 * | 3/2006 | Tracy | 24/265 R |

OTHER PUBLICATIONS

PCT/AU2008/001138, International Search Report, 4 pages, Feb. 12, 2009.
PCT/AU2008/001138, First Written Opinion, 4 pages, Sep. 18, 2008.
PCT/AU2008/001138, Response to Written Opinion, 16 pages, Jun. 4, 2009.
PCT/AU2008/001183, Response to Second Written Opinion, 13 pages, Sep. 8, 2009.
PCT/AU2008/001183, Third Written Opinion, 7 pages, Oct. 12, 2009.
PCT/AU2008/001183, International Preliminary Report on Patentability, 7 pages, Dec. 1, 2009.

* cited by examiner

*Primary Examiner* — Robert J Sandy
*Assistant Examiner* — Louis Mercado
(74) *Attorney, Agent, or Firm* — Kilpatrick Townsend & Stockton LLP

(57) ABSTRACT

A securing device including a body being coupled to a first portion of a restraint. The body includes a receiving portion which is able to receive therethrough a second portion of the restraint. In one form, the restraint may be a dog leash or similar.

21 Claims, 49 Drawing Sheets

SECURING DEVICE

CROSS REFERENCE TO RELATED APPLICATIONS

This application is a continuation-in-part application of the national phase entry of PCT/AU2008/001138 which is hereby incorporated by reference.

TECHNICAL FIELD

The present invention generally relates to a securing device which can secure a restraint. In one particular, but non-limiting form, the present invention relates to a securing device which secures an elongate flexible restraint such as a pet lead.

BACKGROUND ART

When a pet is to be secured, via tethering a restraint, such as a lead or leash, to a stationary object such as a street post, a number of problems can be experienced during the tethering process.

One form of tethering includes a person wrapping a portion of the restraint around the stationary object and tying off a loose end of the restraint using a knot to form a closed loop which encircles the stationary object. However, if an unsecure knot is applied by the person, the knot may loosen, thus freeing the pet from the stationary object. Furthermore, there may be difficulties for the person to untie a secure knot, which may also weaken the strength of the restraint.

Additionally, unless careful tethering is applied, the wrapped restraint around the stationary object may fall to the ground, causing the restraint to possibly become wet or dirty. If careful tethering is applied such that the wrapped restraint portion is tightly bound around the circumference of the stationary object, two hands are generally required during the process of tying the knot which can be unsatisfactory when generally one of the user's hands is required to grasp a portion of the restraint close to the pet in order to control the pet's movement.

Although restraints are known which include a loop at a free end thereof, these restraints also have disadvantages. Unless the loop is able to fit over the circumference of a stationary object, the fixed end of the restraint may need to be uncoupled from the pet, wherein the uncoupled end of the restraint is wrapped around the stationary object and fed through the loop, thereby forming a closed loop encircling the stationary object. The uncoupled end of the restraint can then be re-coupled with the pet. However, this process has serious disadvantages as the pet is unrestrained whilst the restraint is uncoupled from the pet. Furthermore, unless the encircling portion of the restraint is tightly bound around the circumference of the stationary object, the loop may fall to the ground, as described above.

In circumstances where the loop at a free end of a restraint can easily fit over the circumference of a stationary object, the loop is generally non-adjustable or unable to be adjusted to form a fixed tight loop which encircles the circumference of the stationary, thereby leading to the restraint falling to the ground.

The above problems also apply to other applications where securing an object via a restraint has analogous problems.

Therefore, there exists a need for a securing device which overcomes or at least ameliorates one or more of the above-mentioned disadvantages.

The term "restraint" as used herein, refers to a flexible elongate restraint such as rope, leather, chain, such as steel linked chain, weaved fibre or the like which can be used to secure an object.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In one broad aspect there is provided a securing device including a body being coupled to a first portion of a restraint, the body including a receiving portion which is able to receive therethrough a second portion of a restraint.

In some forms, the receiving portion is a securing assembly moveable from an unsecured position to a secured position, wherein the securing assembly in the secured position enables the second portion of the restraint to be releasably secured by the securing assembly.

In some forms, the securing device and the restraint form a closed loop which can be secured to, or can secure, an object.

In some forms, the securing assembly is configured to clamp the second portion of the restraint.

In some embodiments, the body includes a first clamping member and a second clamping member which form the securing assembly configured to clamp the second portion of the restraint.

In other embodiments, the first clamping member and the second clamping member hingedly move relative to each other.

Optionally, the securing device includes a first actuator operatively connected to an engagement arrangement configured to substantially restrict the securing assembly moving from the secured position to the unsecured position, wherein actuation of the first actuator disables the engagement arrangement to allow the securing assembly to move from the secured position to the unsecured position.

In one form, the first actuator is a slidable actuator which when actuated disengages the engagement arrangement, to thereby allow the securing device to move from the secured position to the unsecured position.

Optionally, the engagement arrangement includes at least one slot located in the first clamping member and a complementary one or more protrusions extending from the second clamping member which are engagable together to retain the first clamping member and the second clamping member in the secured position.

In some forms, the first clamping member and second clamping member form a jaw for the securing assembly.

In some forms, the jaw can include opposing clamping surfaces wherein at least one of the clamping surfaces is ridged.

In some embodiments, the ridged surface may be provided in the form of a plurality of ribs extending from at least one of the first clamping member and the second clamping member.

In optional forms, troughs formed by adjacent ribs of the first clamping member are located in alignment with ribs extending from the second clamping member.

Optionally, a longitudinal axis of each rib is located orthogonally to a longitudinal axis of the securing device.

In some forms, each rib includes a plurality of teeth.

In some embodiments, the body couples the first portion of the restraint via a second securing assembly.

Optionally, the second securing assembly is movable between a secured position, wherein the first portion of the restraint is secured by the second securing assembly, and an unsecured position.

In some forms, wherein the second securing assembly includes a first element and a second element which are moveable relative to each other in order for the second securing assembly to move between the secured and unsecured position.

In some embodiments, the second securing assembly includes an engagement arrangement to retain the first element and the second element in the secured position, wherein the engagement arrangement includes a disengagement actuator which is actuable to allow the second securing assembly to move to the unsecured position.

Optionally, the disengagement actuator includes a button located at one or more ends along a longitudinal axis of the securing device which upon actuation, disengages the first element from the second element.

In one form, each button is operative via an applied force directed inwardly and along the longitudinal axis of the securing device.

In another form, each disengagement actuator includes a lug extending from the first element and a lug receiving recesses provided in a wall of the second element, wherein each lug is received by the respective lug receiving recess to form the first clamping member, and upon actuation of each disengagement actuator, the lug disengages from the respective lug receiving recess to thereby allow the first and second elements to move relative to each other.

In an optional embodiment, the first element rotatably moves relative to the second element.

In some embodiments, the first element pivotally moves relative to the second element.

Optionally, the second securing assembly includes a hinge which allows the first and second element of the second securing assembly to hingedly move relative to each other.

In some forms, at least one of the first element and the second portion include one or more pins to engage the first portion of the restraint in the secured position.

In another form, the body includes a substantially elliptical cross-sectional profile.

In some embodiments, the engagement arrangement is a locking arrangement including at least one ratchet channel and corresponding paw to restrict movement of the first and second clamping members from the secured to unsecured position.

In some forms, the at least one ratchet channel and paw are configured to allow incremental movement of the securing assembly from the unsecured position to the secured position.

In another optional form, the paw is integral with to the first actuator.

In more particular forms, each leg of the first clamping member includes the ratchet channel.

In one particular embodiment, the locking arrangement includes a pair of first actuators, wherein the locking arrangement is configured to disengage when both first actuators are actuated.

In an optional embodiment, the locking arrangement is biased, by a biasing element, from an disengaged position, wherein the first and second clamping members are able to freely move relative to each other, to an engaged position, wherein the first and second clamping member are unable to freely move away relative to each other.

In some forms the engagement arrangement includes a slot located in the first element and a complementary protrusion extending from the second element which is engagable with the slot, and wherein the actuator of the engagement arrangement is a push or pull tab.

In an optional form, the biasing element is a spring.

In another form, the biasing element is a leaf spring.

In another form, the biasing element includes a pair of opposed leaf springs.

In another form, the biasing element includes an integral dual pair of opposed leaf springs.

In an optional form, the biasing element is secured to the body via a coupling element.

In another particular form, the biasing element is secured to the body via a coupling element. In an optional aspect, the coupling element is a screw which couples a portion of the biasing element to the first clamping member.

In particular forms, the first clamping member includes at least one leg, and the second clamping member includes at least one aperture to receive the at least one leg, wherein the at least one leg is able to be at slidably received therein and thereout during movement of the first clamping member relative to the second clamping member.

In another optional form, at least some of the plurality of ribs are separable, wherein a first rib portion is connected to the first element and a second rib portion is connected to the second element, wherein when the first element and second element move away relative to each other, the first and second rib portions of each separable rib separate.

In another broad aspect there is provided a securing device having an elongate body, including a first securing assembly connected to a second securing assembly for releasably securing first and second restraint portions, the first securing assembly includes a first clamping member hingedly connected to a second clamping member and hingedly movable between an unsecure position to a secure position to releasably secure the second restraint portion, the first securing assembly includes ribs extending orthogonal to the elongate body which clamp against the second restraint portion in the secure position, the second securing assembly includes a first element hingedly connected to a second element movable between an unsecure and secure position to releasably secure the first restraint portion, the first clamping member being connected to the first element, wherein a finger receiving aperture is formed when the first and second elements of the second securing assembly move to the secure position, the finger receiving aperture being formed as a result of at least partial alignment of corresponding apertures in the first clamping member and the second element, wherein a locking finger extending from the second clamping member is receivable through the finger receiving aperture to engage and lock the first clamping member to the second clamping member when the first securing assembly is moved to the secure position.

In one form, the first restraint portion and the second restraint portion are portions of a restraint, wherein the securing device and the restraint form a closed loop which can be secured to, or can secure, an object.

In another form, the securing device includes a first actuator, wherein actuation of the first actuator disengages the locking finger from the finger receiving aperture to allow the first securing assembly to move from the secured position to the unsecured position.

In one embodiment, the first actuator is operatively connected to an engagement member including one or more of the apertures forming the finger receiving aperture, wherein actuation of the first actuator allows the locking finger to be freely removed from the finger receiving aperture.

In another embodiment, a width of the finger receiving aperture is adjusted upon actuation of the first actuator to thereby allow the locking finger to be freely removed from the finger receiving aperture.

In an optional form, the first clamping member and second clamping member form a jaw.

In another optional form, the jaw can include opposing clamping surfaces wherein at least one of the clamping surfaces is ridged.

In an optional embodiment, the second securing assembly includes an engagement arrangement to retain the first element and the second element in the secured position, wherein the engagement arrangement includes a disengagement actuator which is actuable to allow the second securing assembly to move to the unsecured position.

In another optional embodiment, the disengagement actuator includes a button located at one or more ends along the longitudinal axis of the securing device which upon actuation, disengages the first element from the second element.

In one form, each button is operative via an applied force directed inwardly and along the longitudinal axis of the securing device.

In another form, each disengagement actuator includes a lug extending from the first element and a lug receiving aperture provided in a wall of the second element, wherein each lug is received by the respective lug receiving aperture to form the first clamping member, and upon actuation of each disengagement actuator, the lug disengages from the respective lug receiving aperture to thereby allow the first and second elements to move relative to each other.

In another embodiment, least one of the first element and the second element include one or more pins to engage the first portion of the restraint in the secured position.

In an optional form the body includes a substantially elliptical cross-sectional profile.

In another optional form, the plurality of ribs extend from opposing surfaces of the first securing assembly, wherein the plurality of ribs are staggered.

In an optional embodiment, the securing device includes a biasing mechanism to bias the first securing assembly from the unsecured position to the secured position.

In another broad aspect there is provided a securing device having an elongate body, including a first securing assembly connected to a second securing assembly for releasably securing first and second restraint portions, the first securing assembly includes a first clamping member hingedly connected to a second clamping member and hingedly movable between an unsecure position to a secure position to releasably secure the second restraint portion, the first securing assembly includes ribs extending orthogonal to the elongate body which clamp against the second restraint portion in the secure position, the second securing assembly includes a first element hingedly connected to a second element movable between an unsecure and secure position to releasably secure the first restraint portion, the first clamping member being connected to the first element.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
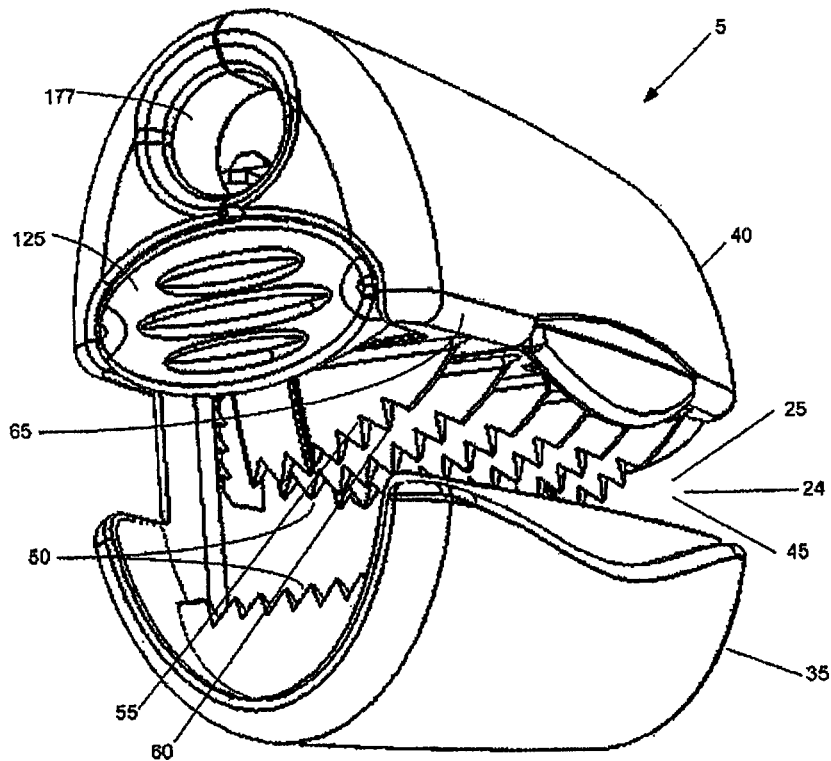
FIG. 1 shows a perspective view of a first example of a securing device.

The following modes, given by way of example only, are described in order to provide a more precise understanding of the subject matter of a preferred embodiment or embodiments.

Referring to FIGS. 1 to 36 there is shown an example of a securing device 5. The securing device 5 includes a body 10 being coupled to a first portion 15 of a restraint 20. The body 10 includes a receiving portion 24 which is able to receive therethrough a second portion 30 of the restraint 20.

Figure 32:
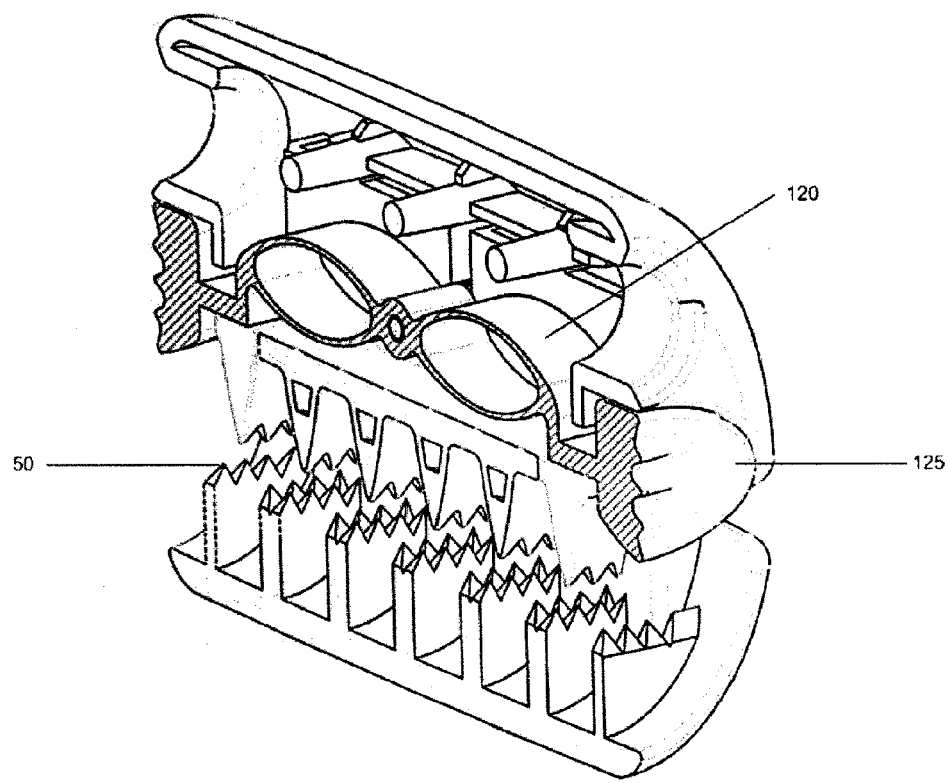
FIG. 32 shows a cross-sectional view of the device of FIG. 1 in an intermediary position.
Figure 33:
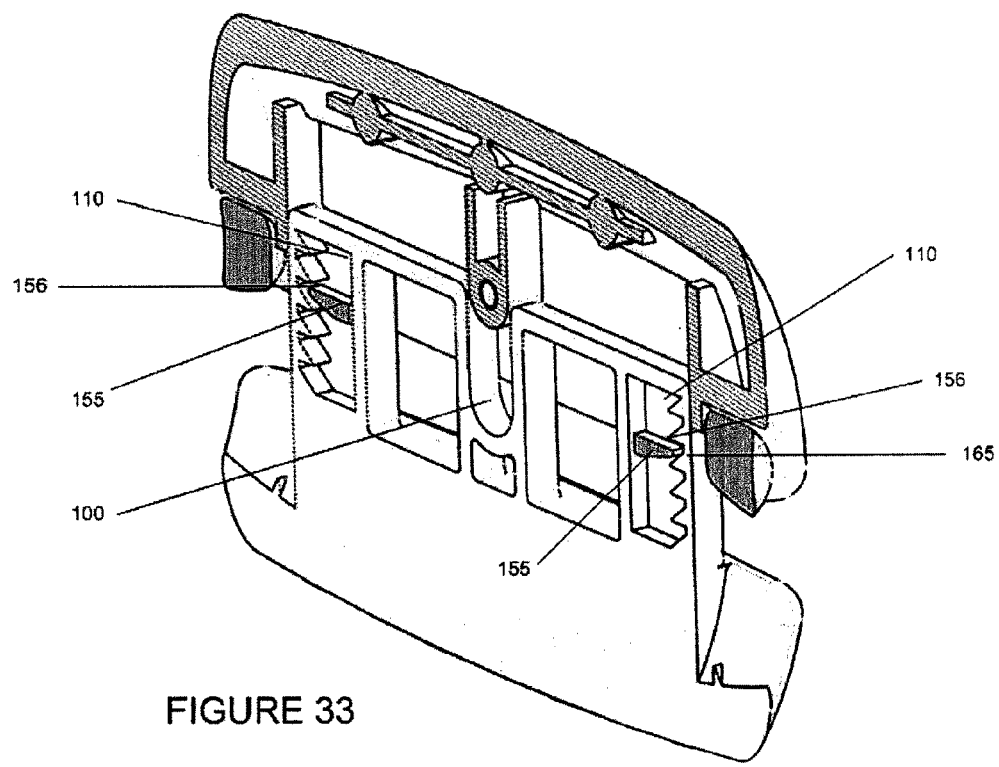
FIG. 33 shows a cross-sectional view of the device of FIG. 1 in an intermediary position.
Figure 34:
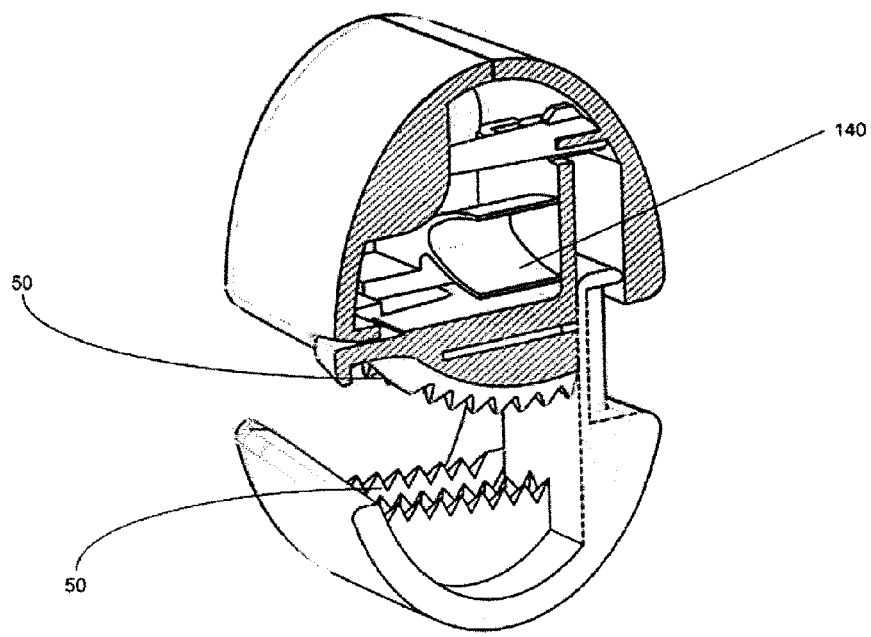
FIG. 34 shows a cross-sectional view of the device of FIG. 1 in the unsecured position.
Figure 35:
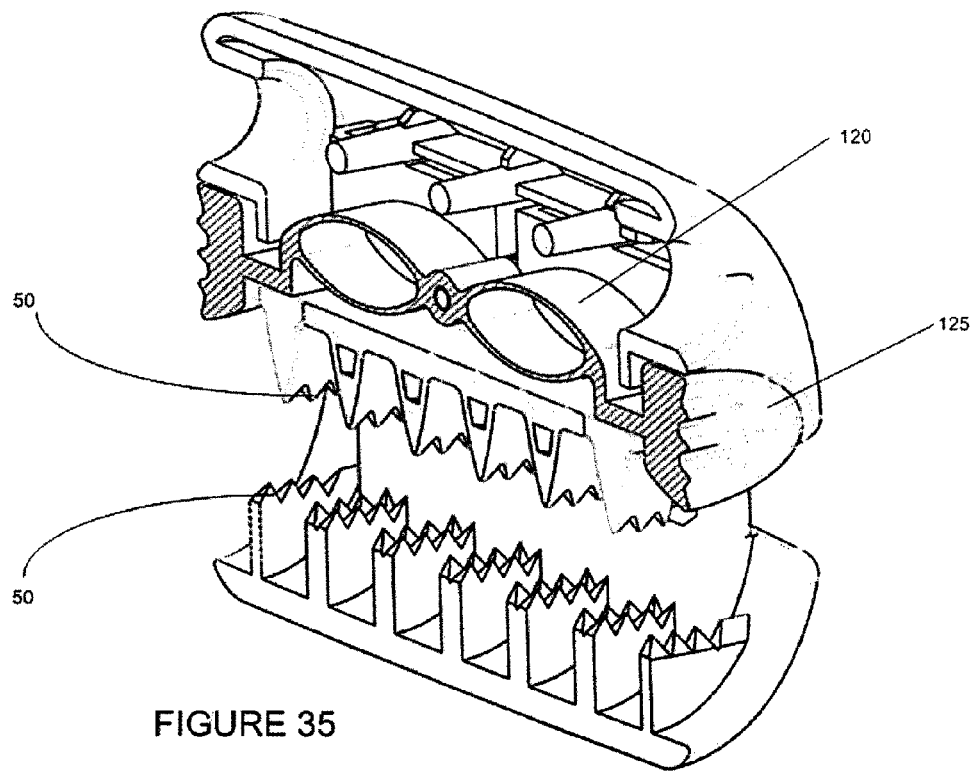
FIG. 35 shows a cross-sectional view of the device of FIG. 1 in the unsecured position.

More specifically, the body 10 includes a first securing assembly 25 moveable from an unsecured position, as shown in use in FIG. 32, to a secured position as shown in use in FIG. 33. The first securing assembly 25, in the secured position, enables a second portion 30 of the restraint 20 to be releasably secured. By securing the second portion 30 of the restraint 20, the restraint 20 is restricted from moving relative to the first securing assembly 25. The securing device 5 and the restraint 20 form a closed loop in the restraint which can be secured to, or can secure, an object.

Referring more particularly to the device 5 exemplified in FIGS. 1 to 11, the first securing assembly 25 can be configured to clamp the second portion 30 of the restraint 20 using a first clamping member 35 and a second clamping member 40, wherein the first and second clamping members 35, 40 form a jaw 45. The first and second clamping members 35, 40 move relative to each other to clamp and secure the second portion 30 of the restraint 20 between each clamping member 35, 40.

As illustrated in FIGS. 1 to 11, the clamping surfaces 50 of the first clamping member 35 and second clamping member 40 both include a ridged clamping surface. However, it will be appreciated that a single ridged clamping surface can alternatively be provided. Each ridged clamping surface 50 is provided in the form of a plurality of ribs 55 which extend from the respective clamping member 35, 40. The ribs 55 are positioned in rows which align orthogonally relative to a longitudinal axis of the securing device 5. Each rib 55 can have a generally arced profile in order to facilitate retention of a wide range of restraint 20 widths.

Figure 9:
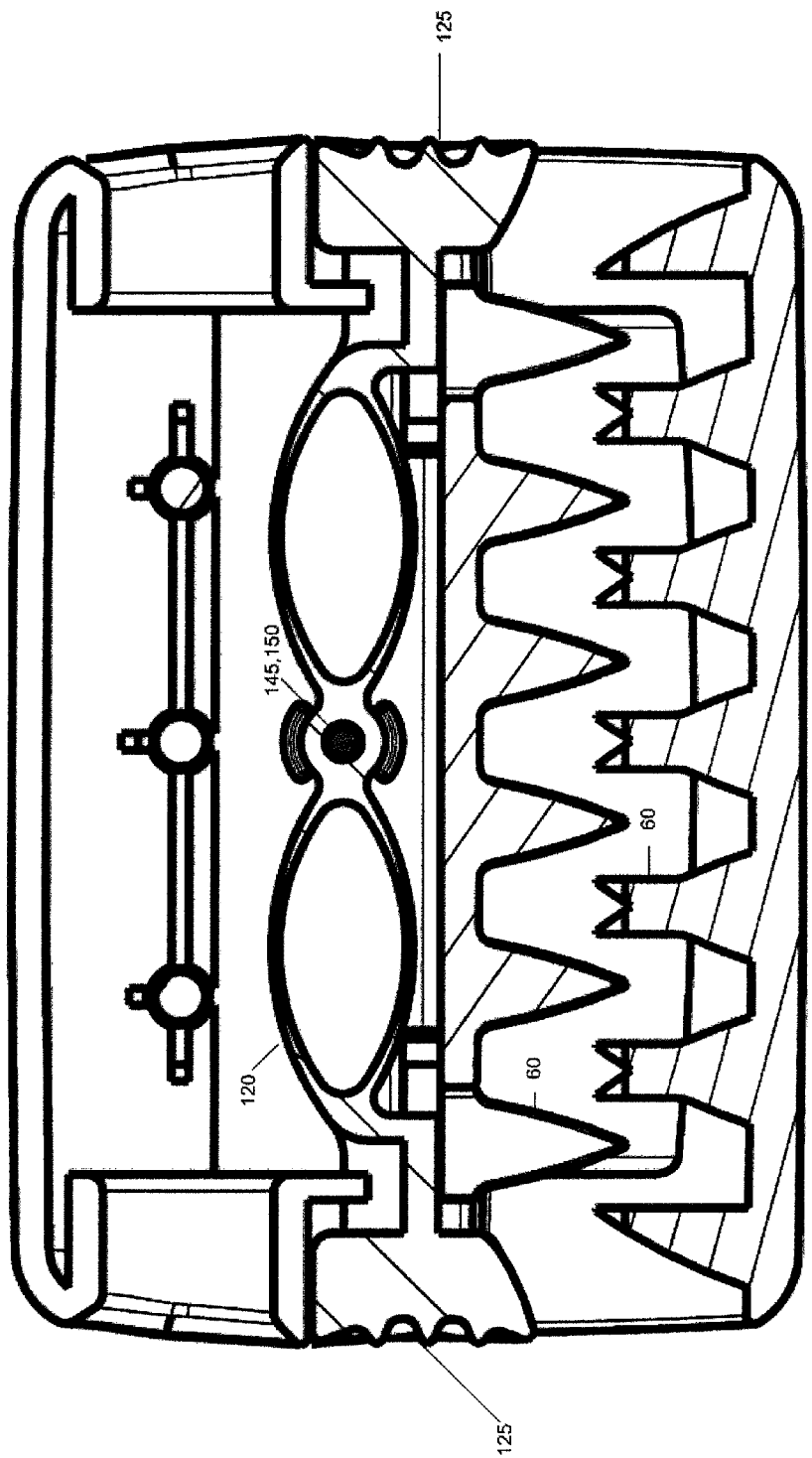
FIG. 9 shows a cross-sectional view along section line B-B of the device of FIG. 8.

Referring to FIG. 9, it can be seen that troughs formed by adjacent ribs 55 on the first clamping member 35 are located in alignment, and mate with, ribs 55 extending from the second clamping member 40 in order to facilitate the retention of the second portion 30 of the restraint 20 by the first securing assembly 25.

At least some of the ribs 55 include a plurality of teeth 60 to facilitate the retention of the second portion 30 of the restraint 20 within the first securing assembly 25. As shown in the cross-sectional view of FIG. 9, some of the teeth 60 can be provided with a pyramidic profile. In the illustrated example, the pyramidic profiled teeth can extend from the second clamping member 40. Also illustrated in the cross-sectional view of FIG. 9, the opposing teeth on the opposing clamping surface each include a pair of sharp peaks separated by a recessed portion. However, it is not essential that the ribs 55 include teeth 60, as illustrated by another example of the device 5 shown in relation to FIGS. 37 to 47, wherein the ridged surface includes a plurality of ribs 55 without teeth.

Figure 24:
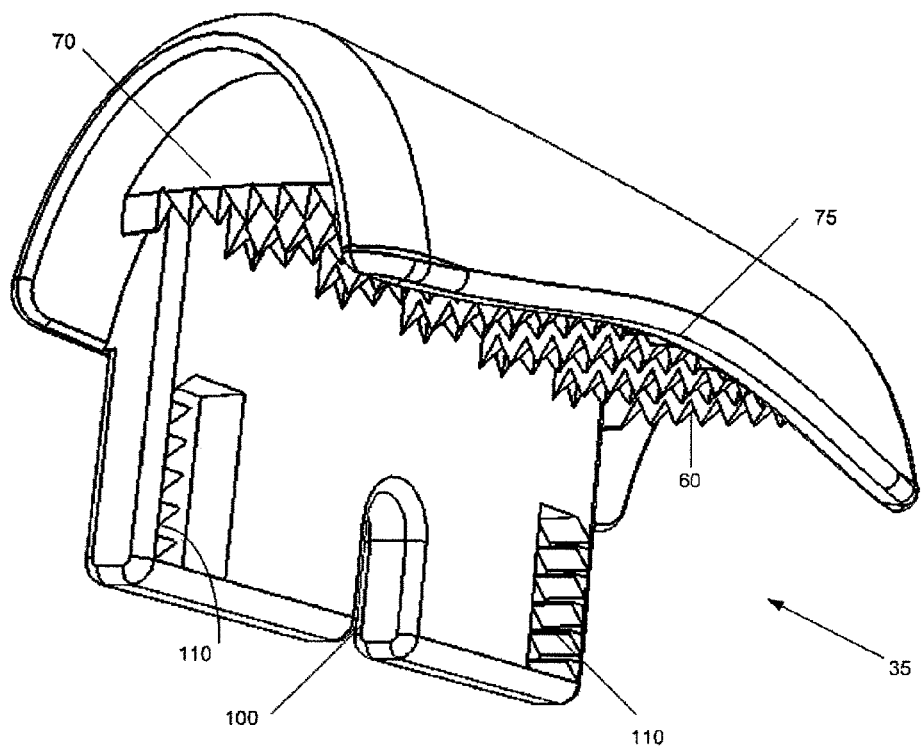
FIG. 24 shows a perspective view of the first clamping member of the device of FIG. 1.
Figure 25:
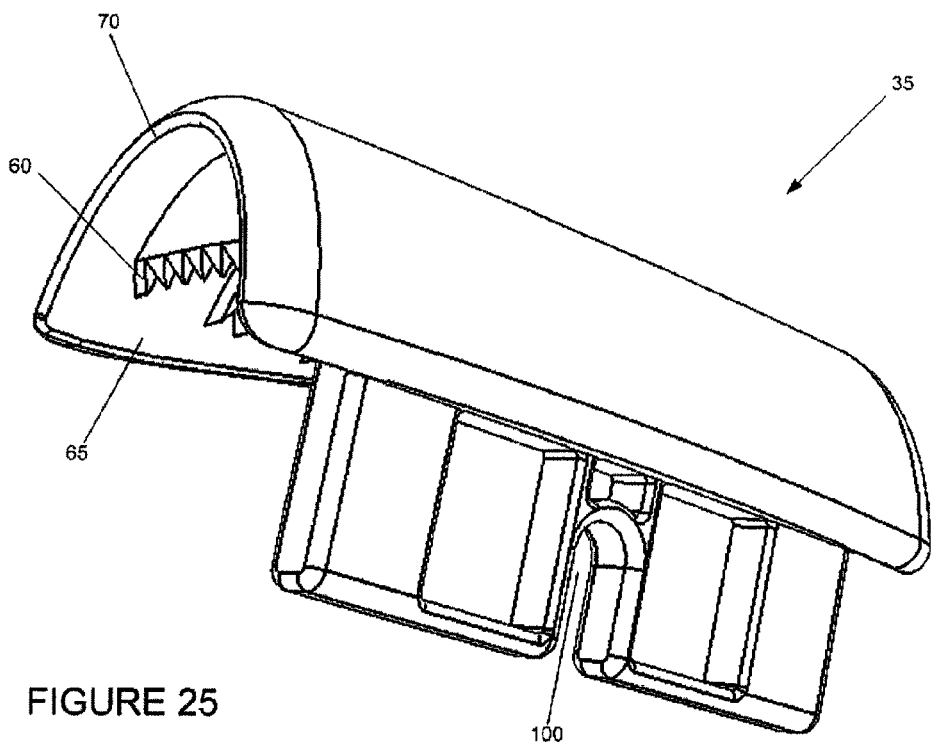
FIG. 25 shows a further perspective view of the first clamping member of the device of FIG. 1.
Figure 26:
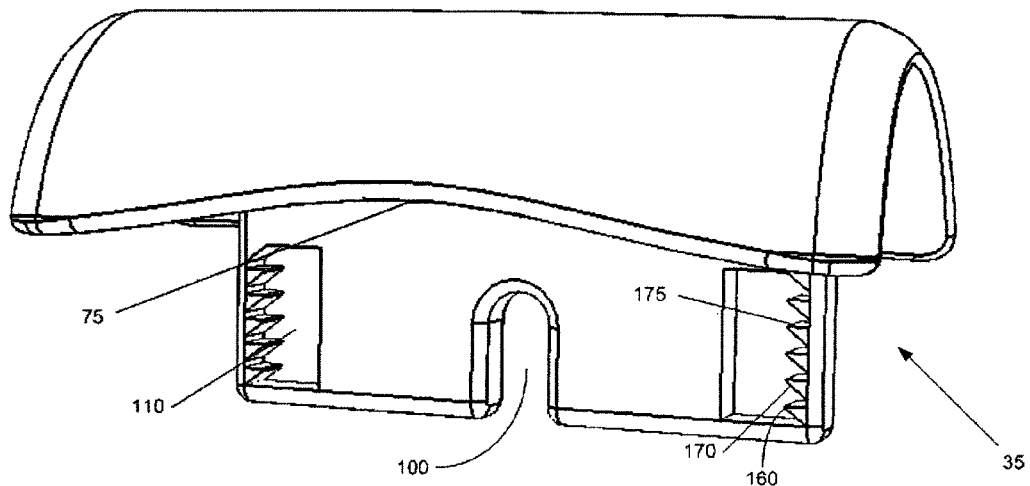
FIG. 26 shows a perspective view of the first clamping member of the device of FIG. 1.

Referring to FIGS. 24 to 26 there is shown an example of the first clamping member 35 which has been separated from other portions of the device 5 for clarity. The first clamping member 35 has a generally hooked profile including a lip 65 configured to substantially protect and house the clamping surface 50 which is located within the hooked area 70 of the first clamping member 35. Referring to FIG. 26, the front edge of the hooked surface can include a bowed lipped edge 75 to accommodate an engagement arrangement 80 of the second clamping member 40, thereby forming a substantially continuous elliptical cross-sectional profile in the secured position, as will be discussed in more detail below. The hooked section 70 of the first clamping member includes a semi-elliptical cross-sectional profile.

The first clamping member 35 includes at least one leg 90 which is slidably received within at least one aperture 95 of the second clamping member 40, as will be discussed in more detail below. As shown in FIGS. 24 to 26 the first clamping member 35 includes two legs 90 which are spaced apart via an arced shaped notch 100. Each leg 90 of the first clamping member 35 can include a portion of a locking arrangement 105, which in this example is a ratchet channel 110.

Figure 17:
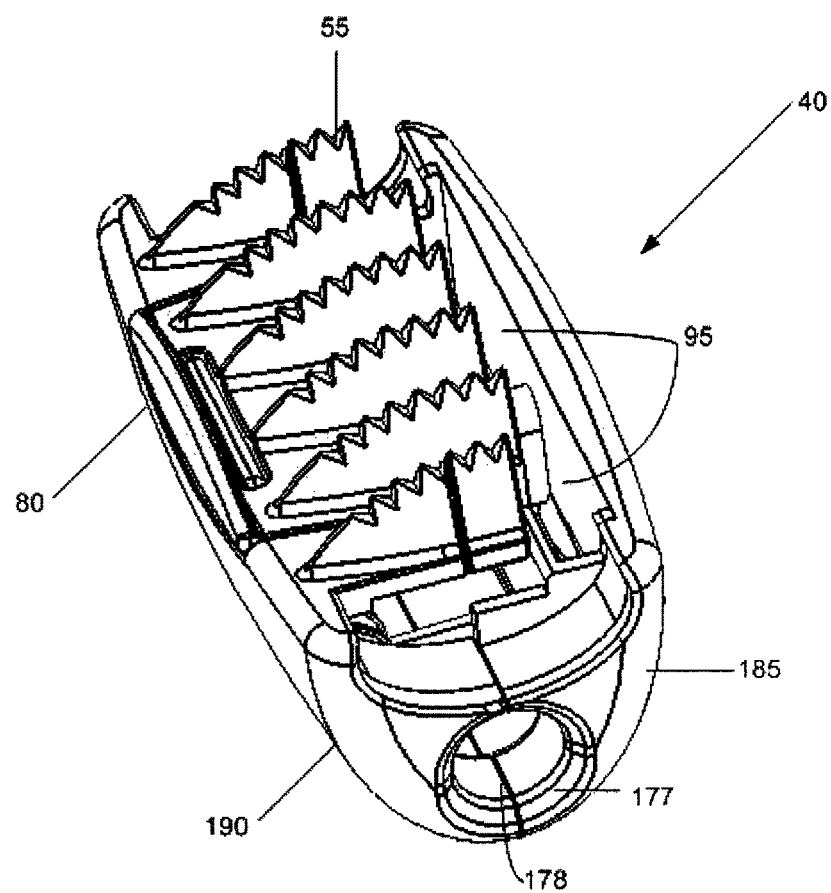
FIG. 17 shows a perspective view of the second clamping member of the device of FIG. 1.
Figure 18:
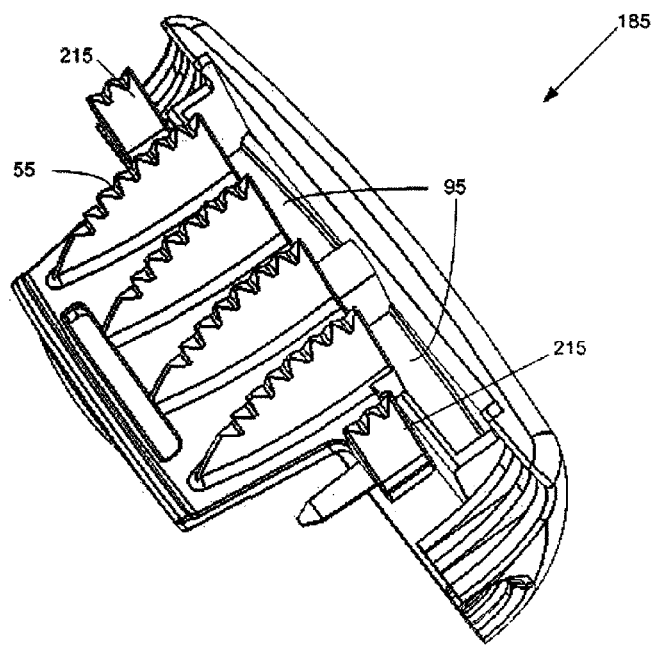
FIG. 18 shows a perspective view of the first element of the device of FIG. 1.

The second clamping member 40, as shown in FIG. 17, includes a substantially semi-elliptical cross-sectional outer profile. When the device 5 is provided in the secured position, the substantially semi-elliptical profiles of the first and second clamping members 35, 40 form a substantially elliptical cross-sectional profile. The substantially elliptical cross-sectional profile allows a user to easily grasp and operate the device 5 using a single hand, wherein the user's fingers and thumb are able to curl around the circumference of the device 5 and apply an opposing force to the first and second clamping members 35, 40 to secure the second portion 30 of the restraint 20 using the first securing assembly 25.

The second clamping member 40 has a substantially hemi-cylindrical profile, wherein the second clamping member 40 includes ribs 55 which protrude therefrom to form one of the clamping surfaces 50. The second clamping member 40 also includes a first concave section 115 to accommodate a portion of an actuator 120. At a rear portion of the second clamping member 40 there is provided corresponding apertures 95 to receive the legs 90 of the first clamping member 35, wherein the legs 90 slide therein and thereout to allow the first securing assembly 25 to move between the secured and unsecured position.

As shown in FIGS. 1 to 11 and specifically FIGS. 19 to 21 and 27, the device 5 includes an actuator 120 which when actuated allows the device 5 to move from the secured to unsecured position. The actuator 120 is operatively connected to a locking arrangement 105 which is configured to substantially restrict the first securing assembly 25 moving from the secured position to the unsecured position.

The actuator 120 is provided with a plurality of operative elements 125 in the form of a plurality of buttons 130 which can be located at both ends of the device 5 as illustrated in FIG. 9. When a force is applied to one or more of the buttons 130, the locking arrangement 105 is disabled allowing the first securing assembly 25 to move from the secured position to the unsecured position. In this particular example, each button 130 requires the continued application of an applied force directed inwardly toward the centre of the device 5 during the movement of the first securing assembly 25 from the secured to unsecured position. Each button 130 includes a substantially elliptical profile which is at least partially accommodated by the concave section 115 of the second clamping member 40. Each button 130 can include a ribbed surface to allow for ease of operability using a finger and/or thumb.

Figure 19:
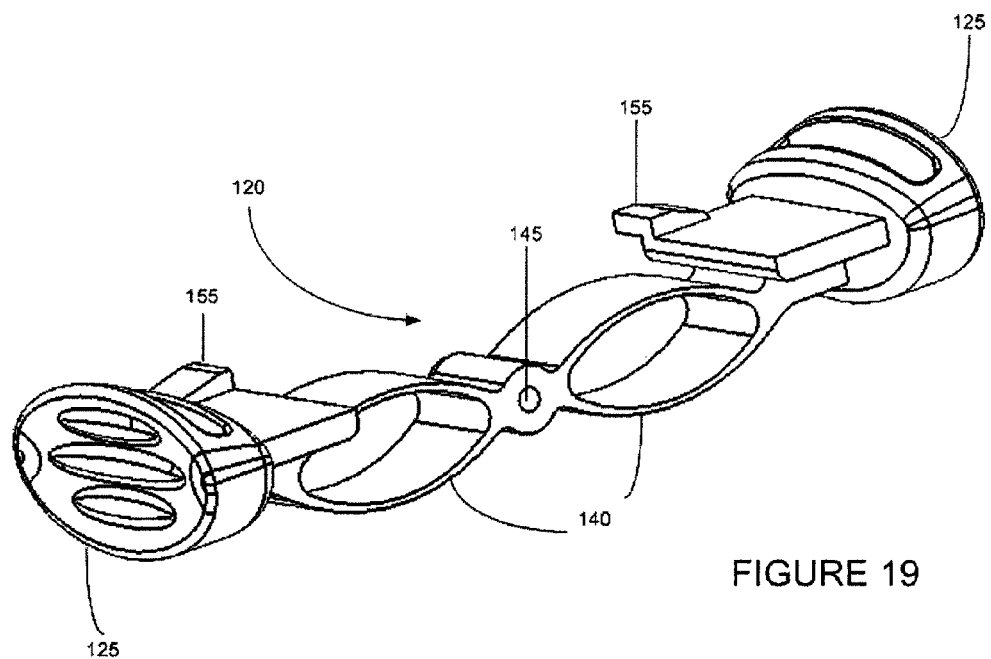
FIG. 19 shows a perspective view of the actuator of the device of FIG. 1.
Figure 20:
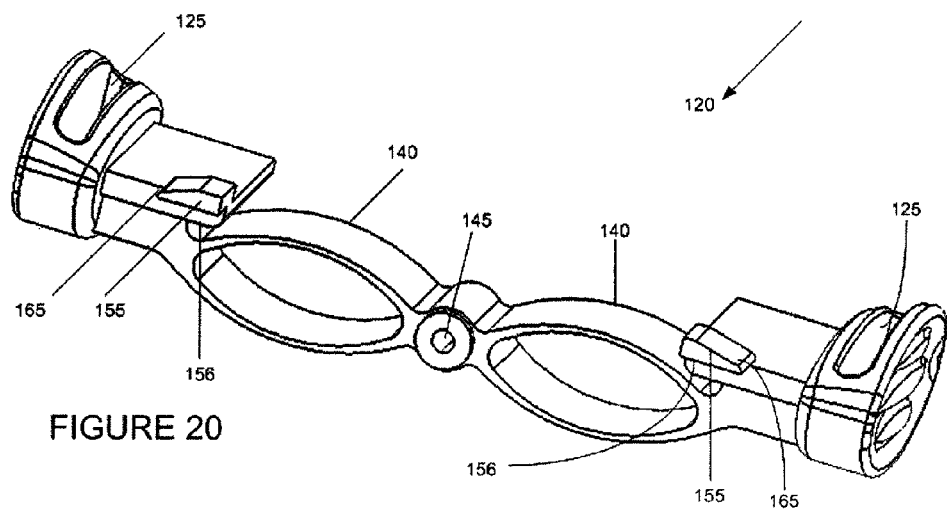
FIG. 20 shows a further perspective view of the actuator of the device of FIG. 1.
Figure 21:
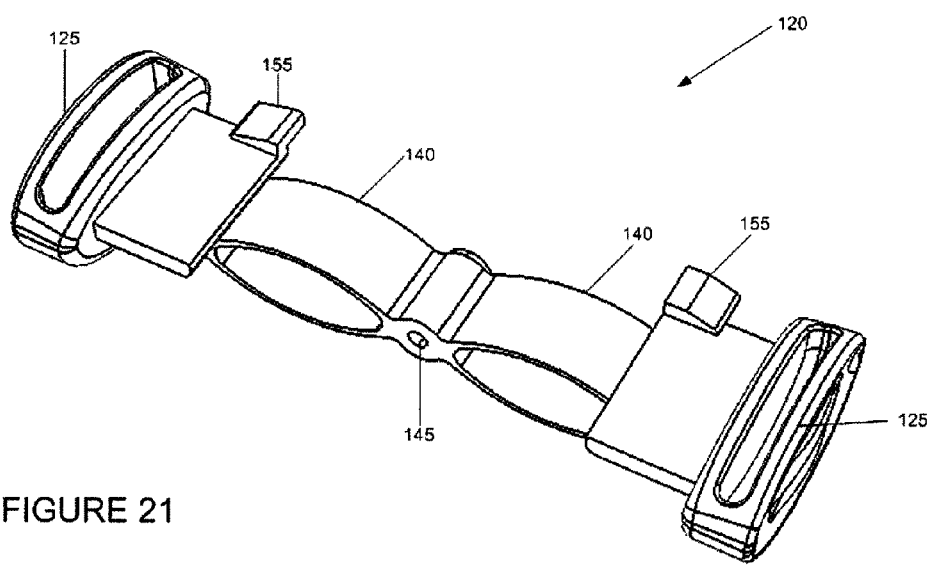
FIG. 21 shows a further perspective view of the actuator of the device of FIG. 1.
Figure 22:
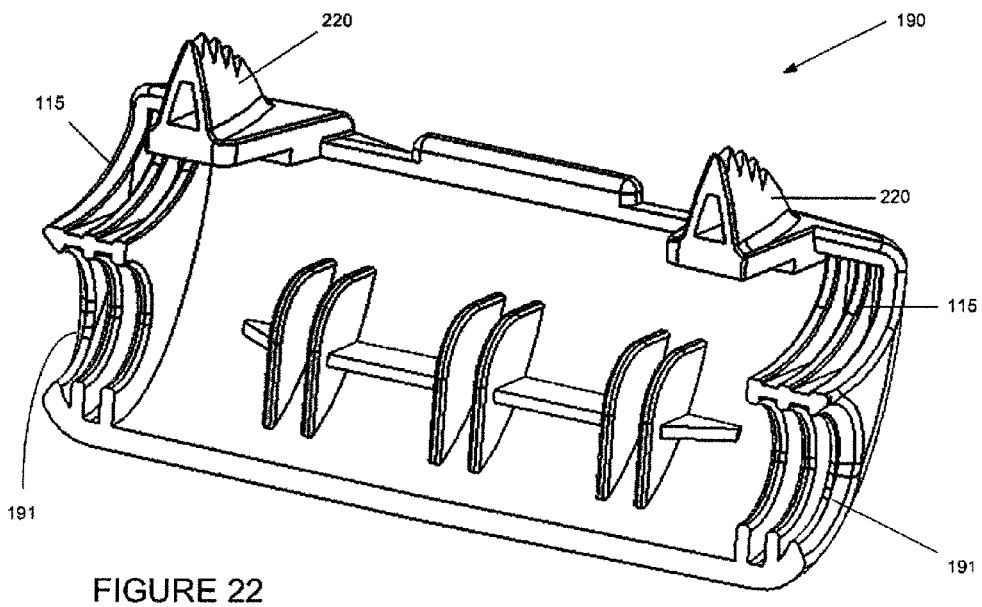
FIG. 22 shows a perspective view of the second element of the device of FIG. 1.
Figure 23:
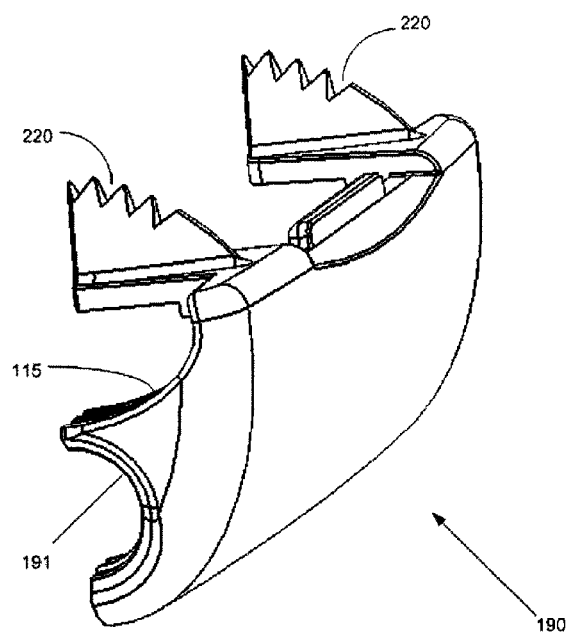
FIG. 23 shows a further perspective view of the second element of the device of FIG. 1.

Referring to FIGS. 19 to 21, there is shown an example of the actuator 120 separated from other portions of the securing device 5 for clarity. In particular, the actuator 120 includes a biasing element 140 which biases the button 130 of the actuator 120 from a first position, wherein the locking arrangement 105 is disengaged, to a second normal position. The biasing element 140 can be provided in the form of a leaf spring. More specifically, the biasing element 140 can be a pair of opposed leaf springs which have an elliptical cross-sectional profile as clearly shown in FIG. 9. When a force is applied to the buttons 130, the elliptical profile of the pair of opposed leaf springs deform to resemble a more circular cross-sectional profile.

Figure 27:
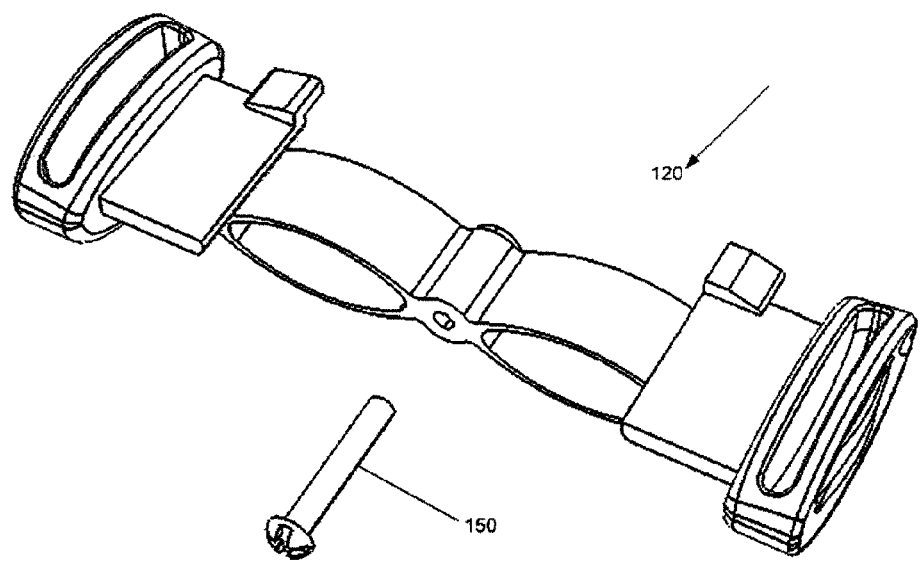
FIG. 27 shows a perspective view of the fastening element and actuator of the device of FIG. 1.
Figure 28:
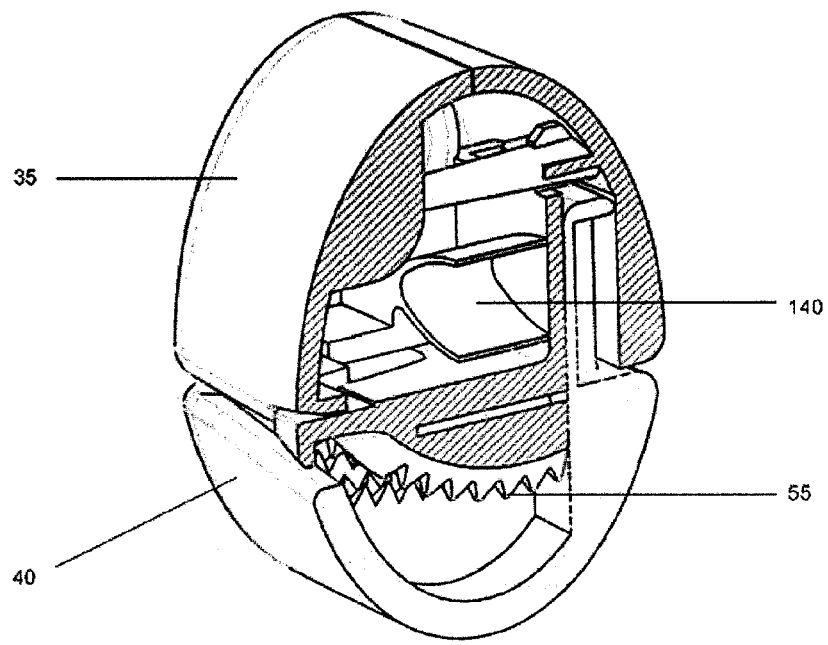
FIG. 28 shows cross-sectional view of the device of FIG. 1 in the secured position.

As shown in FIGS. 19 to 21 the actuator 120 is integral with the biasing element 130, wherein the biasing element 130 may be provided in the form of an integral dual pair of opposed leaf springs. The actuator 120 is generally coupled to a portion of the body 10 of the device 5. In one form, as illustrated in FIGS. 9 and 27, the actuator 120 can include an aperture 145 for receiving a fastening element 150 to fasten the actuator 120 to the body 10 of a device 5. In one form, the aperture 145 may receive therethrough a screw which fastens the actuator 120 to the second clamping member 40 via a complementary aperture. In some forms, one of the plurality of ribs 55 located adjacent to one of the ends of the body forms a stop to define an extremity which the respective button 130 can be internally displaced.

Referring more specifically to FIGS. 19 to 21, the actuator 120 also includes one or more protrusions in the form of one or more paws 155. Each paw 155 is operatively connected to a respective button 130, wherein when a force is applied inwardly along the longitudinal axis of the device 5, the biasing element 140 deforms causing the paw 155 to displace inwardly.

Referring to FIGS. 28 to 36, there is shown a number of perspective cut-away views of the movement of the first clamping member 35 relative to the second clamping member 40. In particular, these illustrations show the cross-sectional views of the device 5 as the first securing assembly 25 moves from the secured position, illustrated in FIGS. 28 to 30, to a unsecured position, illustrated in FIGS. 31 to 33, via intermediary positions, illustrated in FIGS. 34 to 36. Although not shown, in order for the first securing assembly 25 to move from the secured position to the unsecured position, the actuator 120 requires actuation to disable the locking arrangement 105. It will be appreciated that the actuator 120 does not require actuation for movement from the unsecured position to the secured position.

Figure 30:
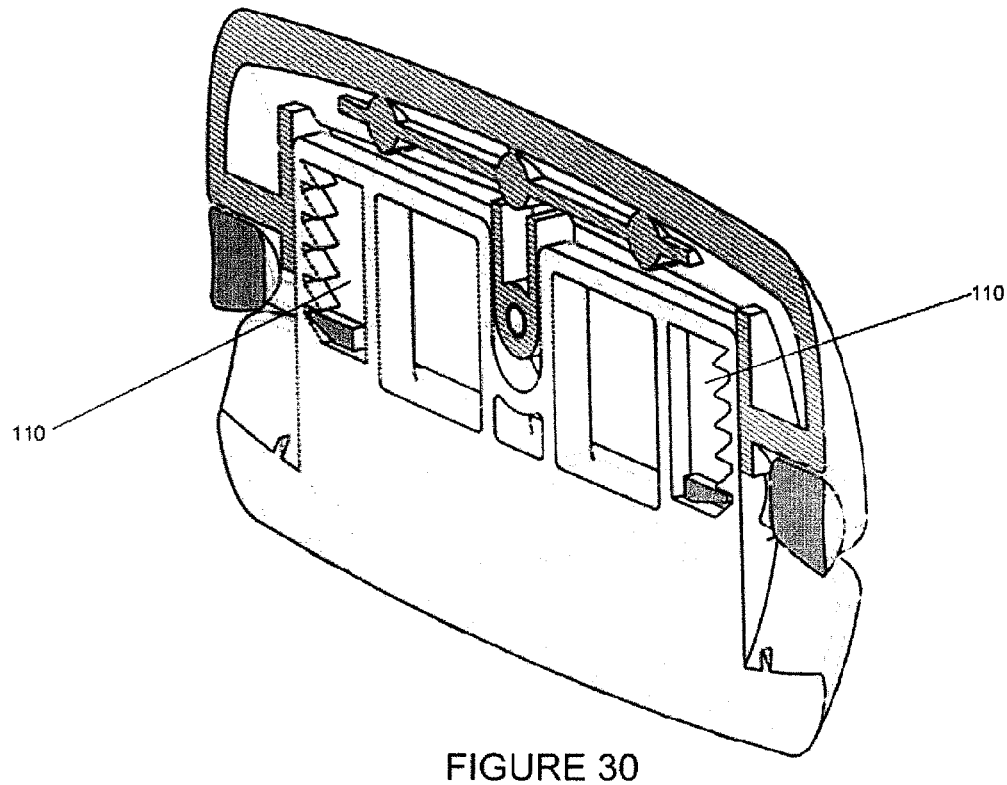
FIG. 30 shows a cross-sectional view of the device of FIG. 1 in the secured position.
Figure 31:
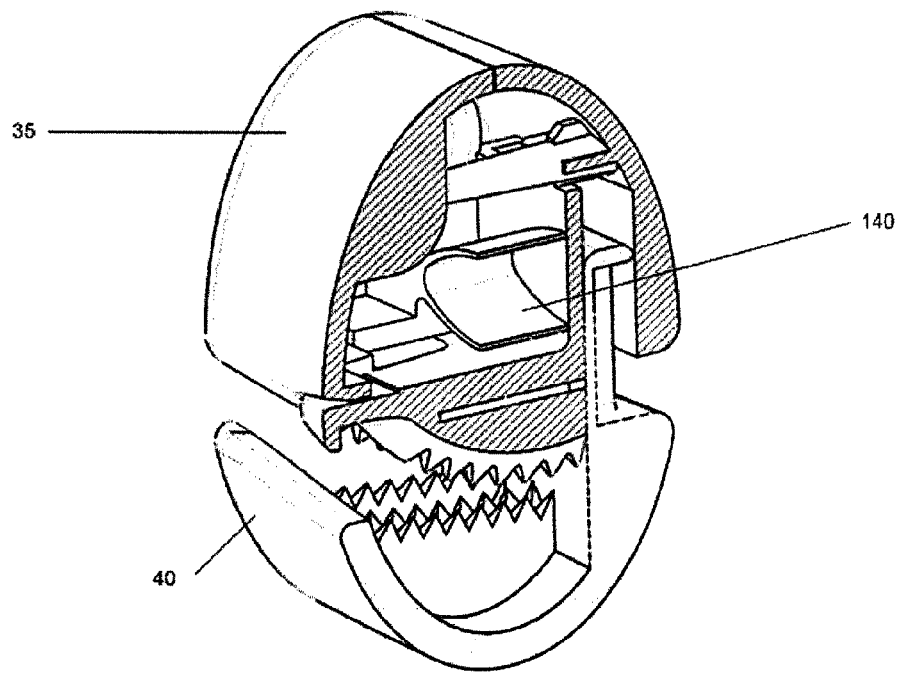
FIG. 31 shows a cross-sectional view of the device of FIG. 1 in an intermediary position.
Figure 36:
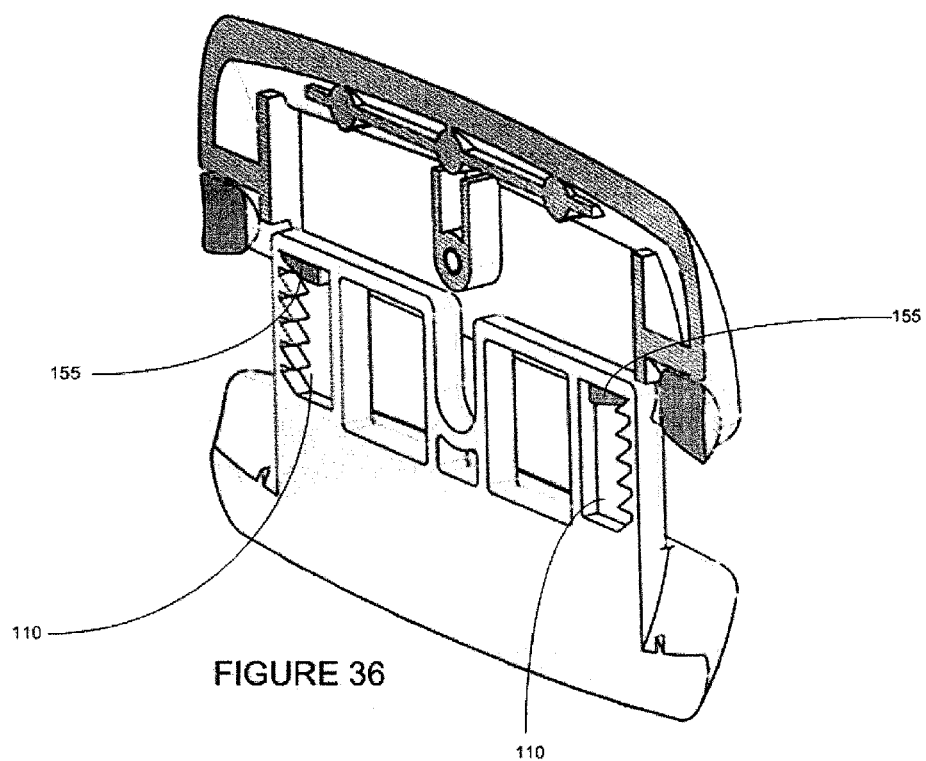
FIG. 36 shows a cross-sectional view of the device of FIG. 1 in the unsecured position.
Figure 37:
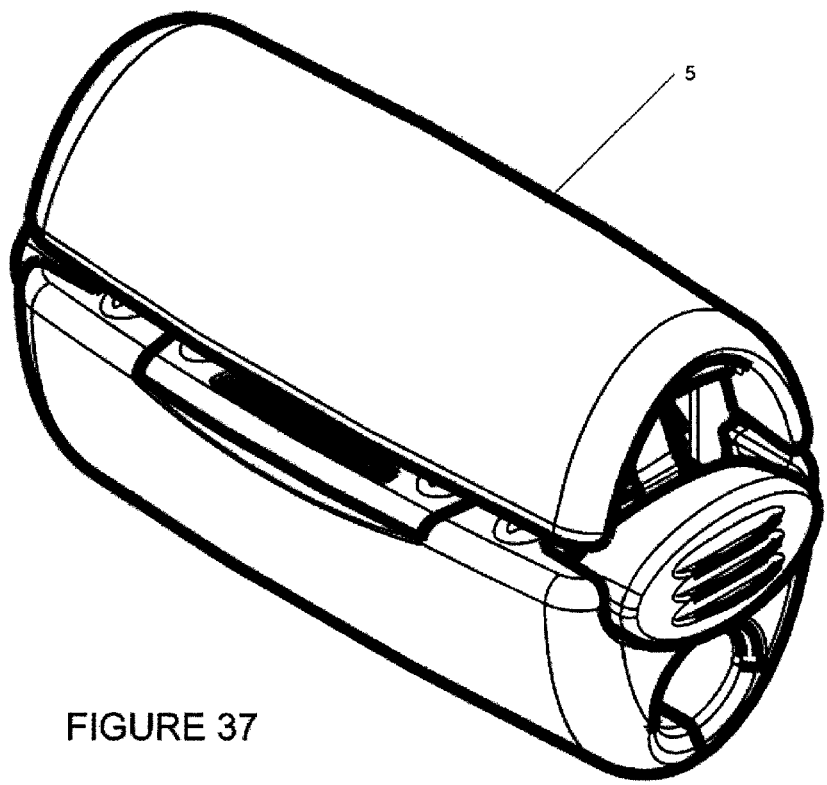
FIG. 37 shows a perspective view of a second example of a securing device.
Figure 38:
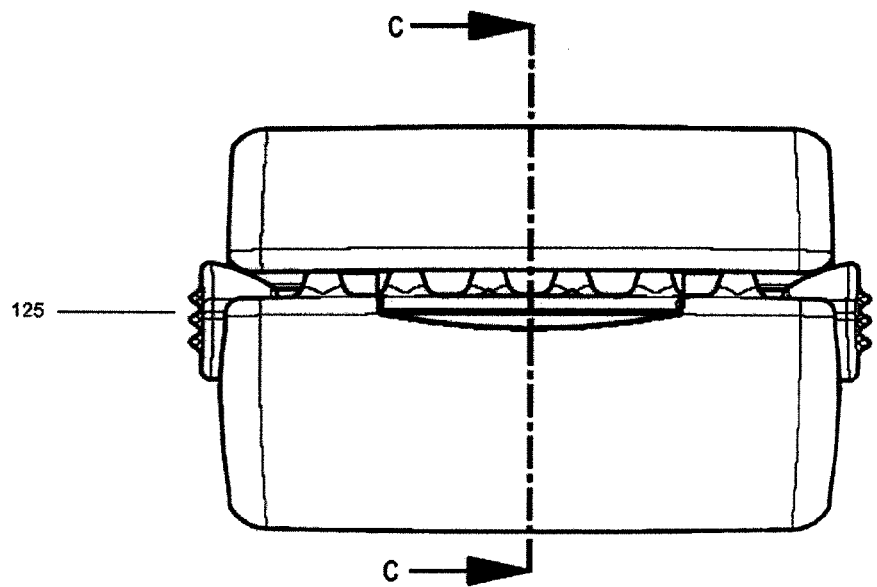
FIG. 38 shows a front view of the device of FIG. 37.
Figure 39:
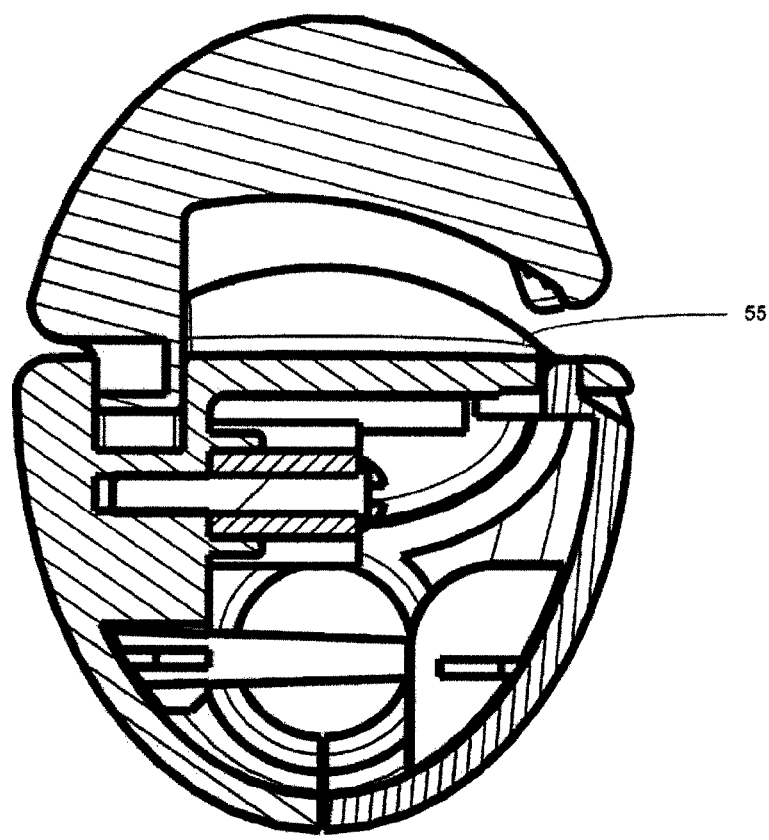
FIG. 39 shows a cross-sectional view along section line C-C of the device shown in FIG. 38.
Figure 40:
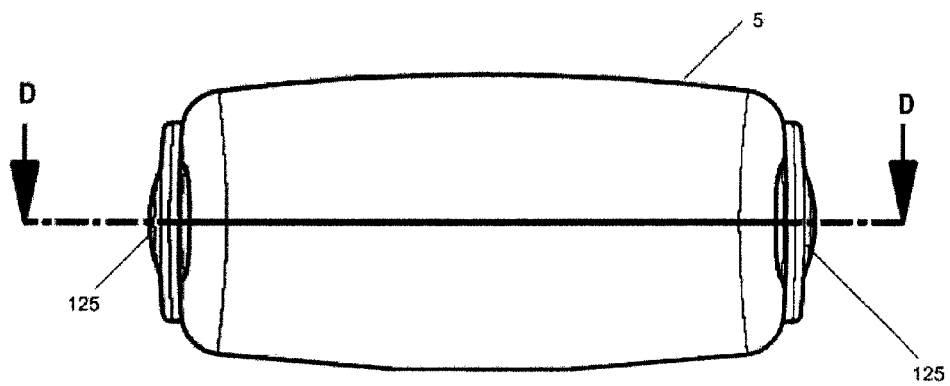
FIG. 40 shows a top view of the device of FIG. 37.
Figure 41:
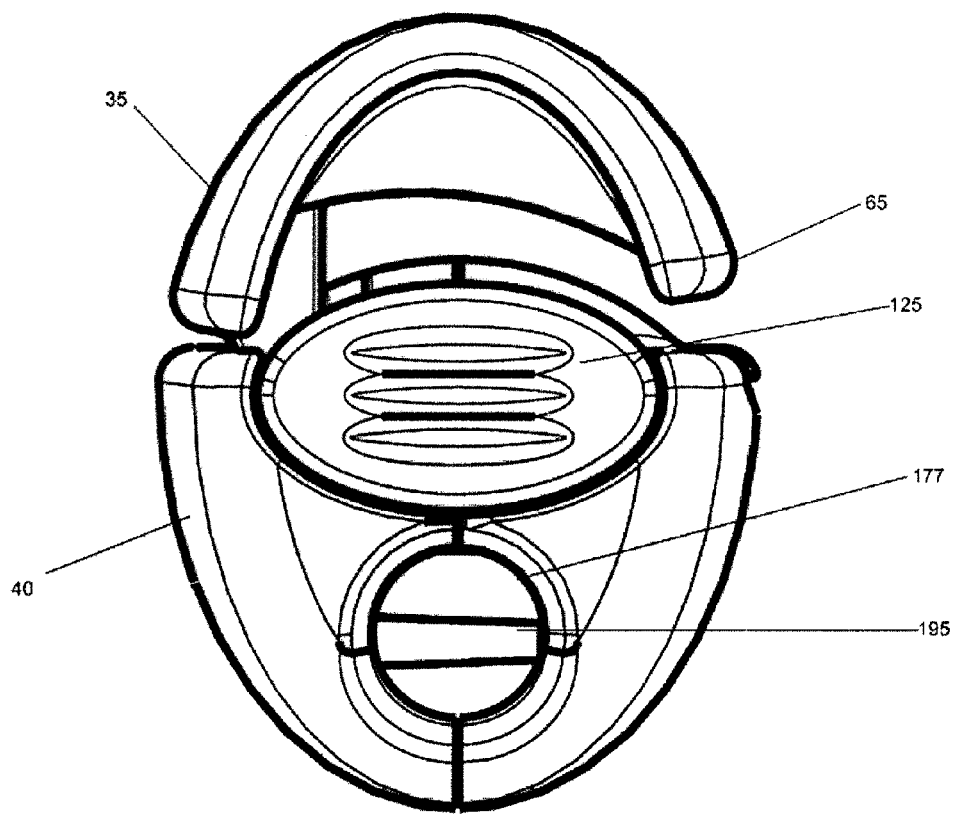
FIG. 41 shows an end view of the device of FIG. 37.
Figure 42:
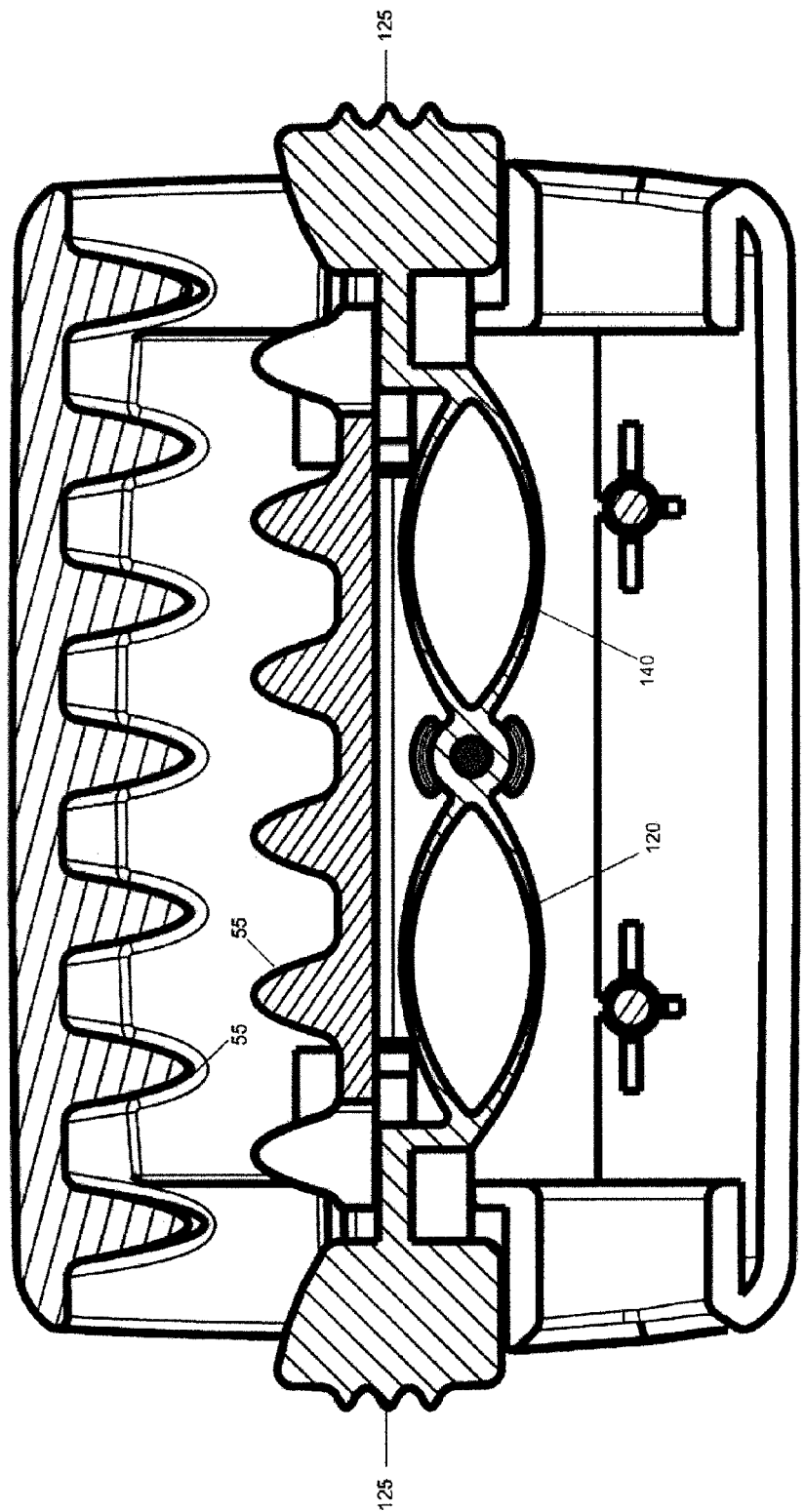
FIG. 42 shows a cross-sectional view along section line D-D of FIG. 40.
Figure 43:
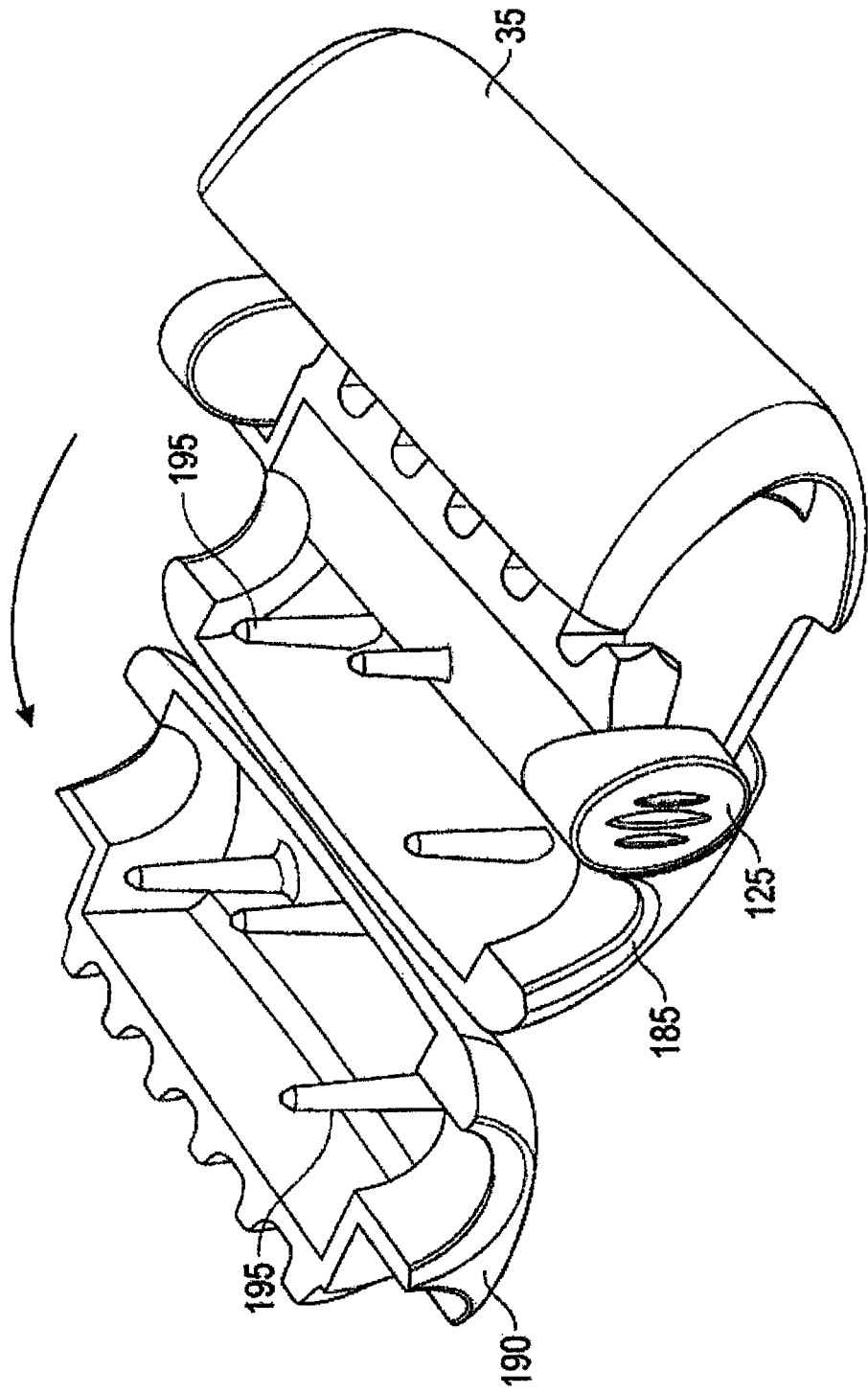
FIG. 43 shows a perspective view of the device of FIG. 37 wherein the second securing assembly is in the unsecured position.
Figure 44:
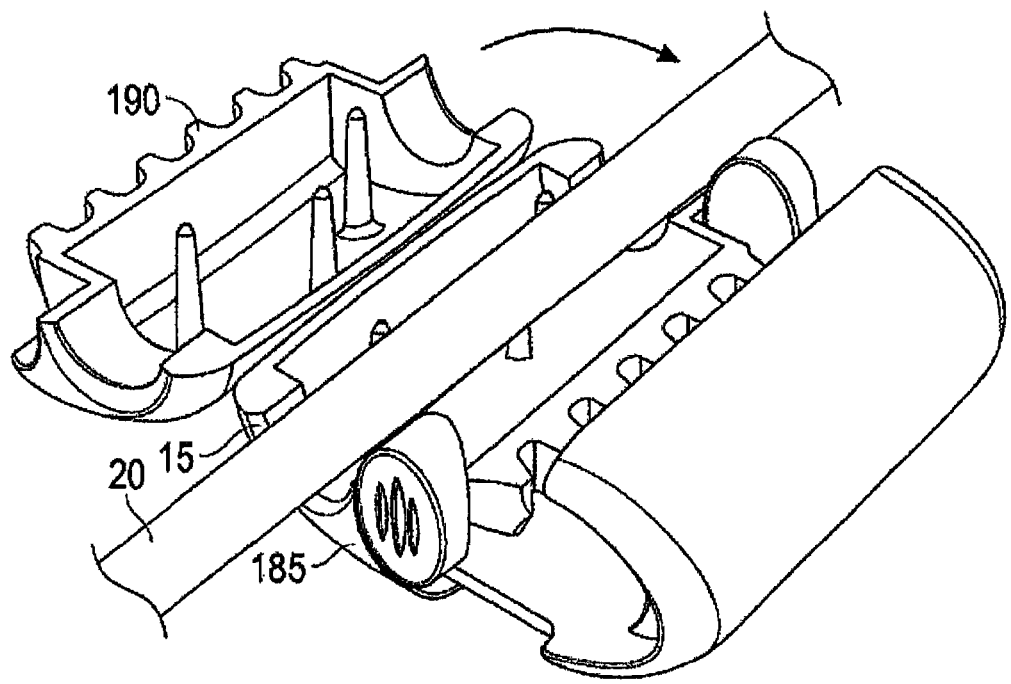
FIG. 44 shows a perspective view of the device of FIG. 37 wherein a first portion of the restraint is positioned within the second securing assembly whilst in the unsecured position.

Referring specifically to FIGS. 30, 33 and 36, these illustrations show the locking arrangement 105 provided in the form of a ratchet and paw arrangement which is engaged in varying intermediate positions between the secured and unsecured position.

The ratchet and paw arrangement 105 ensures that the first securing assembly 25 is restricted from unsecuring the second portion 30 of the restraint 20 if a substantial tension is applied to the restraint 20. Additionally, the ratchet and paw arrangement 105 allows incremental movement of the first securing assembly 25 from the unsecured position to the secured position. In this form, the first clamping member 35 is able to be incrementally moved toward and relative to the second clamping member 40 in order to move the first securing assembly 25 from the unsecured position to the secured position.

As will be discussed in more detail below, the ratchet channel 110 is provided by the second clamping member 40, and as previously discussed, the paw 155 is operatively connected to the first clamping member 35 via the actuator 120. However, in an alternate form, the portions of the ratchet and paw arrangement 105 may be swapped such that the ratchet channel 110 is provided by the first clamping member 35 and the paw 155 is operatively connected to the second clamping member 40 via the actuator 120.

When a force is applied to the actuator 120, the paws 155 disengage from the respective ratchet channel 110, thereby allowing the first clamping member 35 to move away from and relative to the second clamping member 40. The ratchet channel 110 includes a plurality of angled teeth 160 which co-operate with an angular tail 165 of the paw 155. When a force is applied to the first clamping member 35 to move the first clamping member 35 toward the second clamping member 40, the tail 165 of the paw 155 slides along the angled surface 170 of the corresponding tooth 160 to thereby allow an incremental movement toward a more secured position. The angular teeth 160 of the ratchet channel 110 include an opposing horizontal surface 175 which butts against a horizontal surface 156 of the paw 155 thereby restricting the first clamping member 35 moving away from and relative to the second clamping member 40 unless the paw 155 is disengaged from the ratchet channel 110 via actuation of the actuator 120.

Figure 3:
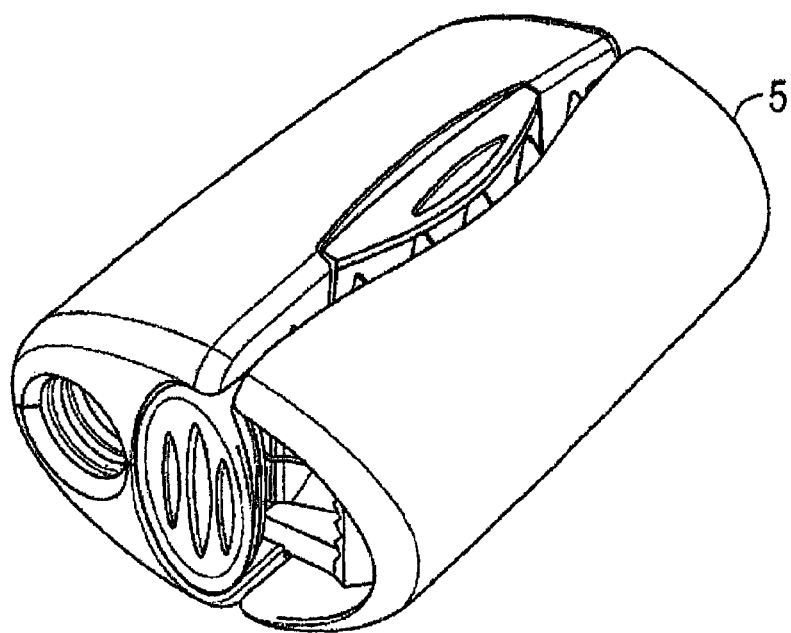
FIG. 3 shows a perspective view of the securing device of FIG. 1 in the secured position.
Figure 4:
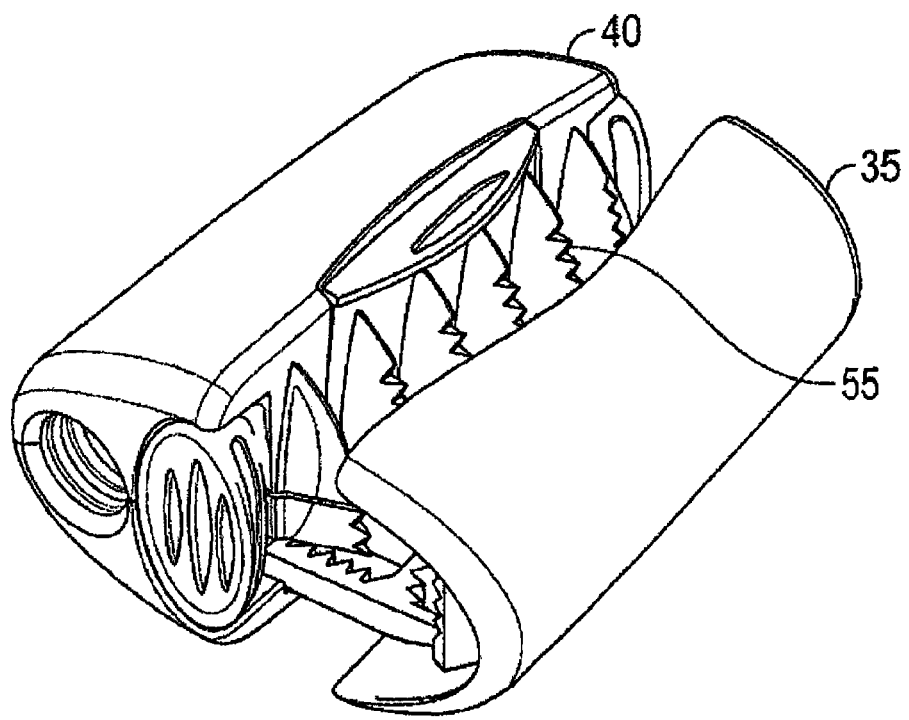
FIG. 4 shows the securing device of FIG. 1 in the unsecured position.
Figure 5:
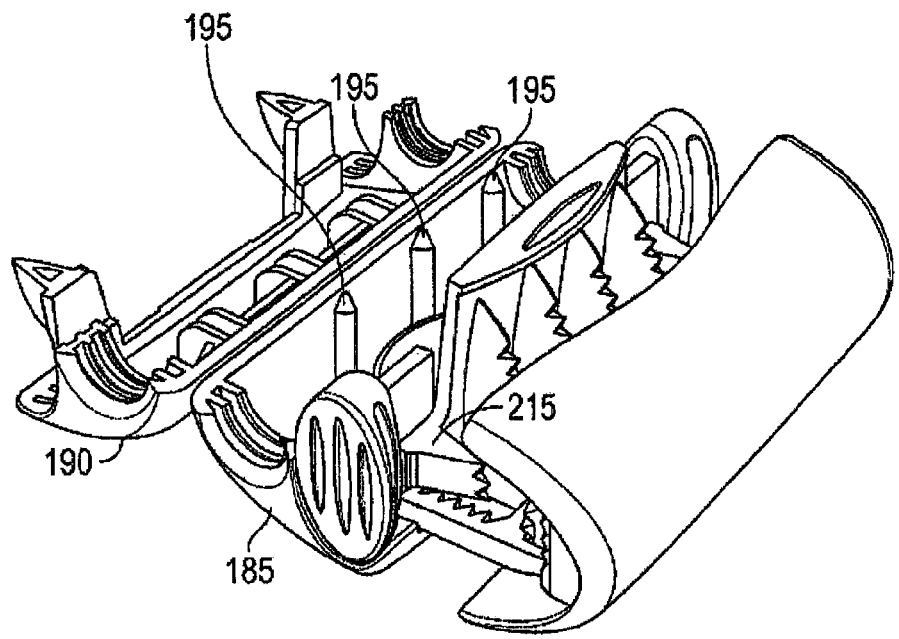
FIG. 5 shows the securing device of FIG. 1 where the second securing assembly is in the unsecured position.
Figure 6:
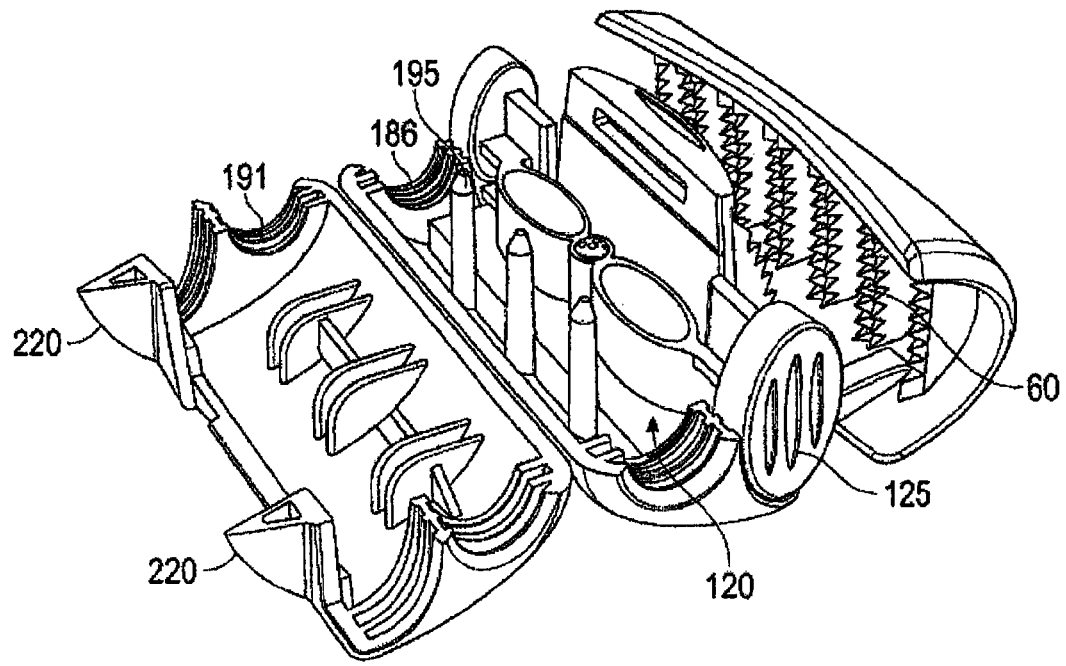
FIG. 6 shows a perspective view of the second securing assembly of the device of FIG. 1 in the unsecured section.
Figure 7:
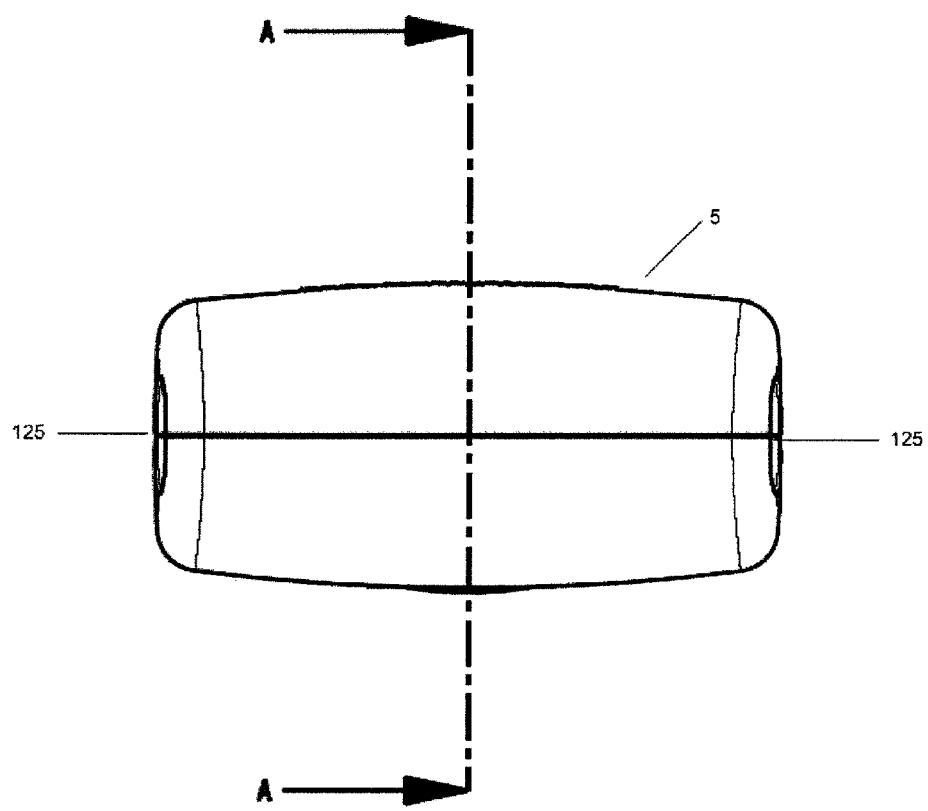
FIG. 7 shows a bottom view of the device of FIG. 1.
Figure 8:
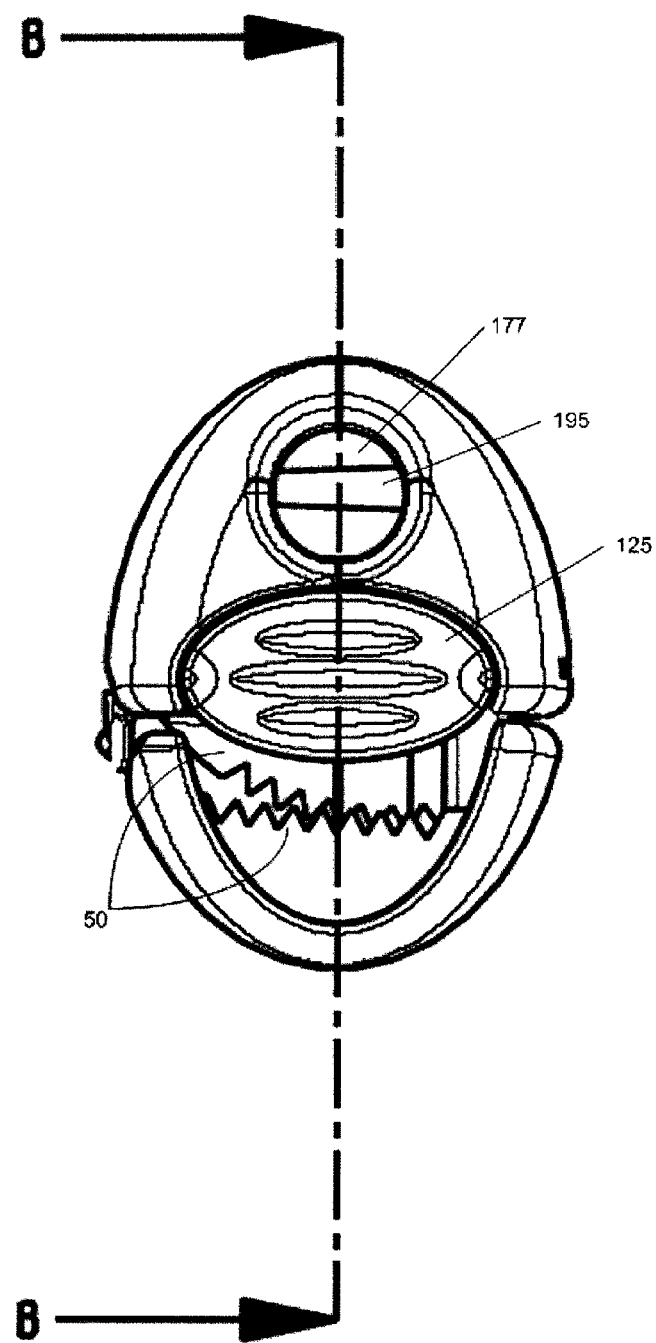
FIG. 8 shows a side view of the device FIG. 1.

Referring to FIGS. 1 to 37, the device 5 also includes a second securing assembly 177 to secure the first portion 15 of the restraint 20. The second securing assembly 177 is moveable between an unsecured position, as shown in FIGS. 5 and 6, to a secured position, as shown in FIGS. 3 and 4, wherein the first portion 15 of the restraint 20 is secured by the second securing assembly 177 in the secured position. The second securing assembly 177 is provided in the form of a channel 178 which is located through the second clamping member 40 to receive and secure the first portion 15 of the restraint 20.

Figure 65:
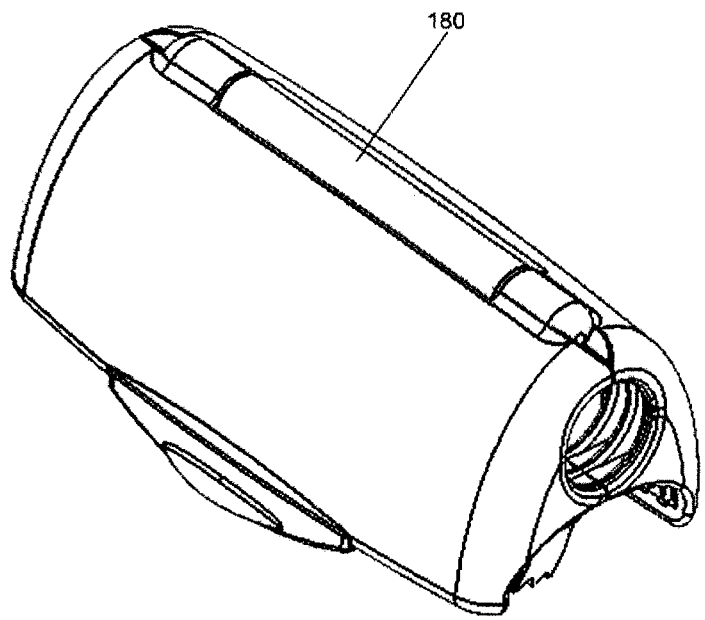
FIG. 65 shows a perspective view of the second clamping member including a hinge.
Figure 66:
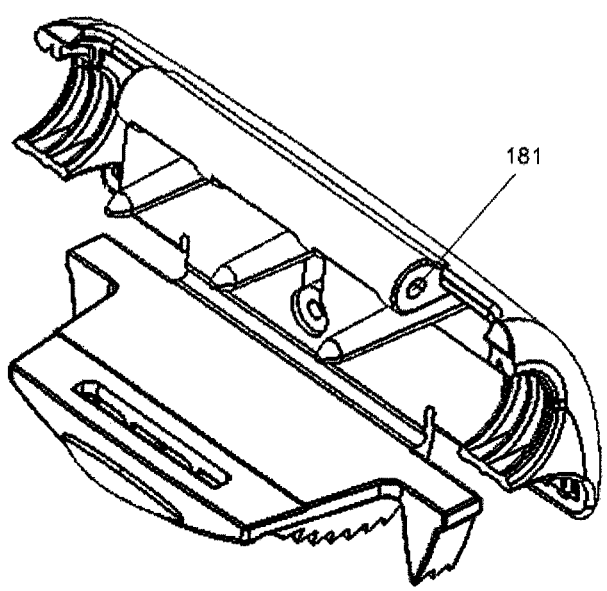
FIG. 66 shows a perspective view of the first element of the second clamping member including a first hinge element.
Figure 67:
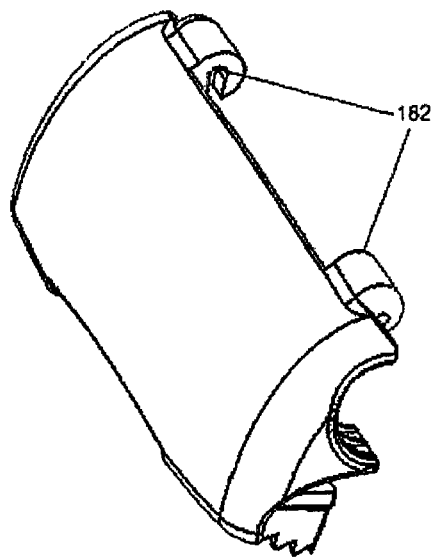
FIG. 67 shows a perspective view of the second element of the second clamping member includes second hinge elements.

The second clamping member 40 includes a first and second element 185, 190. The first and second elements 185, 190 each have a concave section 186, 191 which when butted together form the channel 178 of the second securing assembly 177. The first and second elements 185, 190 move relative to each other in order for the second securing assembly 177 to move between the secured and unsecured position. As shown in FIGS. 5 and 6, the first element 185 is rotatably moveable, via a hinge 180 or pivot point, relative to the second element 190. Referring to FIGS. 65, 66 and 67 there is shown a more detailed view of an example of the hinge 180 including first and second hinge elements 181, 182 allowing first and second element 185, 190 to hingedly couple and move relative to each other.

Figure 29:
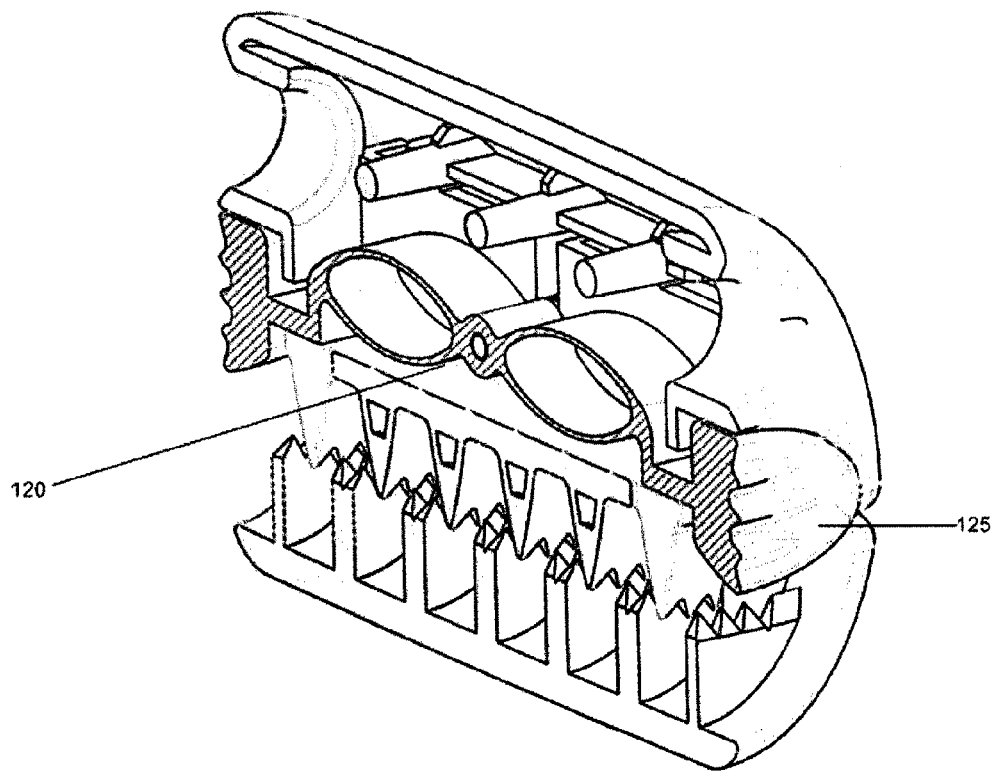
FIG. 29 shows a cross-sectional view of the device of FIG. 1 in the secured position.

The first element 185 includes one or more protrusions 195, such as pins, which facilitate the retention of the first portion 15 of the restraint 20 by the second securing assembly 177. In one form, the pins 195 may protrude through the restraint 20 such as to help retain the first portion 15 of the restraint 20. For example, if the restraint 20 is made from a fibrous material, the pins 195 may protrude through the fibrous material to retain the restraint 20 within the second securing assembly 177. In other forms, the restraint 20 may be a steel chain including a number of chain links, wherein the pins 195 may protrude through one or more of the chain links to thereby retain the restraint 20. In another variation, the restraint 20 may be provided in the form of a leather leash which may be wrapped around the one or more protrusions 195 in order to facilitate the retention of the first portion 15 of the restraint 20. In a variation, as shown in FIG. 29, both the first and second element 185, 190 include one or more protrusions 195 which extend across the diameter of the channel 178.

Figure 2:
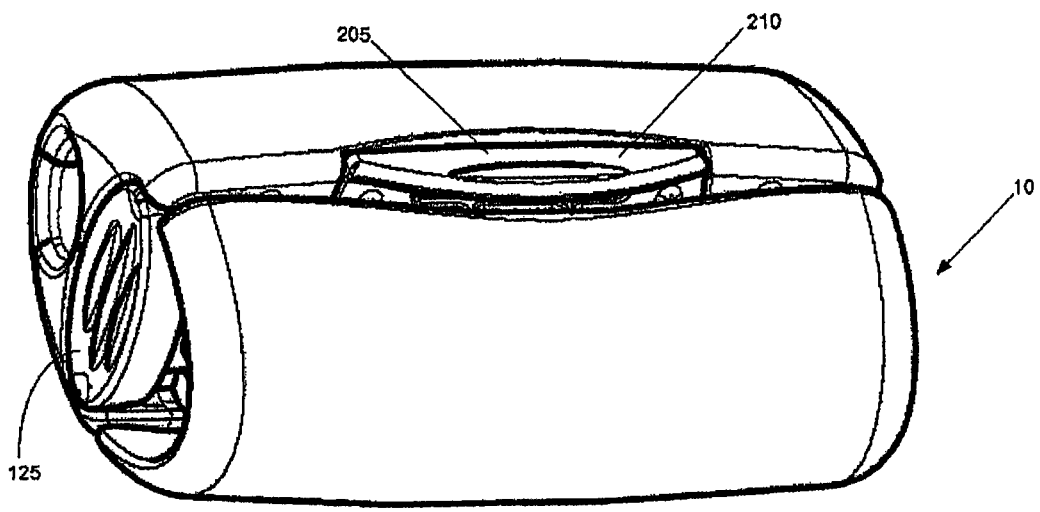
FIG. 2 shows an underside perspective view of the securing device of FIG. 1.
Figure 10:
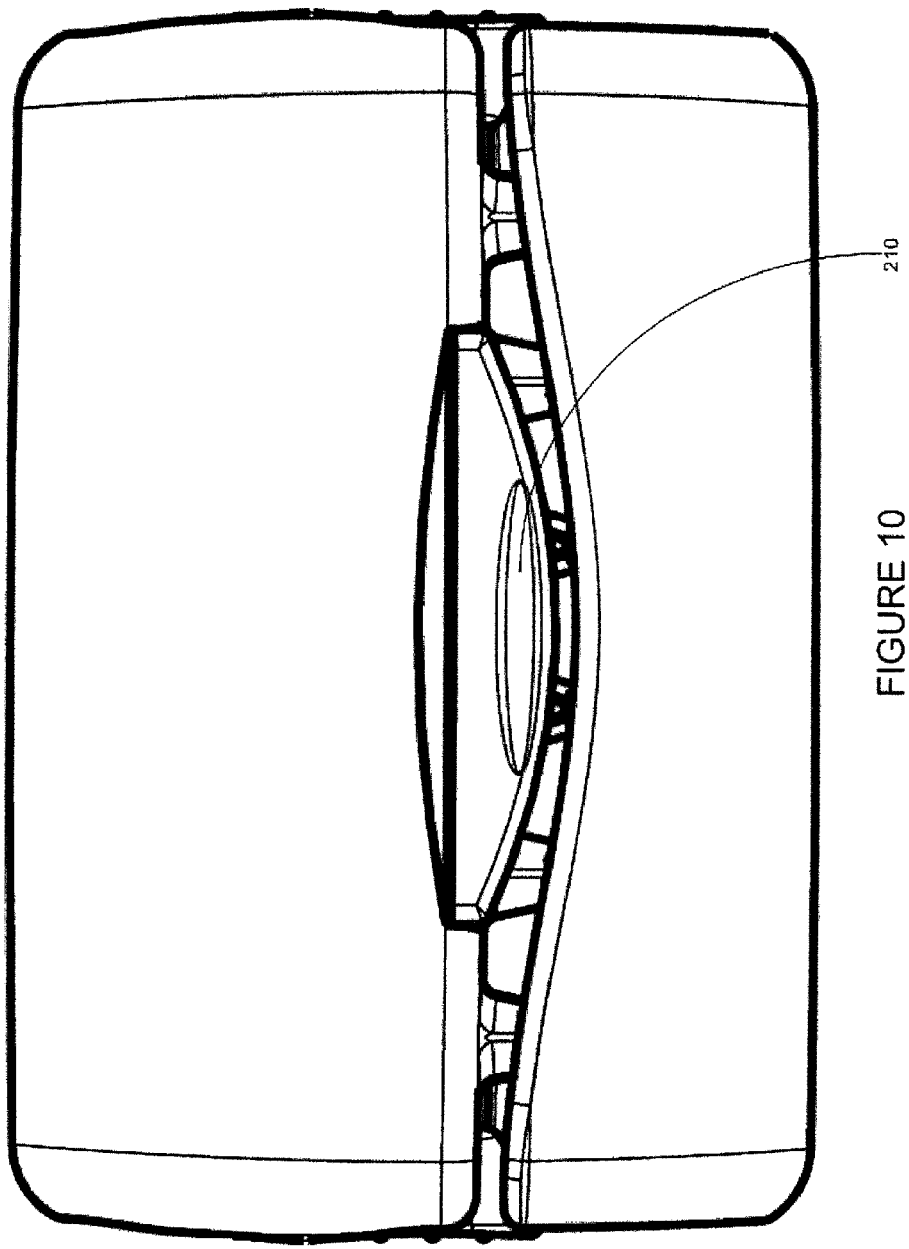
FIG. 10 shows a front view of the device of FIG. 1.
Figure 11:
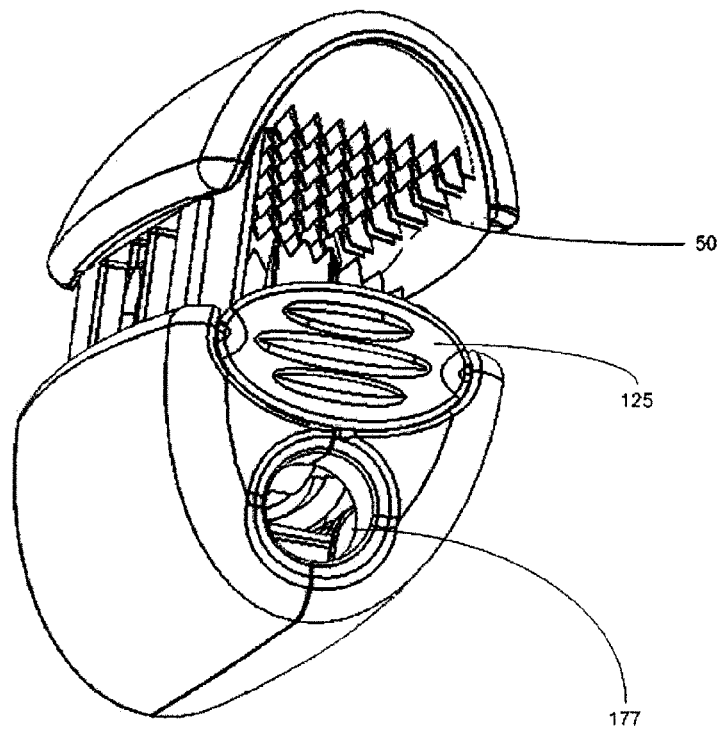
FIG. 11 shows a perspective view of the device of FIG. 1 in an unsecured position.
Figure 12:
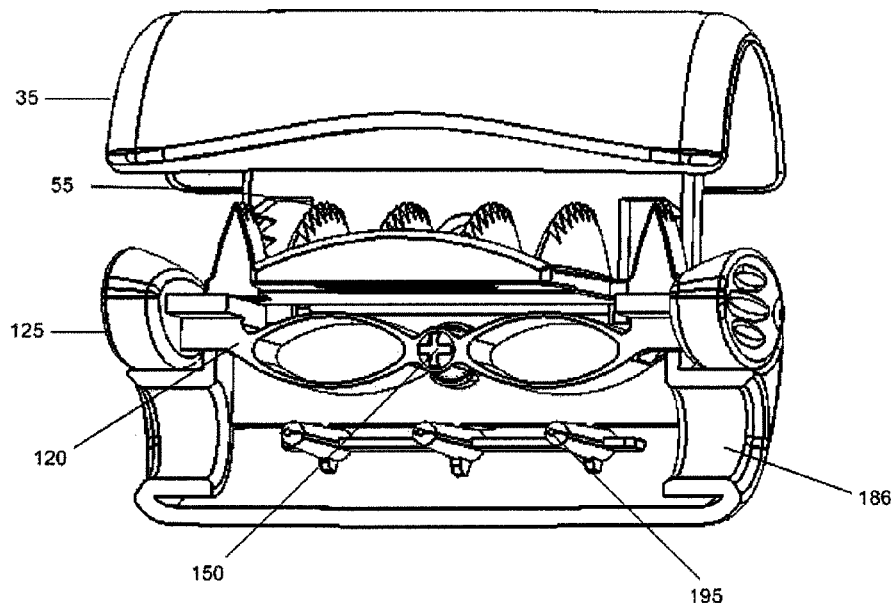
FIG. 12 shows a perspective view of the device of FIG. 1 with the second element removed.
Figure 13:
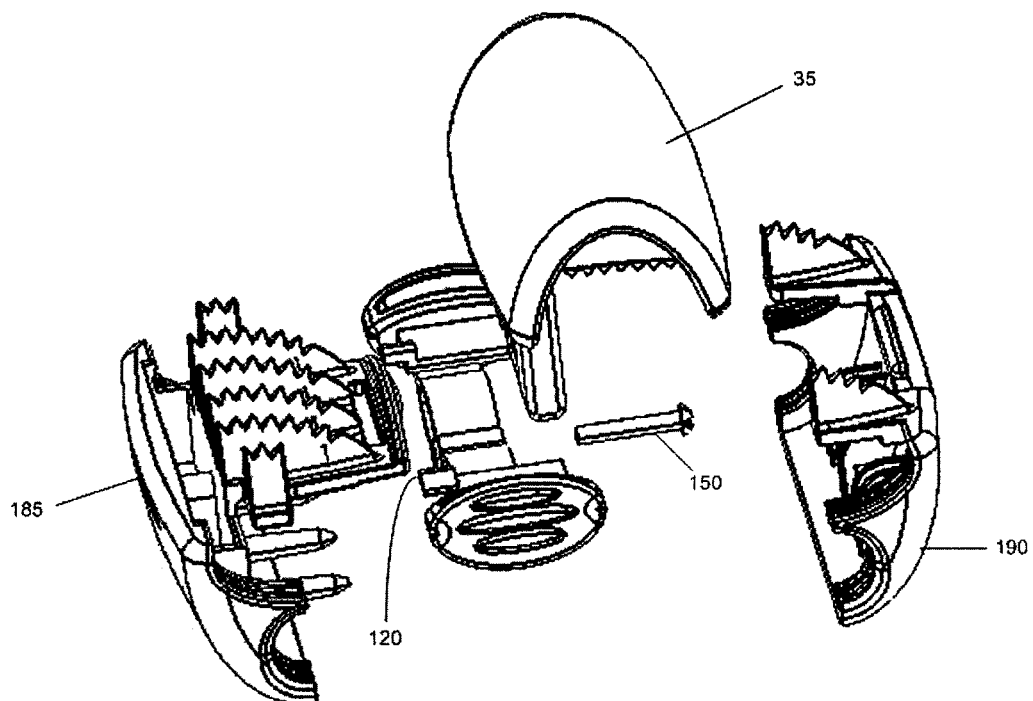
FIG. 13 shows an exploded perspective view of the device of FIG. 1.
Figure 14:
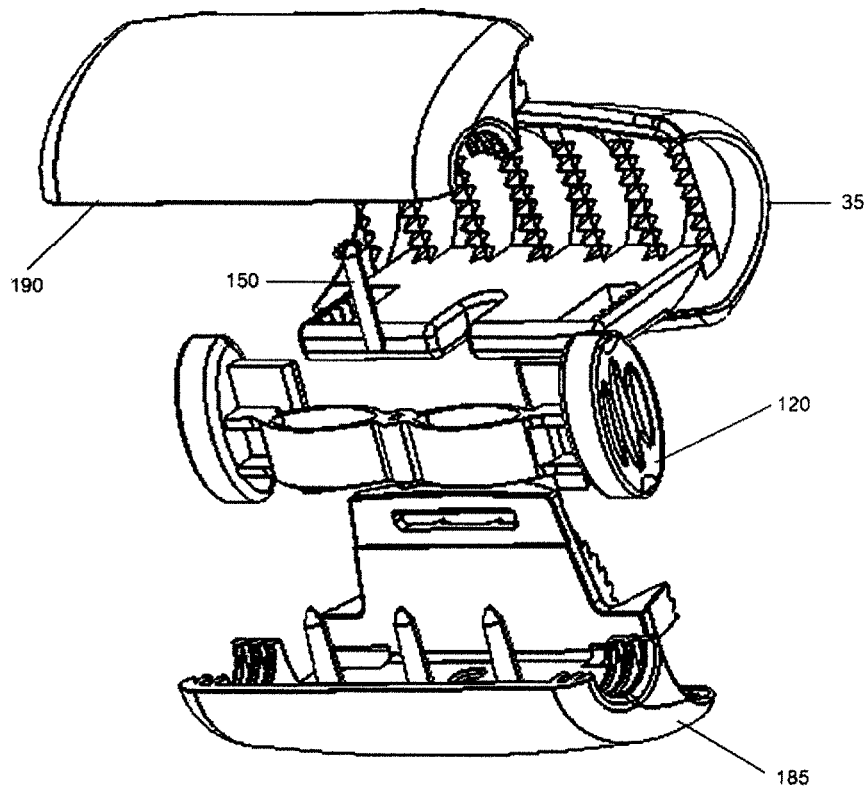
FIG. 14 shows a further exploded perspective view of the device of FIG. 1.
Figure 15:
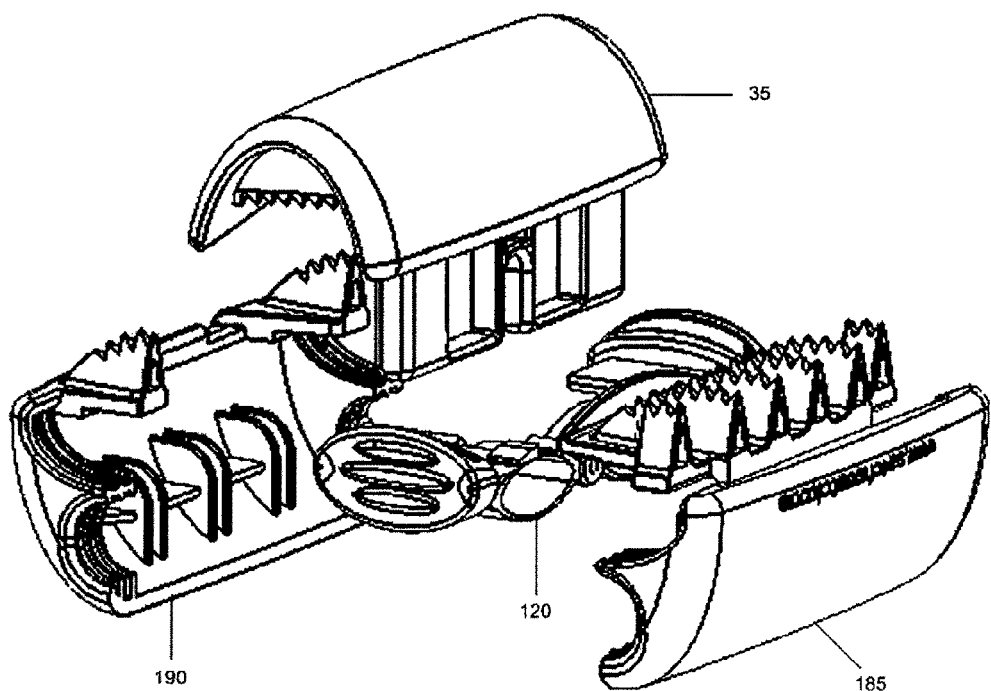
FIG. 15 shows a further perspective exploded view of the device of FIG. 1.
Figure 16:
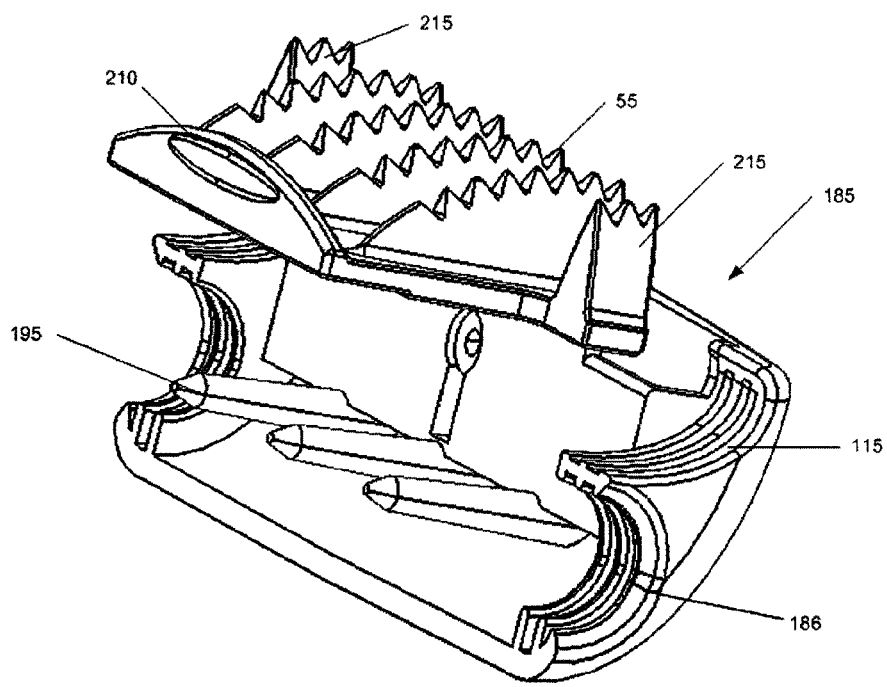
FIG. 16 shows a perspective view of the first element of the device of FIG. 1.

As shown in FIGS. 2 and 10, the second clamping member 40 includes a second engagement arrangement 80 which retains the second securing assembly 177 in the secured position until actuation of an actuator 205. Actuation of the actuator 205 causes the engagement arrangement 80 to disengage, allowing the second securing assembly 177 to move from the secured position to the unsecured position. The engagement arrangement 80 can be provided in the form of a push or pull tab arrangement 210, wherein actuation of the push or pull tab 210 causes a slot and protrusion, located on the first and second element respectively, to disengage.

Referring to FIGS. 5 and 6, the first and second elements 185, 190 can include first and second rib portions 215, 220. When the second securing assembly 177 is placed in the secured position, the first and second elements 215, 220 butt against one another, causing first and second portions of the ribs 215, 220 to also butt against each other to form a complete rib 55. When the second securing assembly 177 moves from the secured position to the unsecured position, the first and second portions 215, 220 of each separable rib separates. The second portion of the rib 220 located on the second element 190 has a profile which is able to clear the lip 65 of the first clamping member 35 when rotated.

Figure 46:
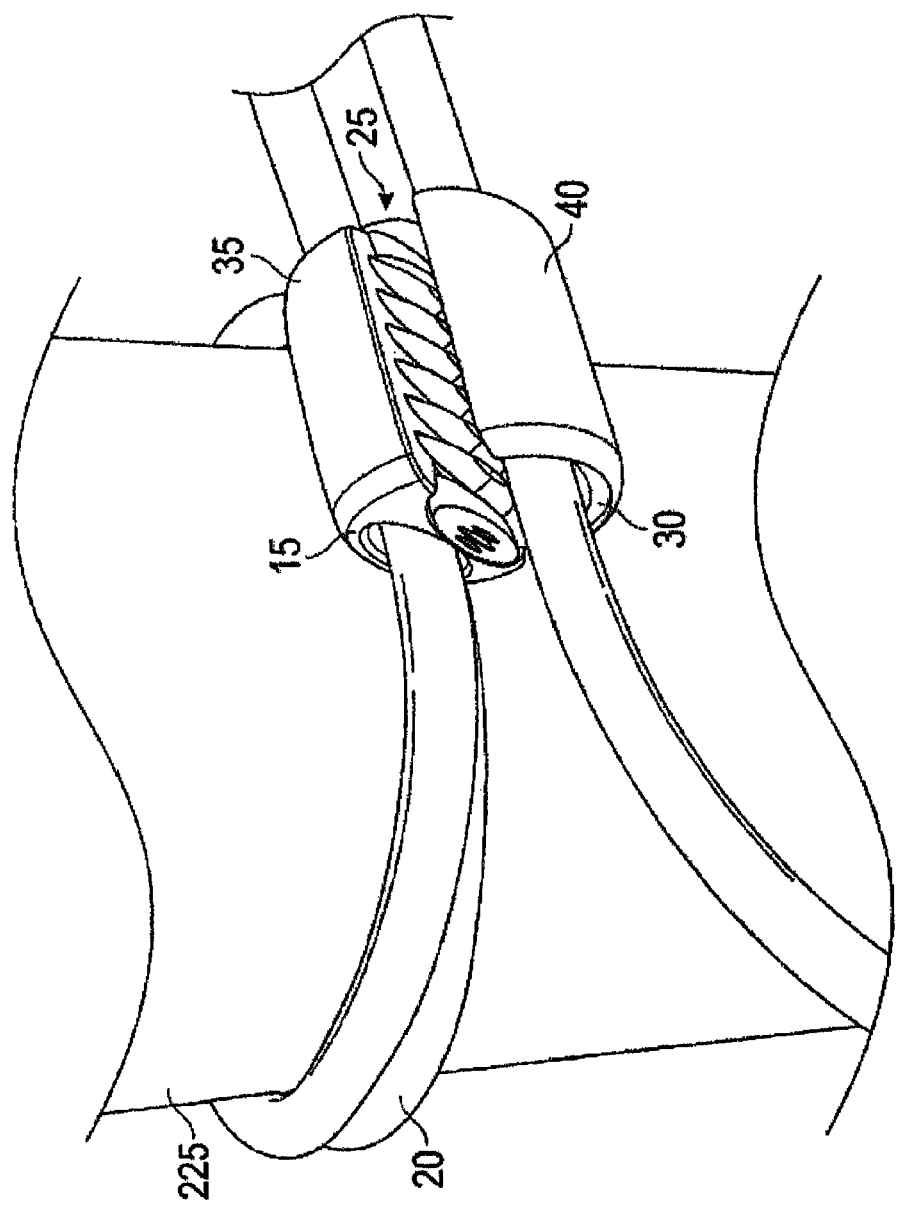
FIG. 46 shows a perspective view of the device of FIG. 37 in use whilst in the unsecured position.
Figure 47:
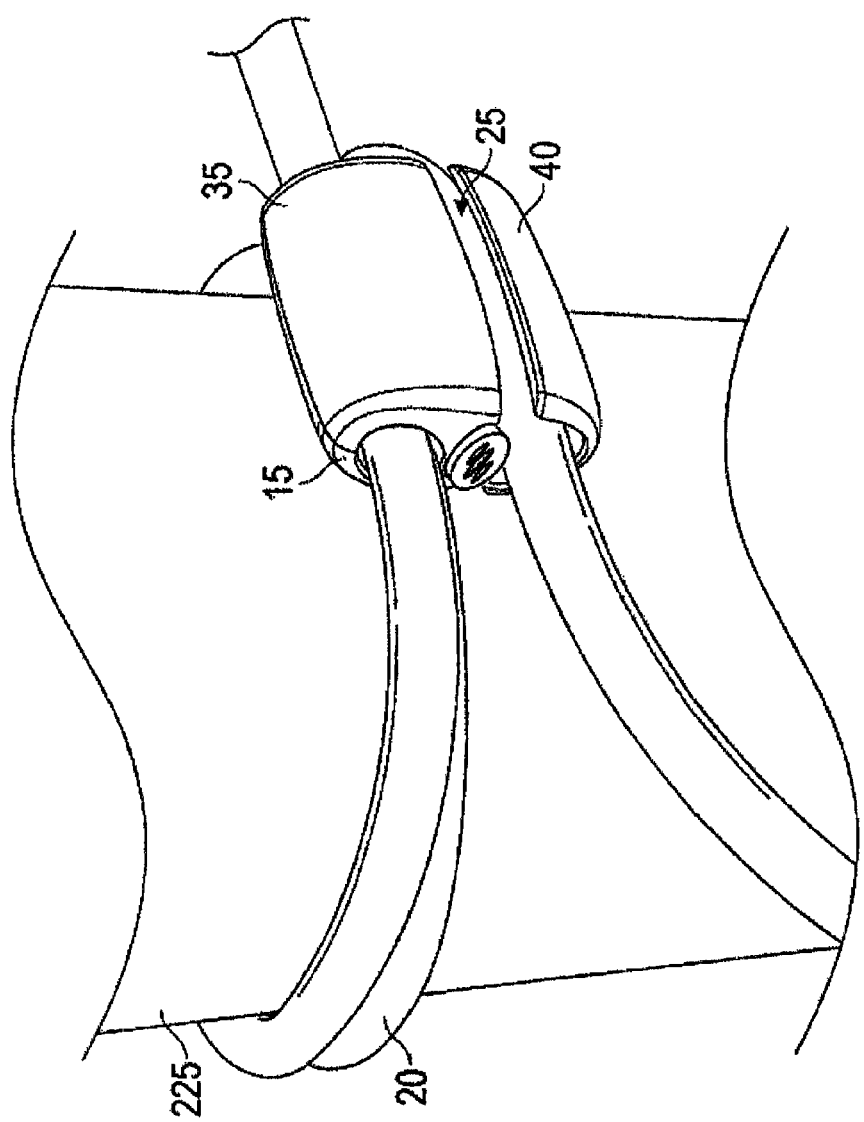
FIG. 47 shows a perspective view of the device of FIG. 37 in use whilst in the secured position.
Figure 48:
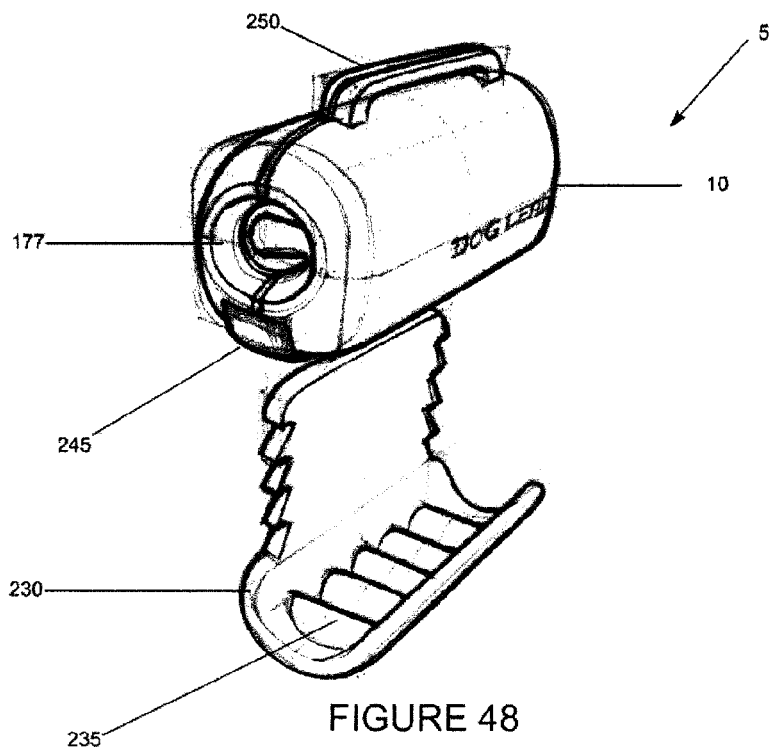
FIG. 48 shows a perspective view of another example securing device with a retractable hooked arm.
Figure 49:
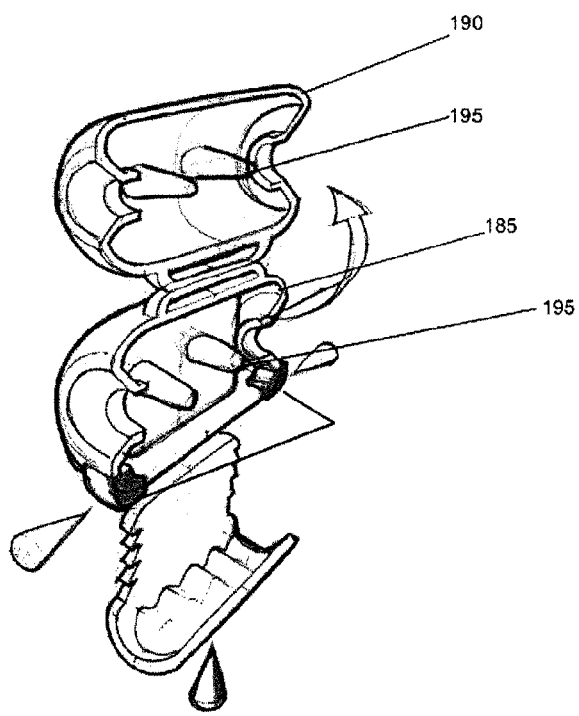
FIG. 49 shows a perspective view of the device of FIG. 48 wherein the second securing assembly is positioned in an unsecured position.
Figure 50:
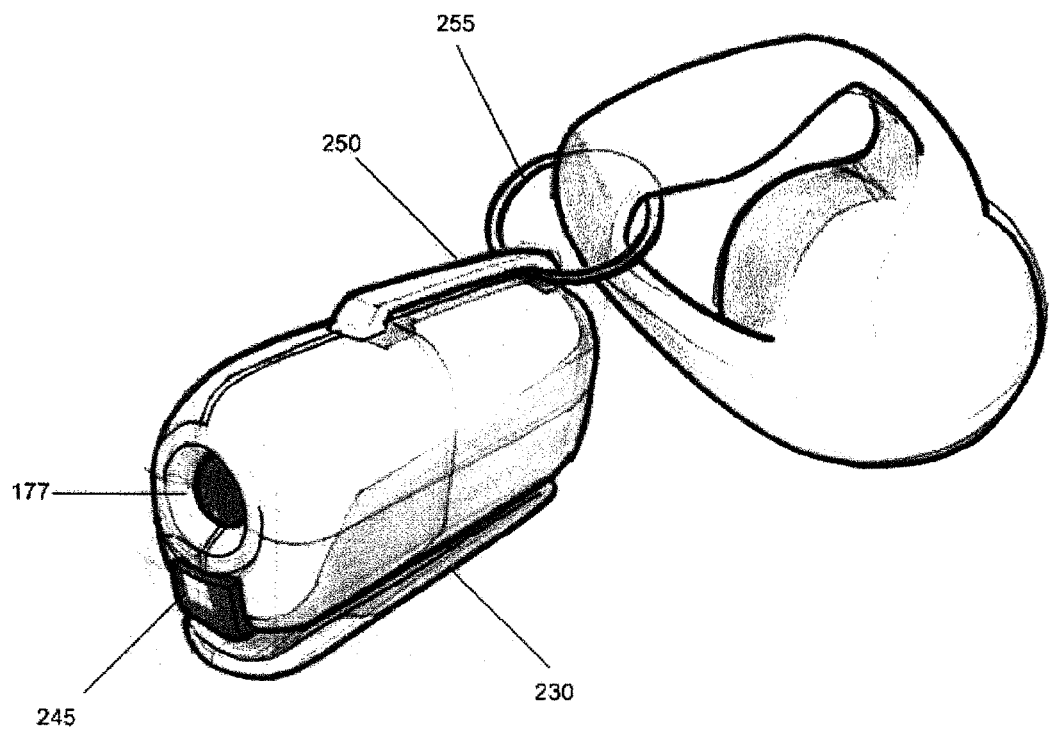
FIG. 50 shows a perspective view of the device of FIG. 48 attached to an object via a handle portion.
Figure 51:
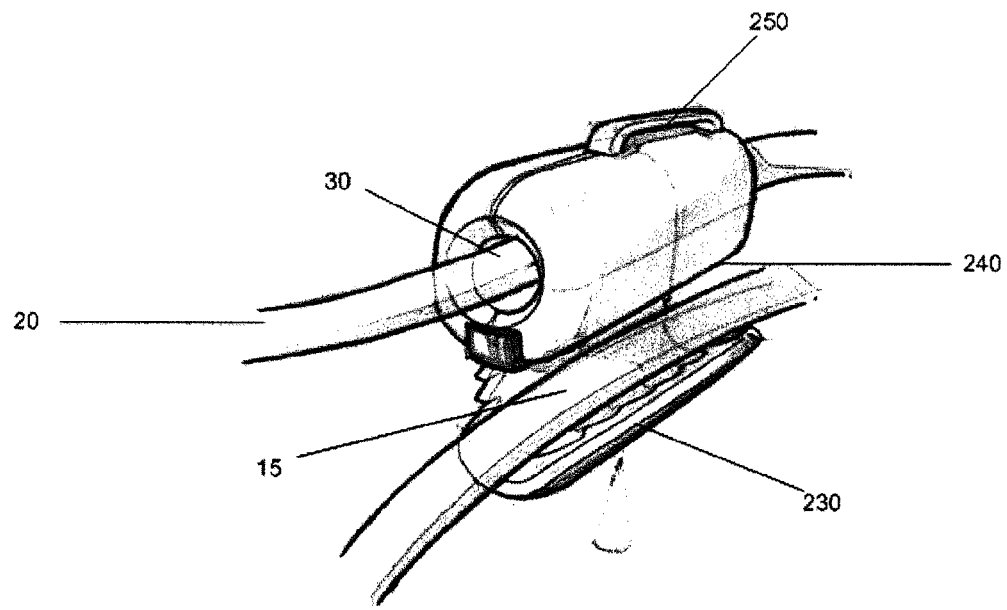
FIG. 51 show a perspective view of the device of FIG. 48 wherein the first securing assembly is in the unsecured position.
Figure 52:
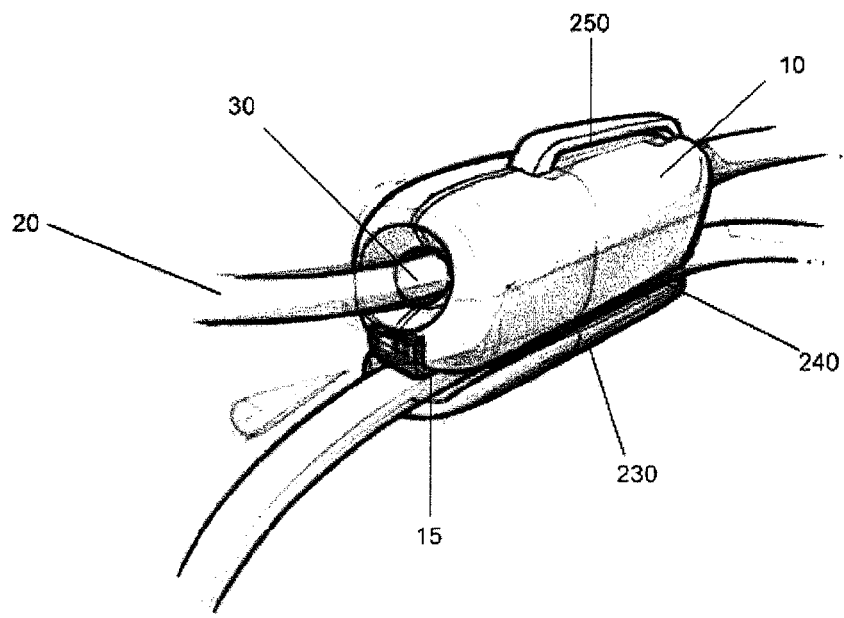
FIG. 52 shows a perspective view of the device of FIG. 48 wherein the first securing means is in the secured position.
Figure 53:
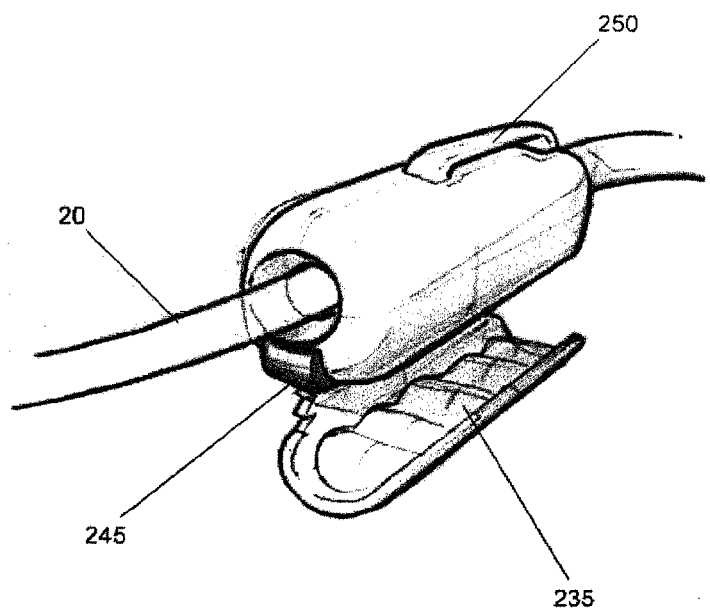
FIG. 53 shows a perspective view of the securing device of FIG. 48 wherein the second securing assembly is in the secured position retaining a first portion of the restraint.

In use, the restraint 20, whilst generally coupled to the body 10 of the device 5, can be wrapped around an object 225, such as a street post or pole, as illustrated by example in FIG. 46, to thereby encircle the object 225. The second portion 30 of the restraint 20 can then be positioned within the jaw 45 of the first securing assembly 25, such that the first clamping member 35 and second clamping member 40 receive a squeezing force from the user's hand in order for the first securing assembly 25 to clamp the second portion 30 of the restraint 20 positioned within the jaw 45, as shown in FIG. 47.

In one variation, as shown with reference to FIGS. 48 to 53, the device 5 may include a hooked arm 230 which withdraws and/or retracts relative to and from the body 10 of the device 5. The hooked arm 230 includes a plurality of teeth which operate in a similar manner as described earlier in relation to the ratchet and paw assembly such as to allow incremental withdrawal and retraction of the hooked arm 230 from the device 5.

Figure 45:
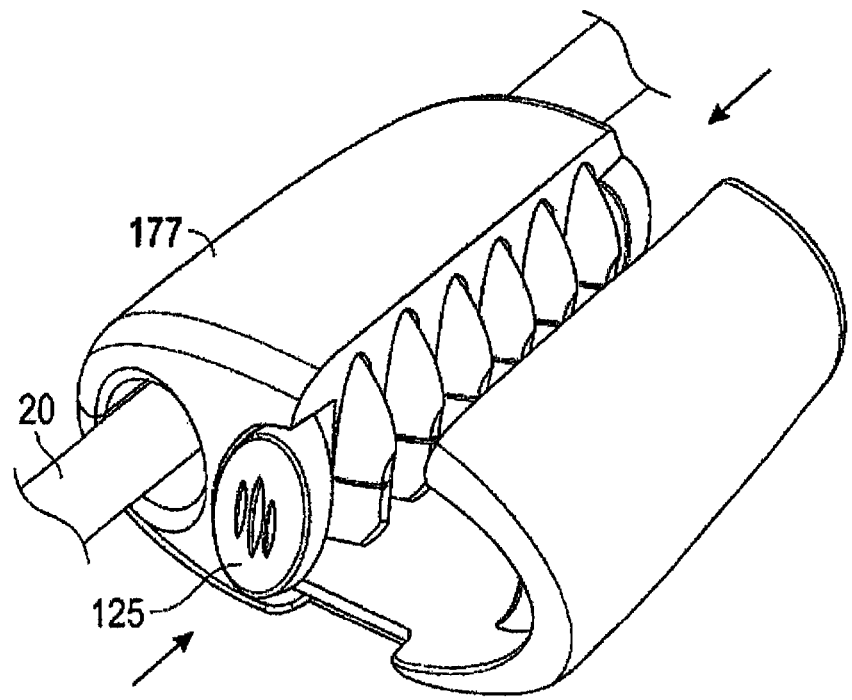
FIG. 45 shows a perspective view of the device of FIG. 37 wherein the second securing assembly is in the secured position.

The hooked portion of the retractable arm 230 includes a ridged surface 235 to facilitate retention of the restraint 20 which is clamped between the hooked arm 230 and the surface 240 of the body 10 which is adjacent the hooked arm 230 in a retracted state. In this manner, the hooked arm 230 and the surface 240 of the body 10 form the first securing assembly 25. The body 10 includes an actuator 120 which is actuable to allow the withdrawal and/or retraction of the hooked arm 230. The body 10 also includes a second securing assembly 177 similar to that discussed above wherein the second securing assembly 177 includes a first element 185 and second element 190 which are rotatably moveable relative to one another, via a hinge 180. The hinge 180 in this example forms a handle portion 250 which can be attached to various objects, as illustrated in FIG. 45 with relation to a ring 255.

Figure 54:
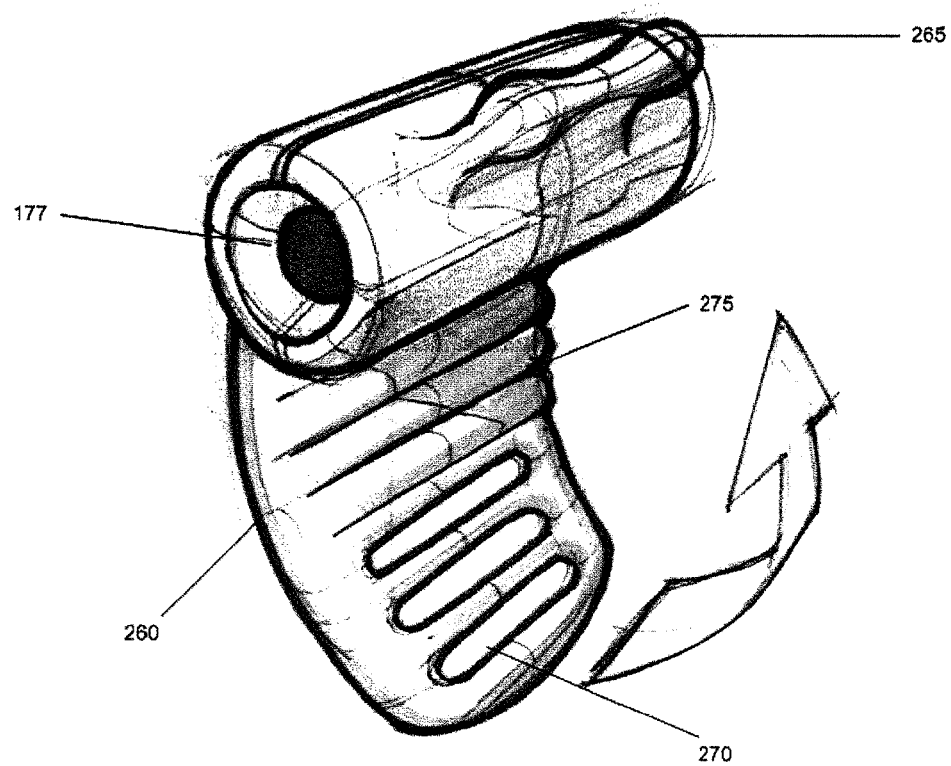
FIG. 54 shows a further example of a securing device including a wrappable arm in an unsecured position.
Figure 55:
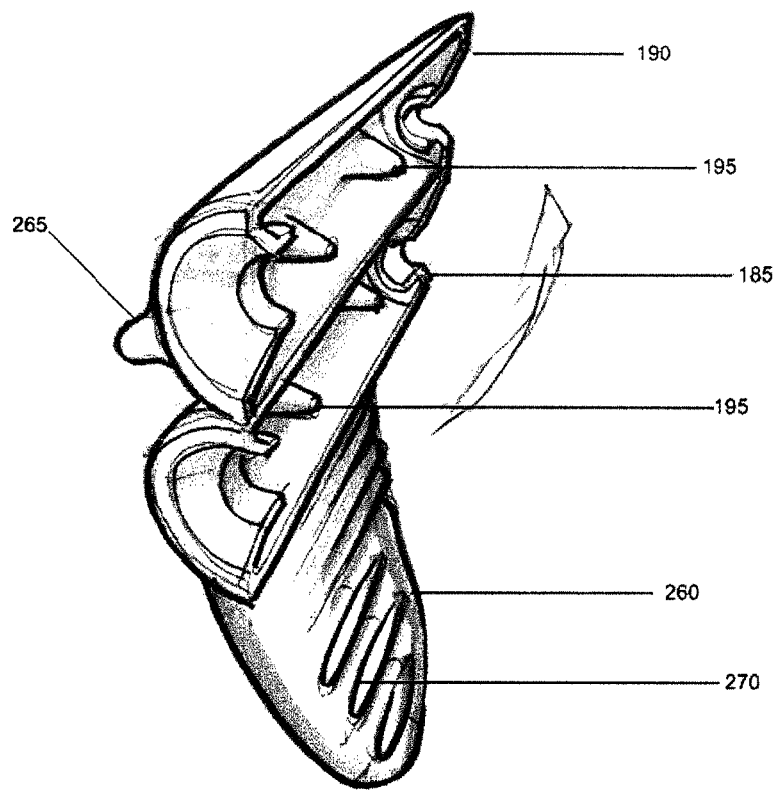
FIG. 55 shows a perspective view of the device of FIG. 54 wherein the second securing assembly is in the unsecured position.
Figure 56:
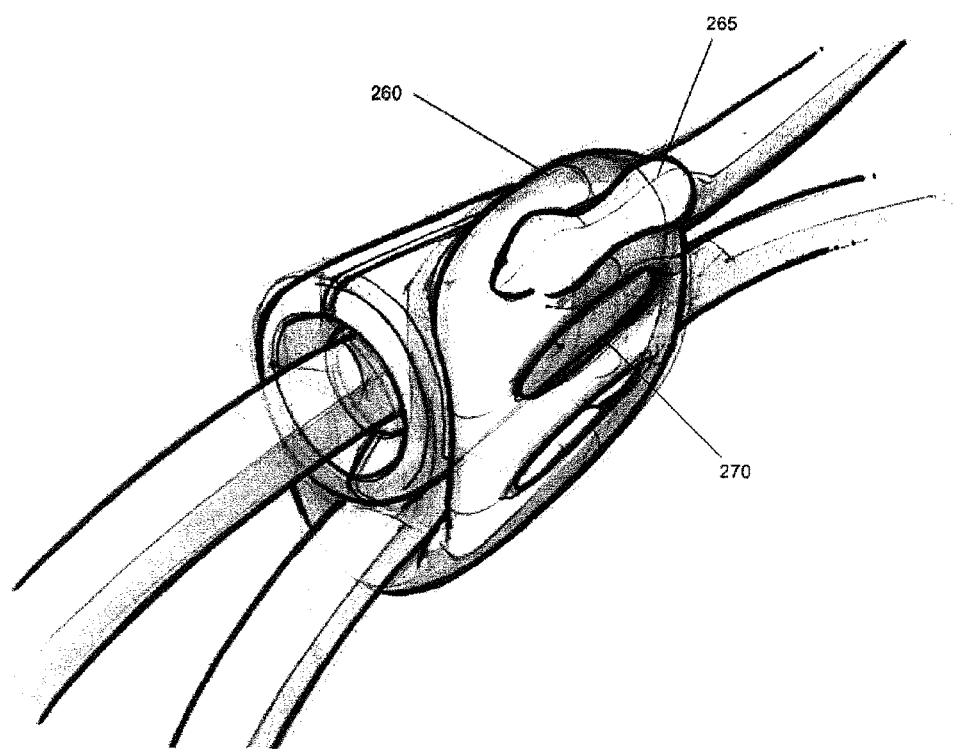
FIG. 56 shows a perspective view of the securing device in use securing a first and second portion of a restraint.

In a further alternate embodiment, as shown in FIGS. 54 to 56, the device 5 can include a wrappable arm member 260 which secures the second portion 30 of the restraint 20 by wrapping around and encircling the second portion 30 of the restraint 20. The wrappable arm 260 is then secured to a protrusion 265 extending from the body of the device 5. The wrappable arm 260 can include a number of apertures 270 which the protrusion 265 can cooperate therewith in order to clamp the second portion of the restraint against the surface 240 of the body 10. The wrappable arm 260 may be elastic such as to elastically deform in order to allow the protrusion 265 to be received via one of the apertures 270 provided by the wrappable arm 260. A portion of the arm includes ridges 275 which run parallel to the longitudinal axis of the device 5 to facilitate the retention of the second portion 30 of the restraint 20.

Figure 57:
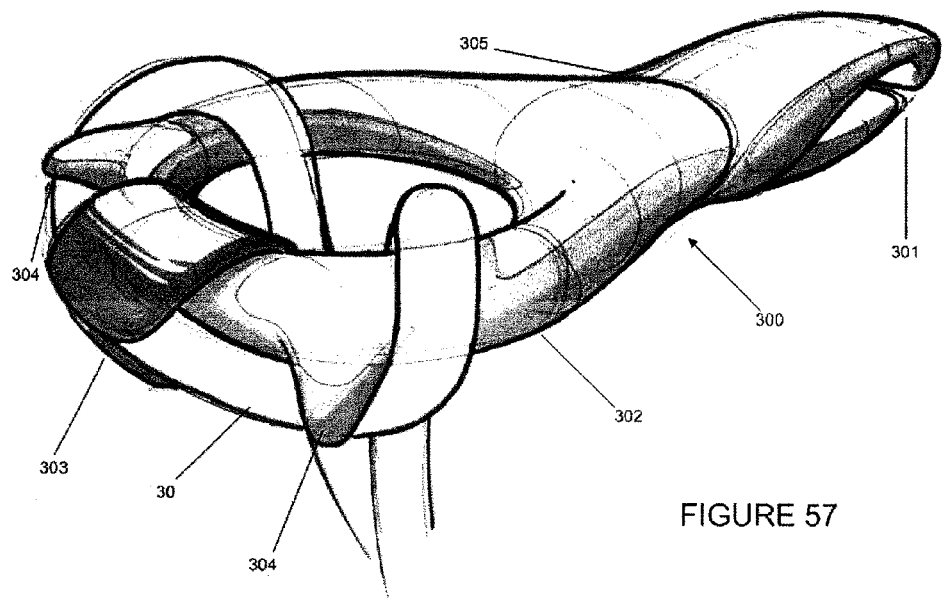
FIG. 57 shows a perspective view of another example of a securing device.
Figure 58:
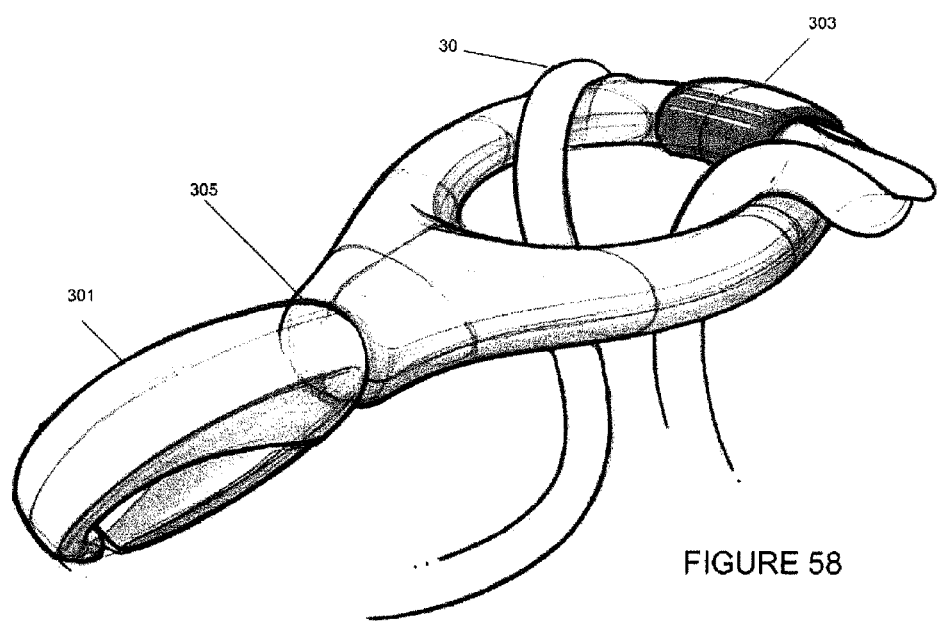
FIG. 58 shows another perspective view of the securing device of FIG. 57.
Figure 59:
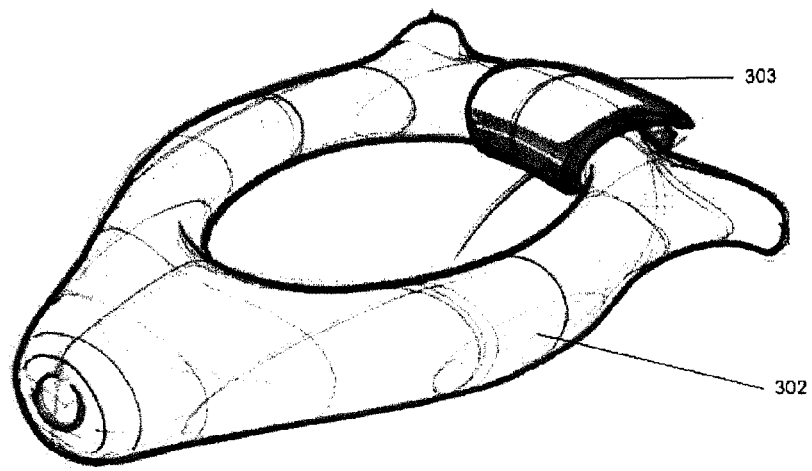
FIG. 59 shows another perspective view of the securing device of FIG. 57.

FIGS. 57 to 59 show a further example of a securing device. In particular, the securing device of these diagrams includes a body 300 having a claw element 301 which receives therethrough a first portion of the restraint. The claw element 301 is configured to slide along a length of the restraint. At an opposing end of the body 300 of the securing device is a looped section 302. The looped section 302 includes one or more protruding members 304. The securing device also includes a clipping element 303 which is coupled to a portion of the looped section 302, wherein the clipping element 303 defines a receiving mouth that receives therethrough a second portion 30 of the restraint.

The looped section 302 and claw element 301 are rotatably moveable relative to each other as shown in relation to FIGS. 57 and 58 via a swivel connection 305. The protruding members 304 each have a pointed profile to help retain the restraint in use.

Figure 60:
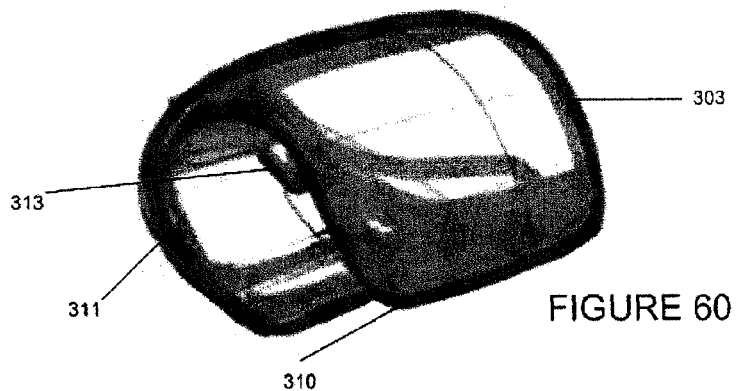
FIG. 60 shows a perspective view of a clipping element separated from the securing device of FIG. 57.
Figure 61:
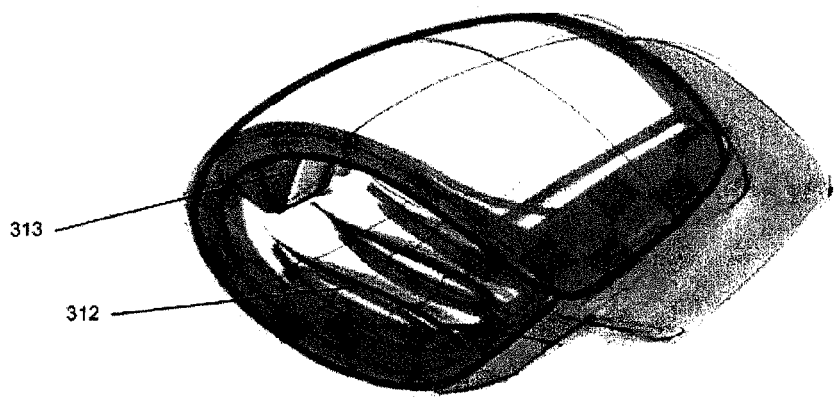
FIG. 61 shows a further perspective view of the clipping element of FIG. 60.
Figure 62:
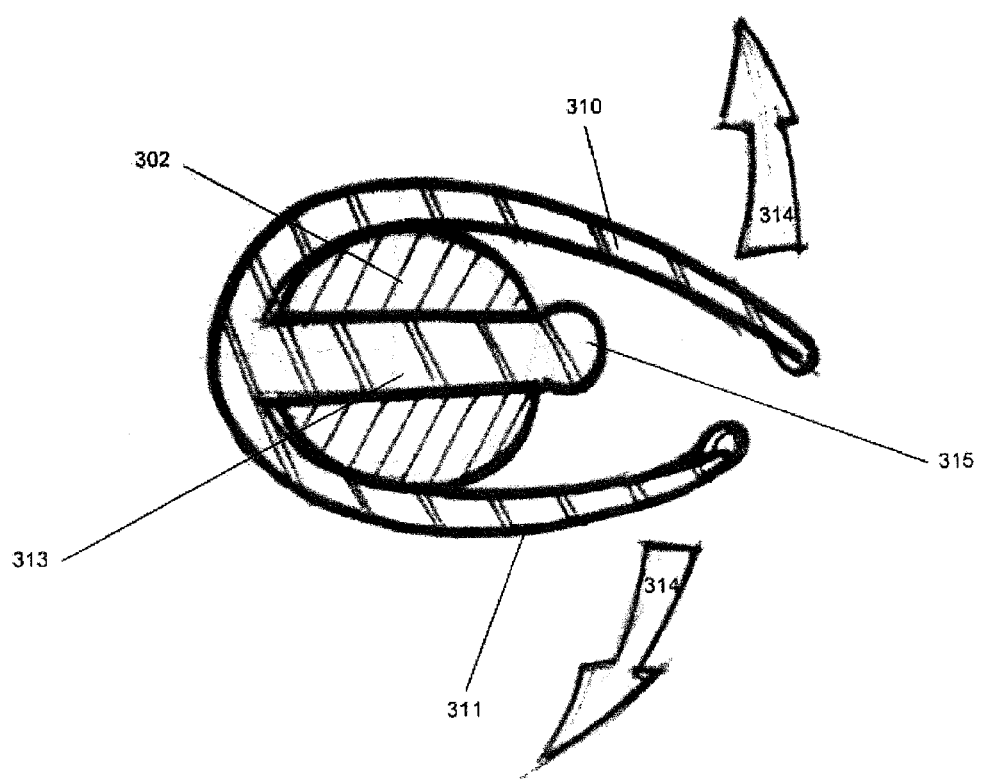
FIG. 62 shows a cross-sectional side view of the a portion of the securing device of FIG. 57.

Referring to FIGS. 60, 61 and 62, the clipping element 303 includes a pair of arms 310, 311 which retain the restraint within the mouth. The arms 310, 311 can be separated as shown by arrows 314 in FIG. 62 such that the restraint can be removed from the mouth of the clipping element 303. The arms 310, 311 are resilient and return to the position as shown in FIG. 62. The clipping element 303 includes a protruding member 313 which extends from a joining section between the arms 310, 311, wherein the protruding member 313 protrudes through an aperture of a portion of the looped section 302 in order to retain the clipping element 303 in position on the looped section 302. The protruding member 313 includes a small bulb 315 which is deformable so as to allow the protruding member 313 to protrude through the portion of the looped section 302 and return to original shape so as to facilitate retention of the clipping element 303 in position on the looped section 302. The clipping element also includes a series of ridges 312 on the inside surface of the arms 310, 311 of the clipping element to help retain the restraint.

In use, a first portion of the restraint is received through the claw element 301. Next, the portion of the restraint protruding from the claw element 301 is wrapped around a stationary object such as a telephone pole or the like. Then, a second portion of the restraint is hooked over the protrusions 304 of the looped section 302, wherein the clipping element 303 secures some of the second portion 30 of the restraint located between the protrusions 304.

Figure 63:
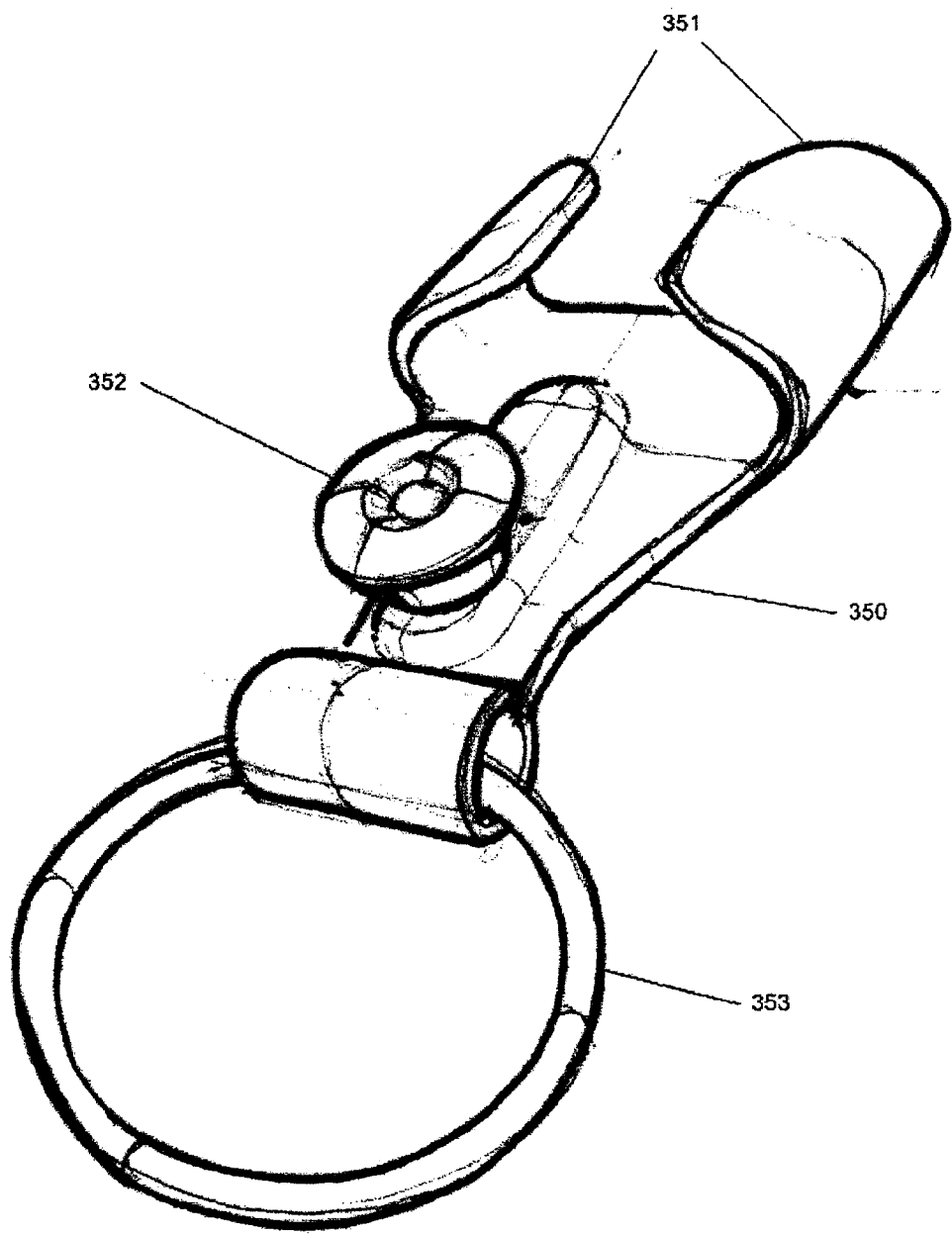
FIG. 63 shows a perspective view of a further example of a securing device.
Figure 64:
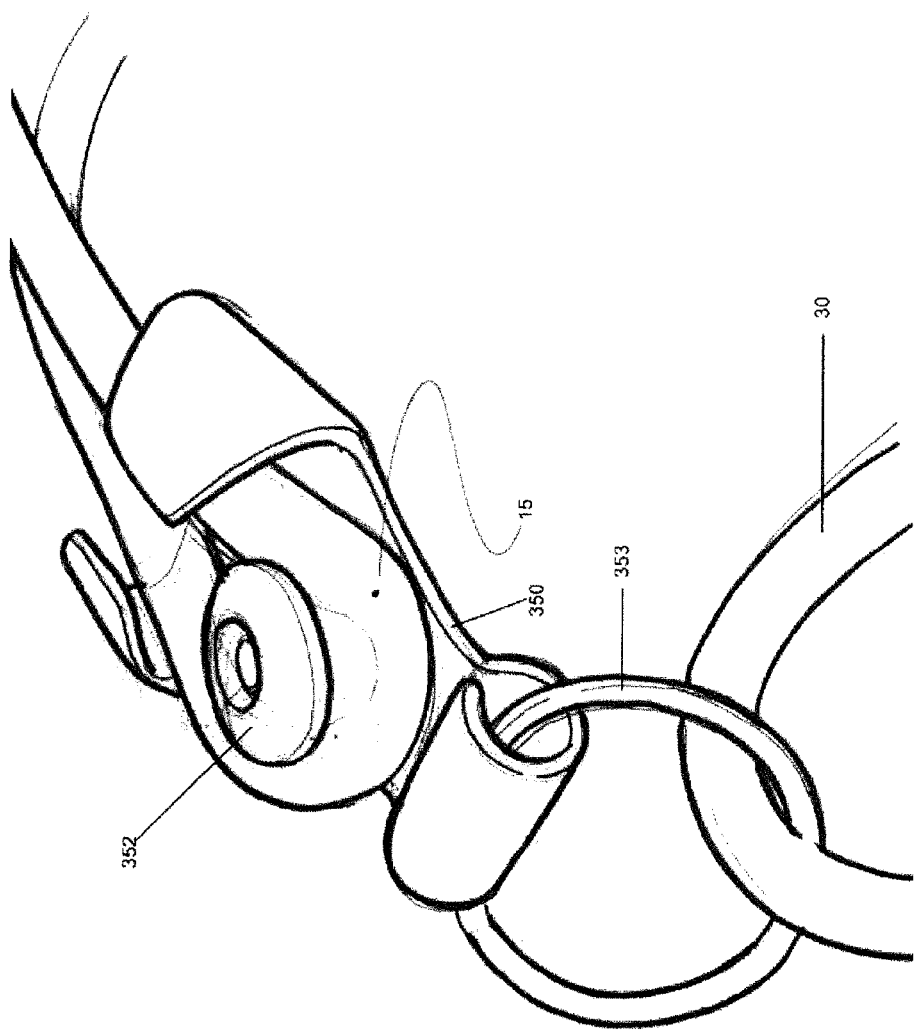
FIG. 64 shows another perspective view of the securing device in FIG. 63 securing a restraint.

Referring to FIGS. 63 and 64 there is shown another example securing device for a restraint. In particular, the securing device includes a body 350 having at a first end a securing element in the form of a pair of deformable arms 351. Extending from the body 350 is a protrusion in the form of a button 352. At an opposing end of the body 350 is a looped section in the form of a ring 353 which is pivotally secured to the body 350.

In use, as shown in FIG. 64, a first portion of the restraint 15 protrudes through an opening between the deformable arms 351, wherein the first portion of the restraint 15 is wrapped around the button 352. Then the deformable arms 351 are folded over to releaseably secure the first portion of the restraint 15. Next, the portion of the restraint protruding from the deformable arms is wrapped around a stationary object such as a telephone pole or the like. Then, a second portion of the restraint 30 is threaded through the ring element 353 such as to secure the restraint to the stationary object using the securing device.

The above mentioned restraint 20 may be a pet restraint, such as a dog lead or any other similar type of pet restraint.

In an alternate embodiment, it will be appreciated that although the device 5 can include a second securing assembly 177 to secure the first portion 15 of the restraint 20, this is not essential. In one embodiment, the restraint 20 and body 10 are integrally formed such that the body is integrally coupled to the first portion 15 of the restraint 20.

The securing device 5 may be manufactured from polypropylene material. However, it will be appreciated that other rigid and inexpensive materials could be used for the manufacture of the securing device 5.

Although the above examples have been described in relation to tethering a restraint 20, such as a leash, to a stationary object, such as a street post, it will be appreciated that the above securing device 5 can be used for a number of other applications. For example, the securing device 5 can be used to tightly secure a restraint 20, such as a rope, around a group of objects in order to retain the objects in a tightly bound group, such as a plurality of posts which are bound together via the securing device 5 and restraint 20.

Referring now to FIGS. 68, 69, 70, 71 and 72 there is shown a further embodiment of the securing device 5. In particular, the first clamping member 35 and the second clamping member 40 hingedly move relative to each other when moving between the secured and unsecured position. The first and second clamping element 35, 40 are hingedly coupled together via a hinge 6800. The hinge 6800 includes a pair of pins 6801, 6802 which extend from an edge of the first clamping member which cooperate with and extend within a pair of pin receiving portions 6803, 6804. The pair of pins 6801, 6802 are able to freely rotate within the a pair of pin receiving portions 6803, 6804, thereby enabling hinged movement of the first clamping member 35 with respect to the second clamping member 40.

Figure 68:
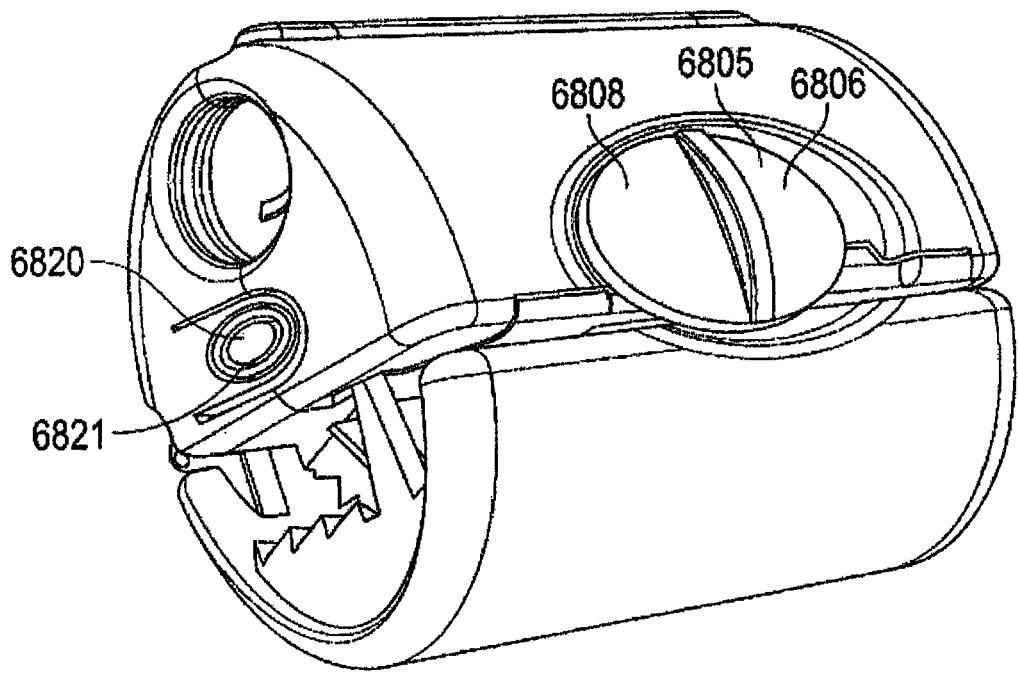
FIG. 68 shows a perspective view of another example of a securing device in a secured position.

The second clamping member 40 includes an actuator 6805 provided in the form of a slidable button 6806 which is moveable parallel with the longitudinal axis of the securing device 5. The slidable button 6806 includes a pair of arms 6807 which extend from the operable surface 6808 of the button 6806. When the first and second elements 185, 190 are moved to the closed position as shown in FIG. 68, the pair of arms 6807 align with apertures 6810 in the clamping surface of the second clamping member 3510, thereby forming a pair of finger receiving apertures 6812. The first clamping member 4035 includes a pair of locking fingers 6813 which extend resiliently from an edge surface of the first clamping member 35. Each locking finger 6813 includes a lug 6814 which extends outwardly from a body portion 6815 of each locking finger 6813.

When the first and second clamping members 35, 40 are hingedly moved with respect to each other so as to move the secured device 5 from the unsecured position to the secured position, the pair of locking fingers 6813 are aligned with the finger receiving apertures 6812, wherein the pair of locking fingers 6813 are received within the finger locking aperture 6812. Each lug 6814 of each locking finger clamps against and engages the arm 6807 of the button forming the finger receiving aperture 6812, thereby causing the first and second clamping members 35, 40 to be releasably locked and retained in the secured position.

Figure 69:
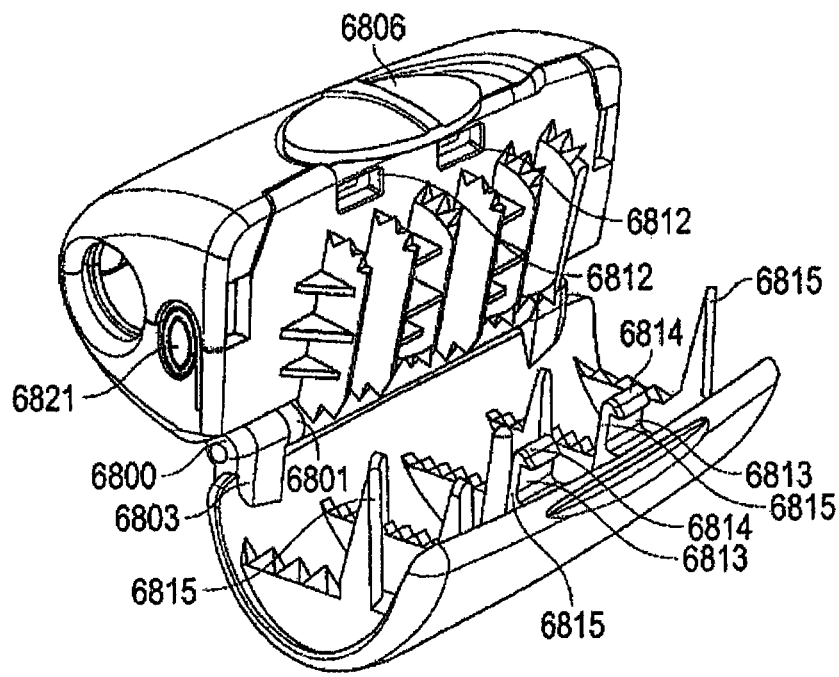
FIG. 69 shows a perspective the securing device of FIG. 68 in an unsecured position.
Figure 70:
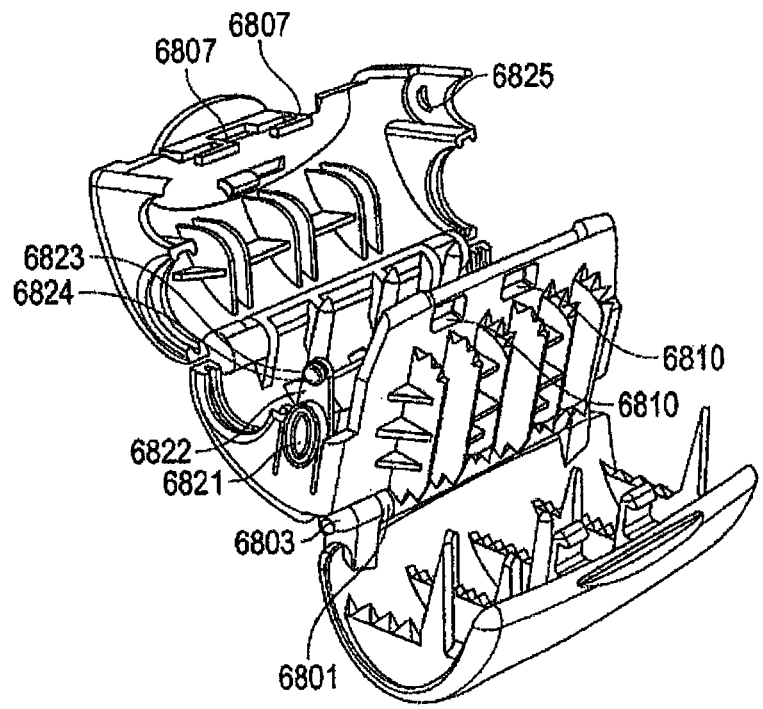
FIG. 70 shows a perspective view of the securing device of FIG. 68 where the first clamping member is in the open position.
Figure 71:
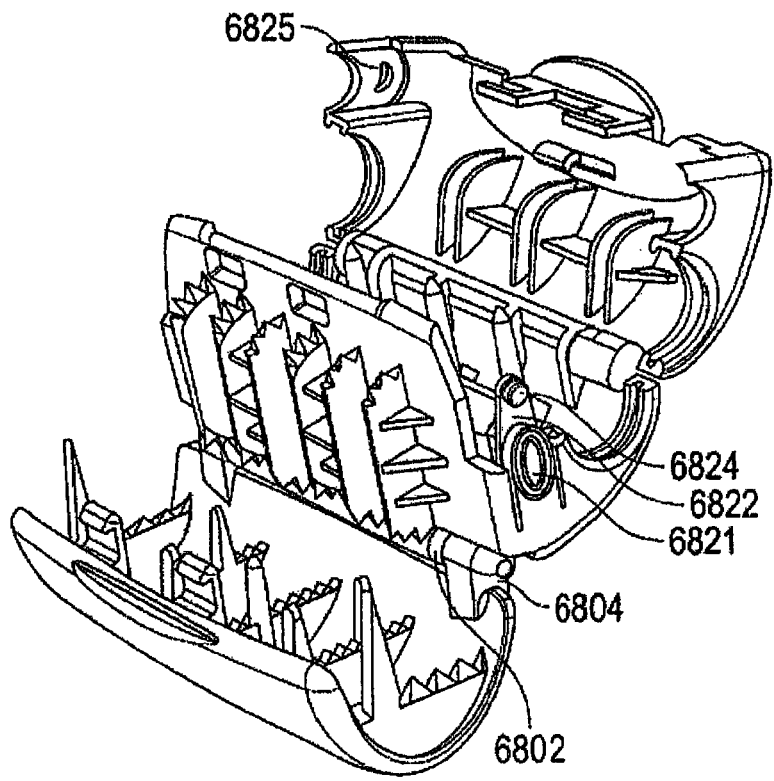
FIG. 71 shows another perspective view of the securing device of FIG. 68.
Figure 72:
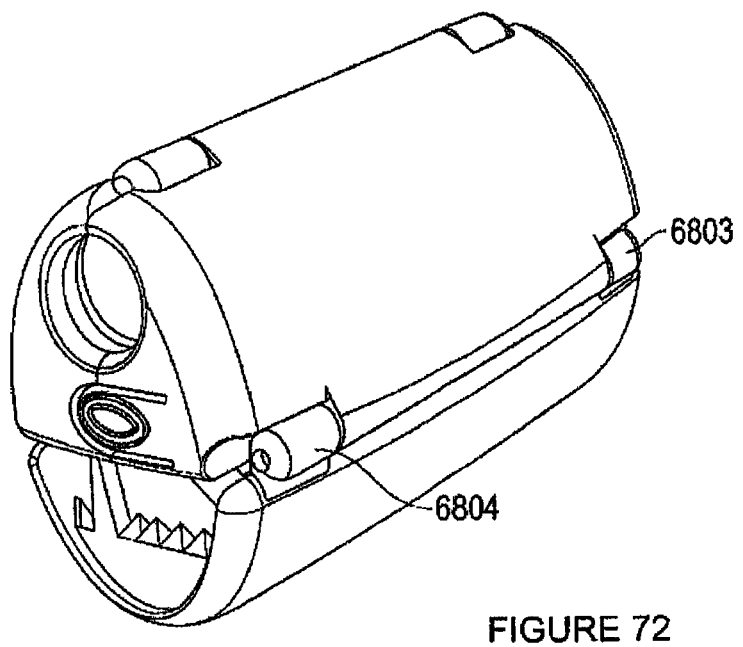
FIG. 72 shows a rear perspective view of the securing device of FIG. 68 in the secured position.

When the user operably slides the button 6806 in the direction parallel with the longitudinal axis of the securing device 5, the lug of each locking finger disengages from the arm 6807 of the button, thereby allowing the securing device 5 to hingedly move from the secured position to the unsecured position, as shown in FIGS. 69, 70 and 71.

As is apparent from FIGS. 69, 70 and 71, the clamping surface of the first clamping member 35 includes a pair of triangular members 6815, each triangular member 6815 being located at opposing ends of the clamping surface of the first clamping member 35. The triangular teeth 6815 are located and configured to grip the restraint when being secured.

As shown in FIGS. 70 and 71, the first element 185 of the first clamping member 35 can include a pair of actuators 6820, each actuator 6820 located at opposing ends of the first element 185. The actuator 6820 is provided in the form of a button 6821, wherein a pressing force can be applied by the user to each actuator 6820 to allow the first element 185 to disengage from the second element 190, thereby allowing the second clamping member 40 to be hingedly moved to an splayed position as shown in FIG. 71. Each actuator 6820 extends from the first element 185, wherein an arm 6822 resiliently extends from each actuator 6820. A distal end 6823 of each arm is provided with a lug 6824. An inside surface of each end of the second element 190 includes a lug receiving recess 6825. When the second element 190 is hingedly moved relative to the first element 185 to close the second clamping member 40, the lug 6824 of each arm 6822 is received by the respective lug receiving recess 6825 of the second element 190, thereby retaining the second clamping member 40 in the closed position as shown in FIG. 69. When each actuator 6820 is pressed, the actuator 6820 causes the respective lug 6824 to disengage from the lug receiving recess 6825, thereby allowing the first and second elements 185, 190 to hingedly move with respect to each other, as shown in FIGS. 70 and 71.

Referring to FIGS. 73 to 78 there is shown a further example of a securing device 5. Specifically referring to FIGS. 74 to 77, the securing device 5 includes a biasing mechanism 7400, provided in the form of a torsion spring, to bias the first securing assembly 25 from the secured position to the unsecured position once the locking arrangement 105 has been actuated and released.

Figure 76:
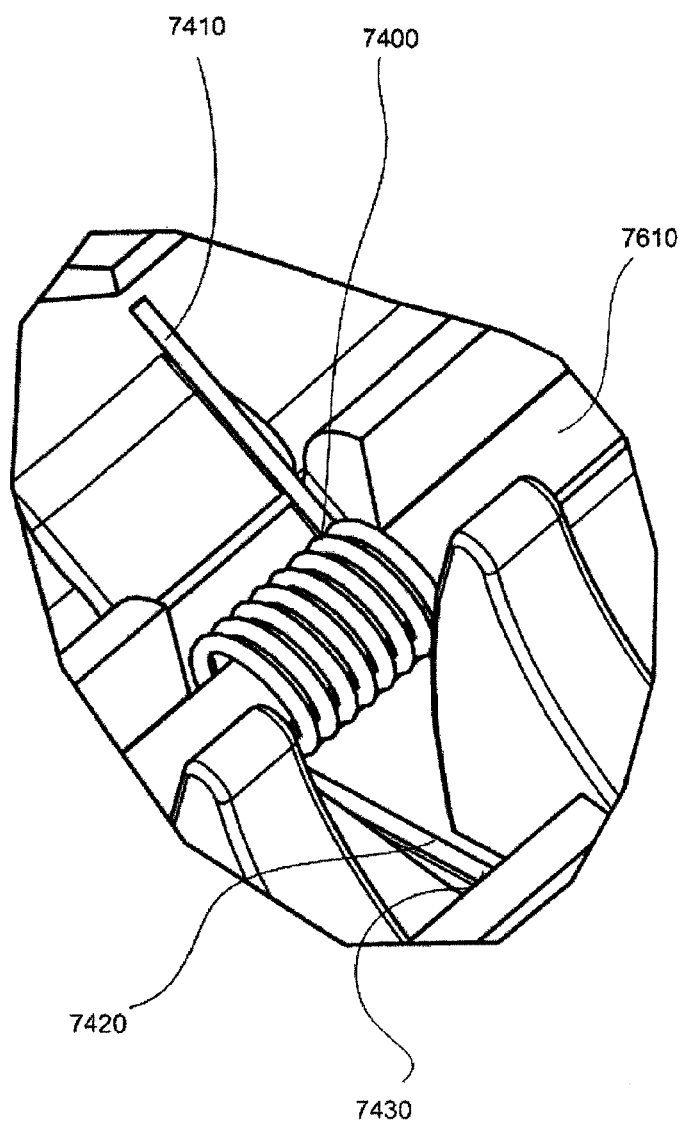
FIG. 76 is a magnified perspective view of a biasing mechanism shown in FIG. 75.

More specifically, the spring 7400 is provided in the form of a helical spring which has a first tail end 7410 of the helical spring resting and engaged against the first clamping member 35 of the first securing assembly 25. A second tail end 7420 of the helical spring rests against and engaged with a notch 7430 of the second clamping member 40 of the first securing assembly 25. As shown in FIG. 76, a hinge pin 7610 to allow the first and second clamping members 35, 40 to rotate relative to each other can be threaded through the axis of the spring 7400 in order to retain the spring 7400 in position. The first and second tail ends 7410, 7420 of the helical spring 7400 biases against the first and second clamping members 35, 40 of the first securing assembly 25 in order to hingedly bias the first securing assembly 25 from the secured position to the unsecured position upon unlocking the locking arrangement 105 of the securing device 5.

When the first and second clamping members 35, 40 of the first securing assembly 25 are hingedly moved toward each other, the biasing mechanism 7400 stores potential energy whilst the locking arrangement 105 retains the first securing assembly 25 in the retained position. Upon actuation of the actuator 7300, in the form of a button, the biasing mechanism 7400 exerts a force against the first and second clamping members 35, 40 due to the stored potential energy to hingedly bias the first securing assembly 25 apart and toward the unsecured position.

Figure 73:
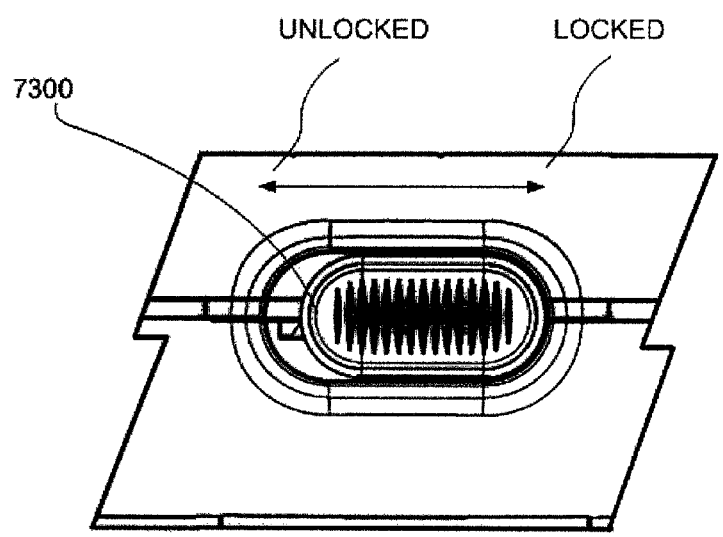
FIG. 73 shows a front view of a portion of the securing device including a slidable button.
Figure 74:
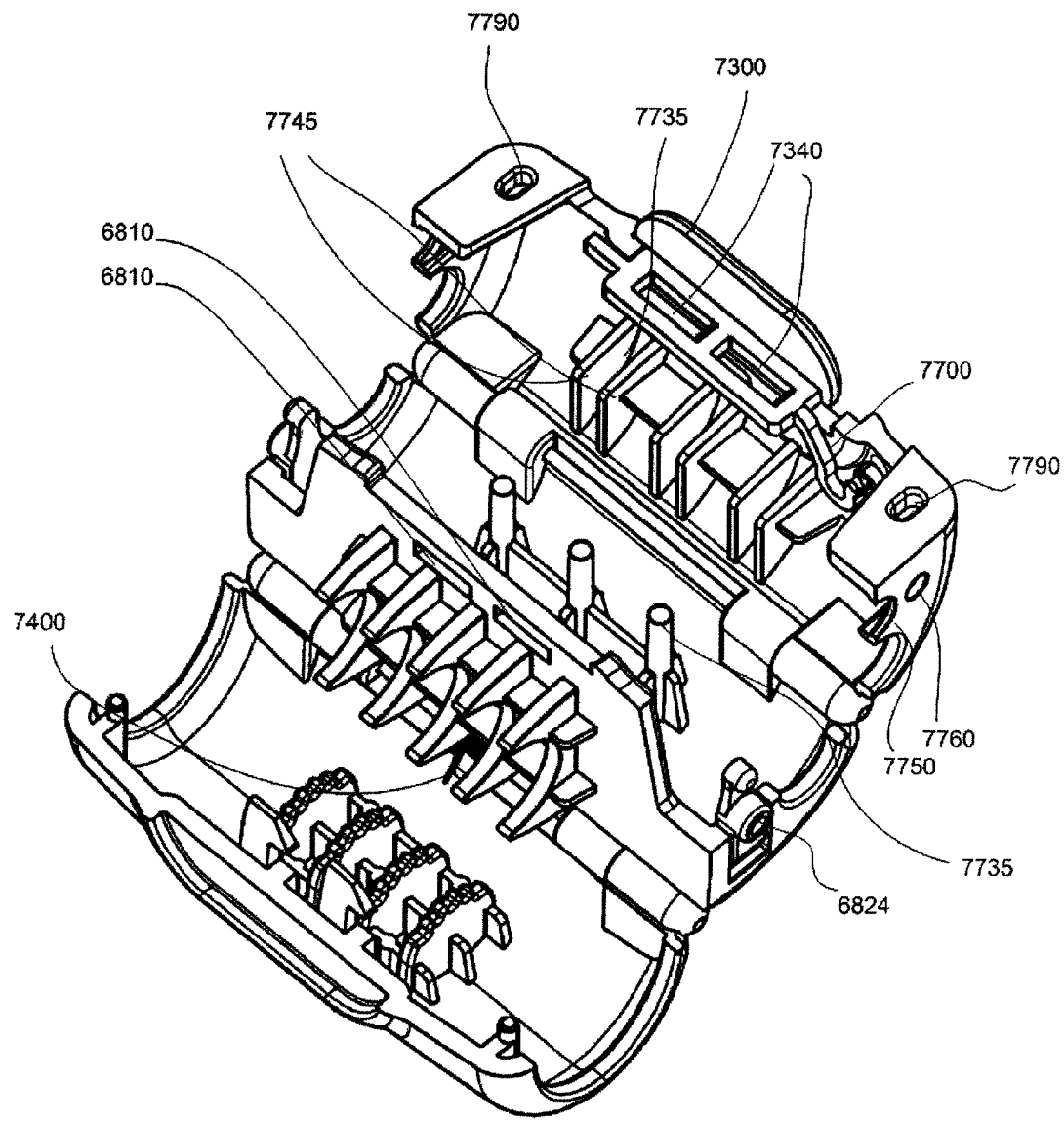
FIG. 74 is a perspective view of the securing device FIG. 73, wherein the first and second securing assembly are in an unsecured position.

Referring to FIGS. 73 and 74, the securing device 5 includes an alternate locking and actuator assembly to secure and unsecure the first securing assembly 25. Specifically, the actuator is provided in the form of a slidable button 7300 which coaxially moves relative to the longitudinal axis of the securing device 5. The button 7300 is slidingly coupled to the second element 190 via a lug which tight fittingly protrudes through an elongate aperture in the surface of the second element 190.

Figure 77:
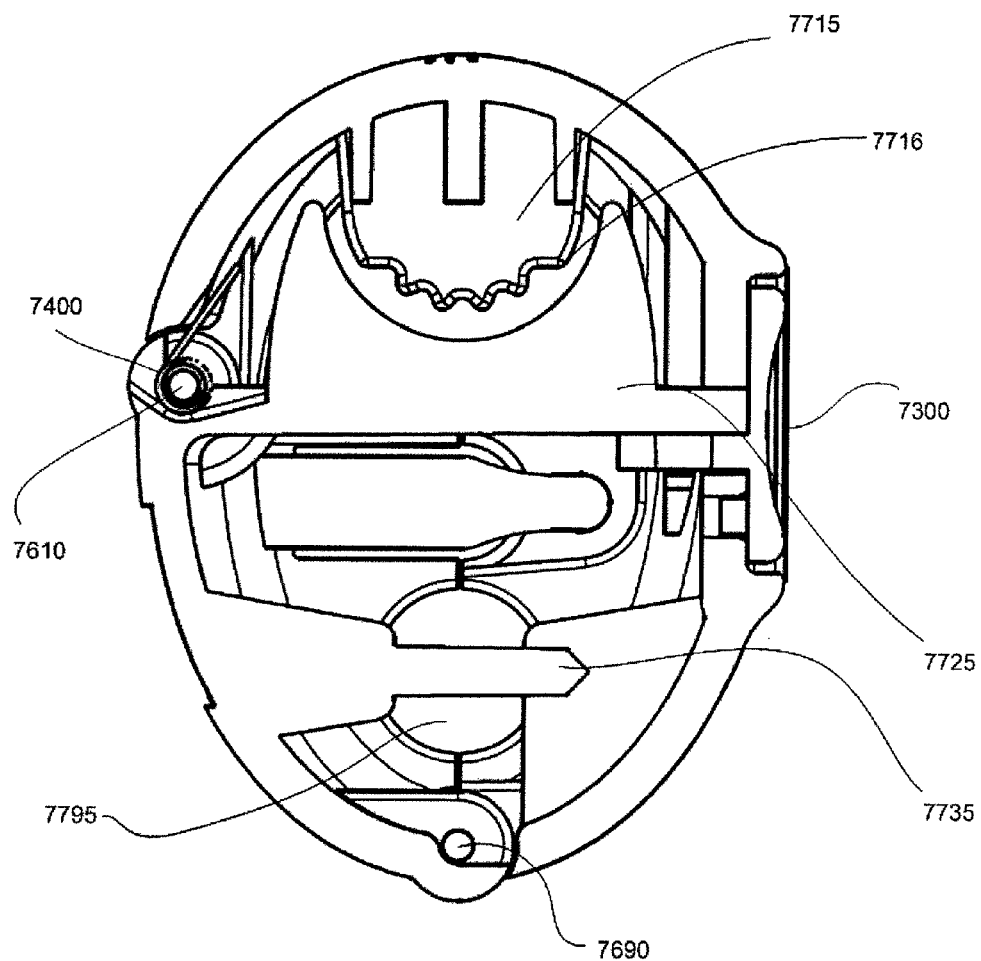
FIG. 77 is a cross-sectional view of the securing device along a line orthogonal to the longitudinal axis.

The button 7300 includes in an engagement member 7330 which extends inwardly from the button 7300 toward the longitudinal axis of the body. The engagement member 7330 includes one or more engagement apertures 7340 which form part of the finger locking aperture 6812 when aligned in combination with the apertures 6810 located in the second clamping member 40. As shown in FIG. 77, the engagement member 7330 is integral with the button 7300, such that when the button 7300 moves, the engagement member 7330 also moves in the same direction, and vice versa.

As shown in FIG. 74, a biasing element 7700 can be provided which is coupled between the button 7300 and the second element 190, wherein the biasing element 7700 biases the button 7300 coaxially with the longitudinal axis and toward a locked position. When the button 7300 is moved in a sliding manner away from the locked position to an unlocked position, the biasing element 7700 stores potential energy. Once the user removes force being applied to the button 7300, the biasing element 7700 urges the button to slide in an opposite coaxial direction due to the spring 7900 releasing the stored potential energy, wherein the button 7300 returns to a locked position. The biasing element 7700 is provided in the form of a leaf spring having a general 'V' shaped profile which is compressed between the button 7300 and a portion of the second element 190 upon actuation of the button 7300.

When the second securing assembly 177 is in the secured position, the apertures 6810 provided in the second clamping member 40 and the engagement apertures 7340 of the engagement member 7630 are located in an overlapping configuration. In this overlapping configuration, the apertures 7340, 6810 are partially aligned such that a portion of the engagement member 7330 overlaps the apertures 6810 of the second clamping member 40. The overlapping portion of the engagement member 7330 is configured to retain hook portions 7810 extending from the protruding locking members 7800 so as to retain the first securing assembly 25 in the secured position. When the button 7300 is in the locked position, the finger locking aperture 6812 has a smaller width relative to the hook portions 7810. In contrast, when the button 7300 is moved to the unlocked position, the finger locking aperture 6812 has a width that is larger relative to the hook portions 7810.

When the slidable button 7300 is actuated by a user, against the bias of the biasing element 7700 of the button, the button 7300 moves from the locked position to the unlocked position in a direction coaxial with the longitudinal axis of the securing device, wherein the apertures 7340, 6810 of the engagement member 7330 and the second clamping member 40 are more aligned, such as in substantially complete alignment, wherein the size of the finger locking aperture 6812 has increased due to the actuation of the button 7300. Due to the engagement member 7330 being integral with the slidable button 7300 and extending therefrom, the slidable movement of the button 7600 causes the engagement member 7630 to move out of engagement with the hook portions 7810 of the protruding locking members 7800, thereby allowing the protruding locking members 7800 to be freely removed from the aligned apertures 7640, 6810 to allow the first securing assembly 25 to move to the unsecured position.

When the first securing assembly 25 is moved from the unsecured position to the secured position by the user applying a squeezing force to the second clamping member 40 and the secured second securing assembly 177, the protruding locking members 7800 begin to protrude through the apertures 6810 of the first clamping member 40. The squeezing action can be applied using a single hand, thus allowing the first securing assembly 25 to be able to be secured using a single handed operation. Due to the slidable button 7300 being in the secured position due to the bias applied by the bias element 7700 of the button 7300, the hook portions 7810 of the protruding locking fingers 7800 are restricted from urging past the engagement member 7330 until the squeezing force applied by the user is greater than the bias element 7700 of the button 7300 as well as the bias mechanism 7400 of the first securing assembly 25. Once sufficient force is applied, an angled surface 7820 of each hook portion 7810 of the protruding locking members 7800 urge against and begin to displace the engagement member 7330 in a direction coaxial with the longitudinal axis, wherein the slidable button 7300 also moves in the same coaxial direction due to being integral with the engagement member 7330.

Due to the coaxial movement of the engagement member 7330, the apertures 6810, 7340 of the second clamping member 40 and the engagement member 7330 begin to more substantially align, such as being in substantially complete alignment, wherein the protruding locking fingers 7800 protrude through the apertures 6810, 7340 of both the second clamping member 40 and the engagement member 7340. Once the protruding locking members 7800 protrude through both sets of apertures 6810, 7640, the biasing element 7700 urges the button 7300 to move in an opposite coaxial direction relative to the longtitudinal axis and move toward the locked position, thereby causing a portion of the engagement member 7630 to again overlap the apertures 6810 of the second clamping member 40. It will also be appreciated that the user can simply actuate the button 7300 to the unlocked position, move the first securing assembly 25 to the secured position and cease applying force to the button 7300 such that the button is urged by the biasing element 7700 to the locked position to retain the first securing assembly 25 in the secured position.

Due to the overlapping configuration of the engagement member 7330 with the apertures 6810 in the second clamping member, the apertures 6810, 7340 of the second clamping member 40 and the engagement member 7330 are partially out of alignment. In this position, the hook portions 7810 of the protruding locking members 7800 are retained and urged against an underside surface of the engagement member 7330, via the potential energy stored in the bias element 7700 of the button 7600 and the biasing mechanism 7400 of the first securing assembly 25, thereby retaining the first securing assembly 25 in the secure position.

As the apertures 6810 of the second clamping member 40 and the apertures 7340 of the engagement member 7330 require being at least partially aligned which is achieved by moving the second securing assembly 177 to the secured position, an ordered securing and unsecuring process is defined. In particular, in order to move the securing device 5 to the secured position, the second securing assembly 177 requires to be placed in the secured position prior to proceeding with securing the first securing assembly 25. Additionally, in order to move the device 5 to the unsecured position, the reverse process requires to be performed, wherein the first securing assembly 25 is unsecured and then subsequently the second securing assembly 177 can be unsecured.

As shown in FIG. 74, one or more of the side walls 7750 of the second securing assembly 177 can include one or more apertures 7760 to receive therein the protruding lug 6824 to secure the second securing assembly 177 in the retained position.

Figure 75:
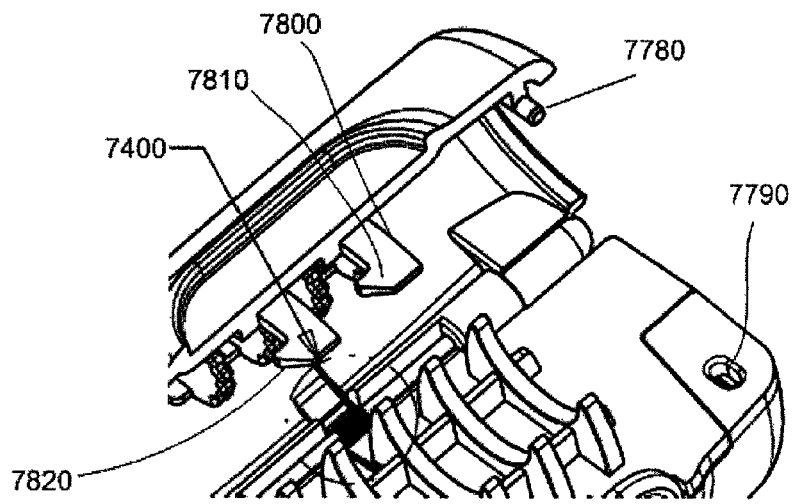
FIG. 75 is a perspective view showing a portion of the first securing assembly in the unsecured position.

As shown in FIGS. 74 and 75, the first clamping member 35 can include one or more alignment protrusions 7780 which align with a respective number of alignment apertures 7790, wherein when the securing device 5 is moved toward the secured position, each alignment protrusion 7780 protrudes within a respective alignment aperture 7790 in order to assist alignment of the first and second clamping members 35, 40 in the secured position.

Figure 78:
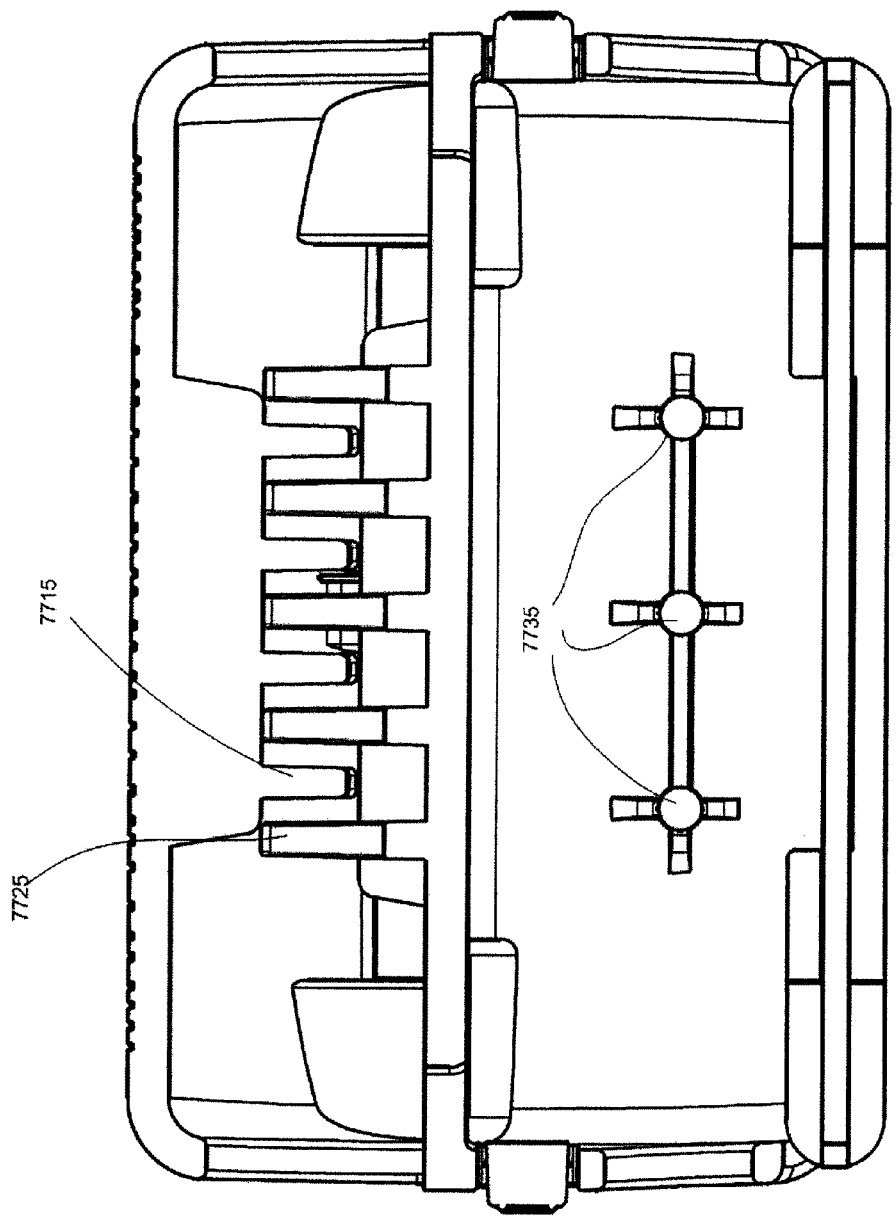
FIG. 78 is a cross-sectional view of the securing device along the longitudinal axis.

Referring to FIGS. 77 and 78, there are shown various cross-sectional views of the securing device 5. In particular, referring to FIG. 77, the first securing assembly 25 includes concave and convex profiled clamping members 7725, 7715. The concave and convex profiles 7725, 7715 are complementary to assist in gripping the restraint. As shown in FIG. 78, the concave and convex clamping members 7725, 7735 are staggered. Referring to FIG. 77, the convex member 7715 can include teeth 7716 to increase grip on the restraint.

Referring to FIGS. 77 and 78, the second securing assembly 177 includes a plurality of protruding pins 7735 which extend across a bore 7795 defined within the second securing assembly 177, wherein the protruding pins 7735 are configured for tethering the restraint portion. In particular, the protruding pins 7735 can extend from the first element 185 and through the restraint portion in order to tether the restraint portion relative to the securing device 5. Alternatively the restraint portion may be wrapped around the protruding pins 7735 to tether the restraint portion to the securing device 5. As shown in FIG. 74, one or more complementary ridge members 7745 extend from the second element 190 which define pin receiving channels 7755, wherein each pin receiving channel 7755 is configured to receive therein one of the protruding pins 7735. The pin receiving channels 7755 defined by the proximity between neighbouring ridge members 7745 provide a narrow, elongate channel orthogonal to the longitudinal axis of the securing device 5. Due to the first and second elements hingedly moving toward each other, the elongate channels 7755 advantageously promotes alignment between the first and second elements 180, 190 whilst the protruding pins 7735 are received within the channel 7755 when the second securing assembly 177 moves to the secured position. The width of each protruding pin 7735 substantially corresponds to the width of the respective pin receiving channel 7755 in order to provide a tight fitting cooperation therebetween.

As shown in FIG. 77, the securing device 5 can include two hinge pins 7610, 7690. A first hinge pin 7610 can be provided to allow the first and second clamping members 35, 40 to hingedly move relative to each other. A second hinge pin 7690 can be provided to allow the first and second elements 180, 190 to hingedly move relative to each other.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A securing device having an elongate body, including a first securing assembly connected to a second securing assembly for releasably securing first and second restraint portions, the first securing assembly includes a first clamping member hingedly connected to a second clamping member and hingedly movable between an unsecure position to a secure position to releasably secure the second restraint portion, the first securing assembly includes ribs extending orthogonal to the elongate body which clamp against the second restraint portion in the secure position, the second securing assembly includes a first element hingedly connected to a second element movable between an unsecure and secure position to releasably secure the first restraint portion, the first clamping member being connected to the first element, wherein at least some of the ribs include a plurality of teeth;
   wherein a finger receiving aperture is defined when the first and second elements of the second securing assembly move to the secure position, the finger receiving aperture being formed as a result of at least partial alignment of corresponding apertures in the first clamping member and the second element, wherein a locking finger extending from the second clamping member is receivable through the finger receiving aperture to engage and lock the first clamping member to the second clamping member when the first securing assembly is moved to the secure position.

2. The securing device according to claim 1, wherein the securing device includes a first actuator, wherein actuation of the first actuator disengages the locking finger from the finger receiving aperture to allow the first securing assembly to move from the secured position to the unsecured position.

3. The securing device according to claim 2, wherein the first actuator is operatively connected to an engagement member including one or more of the apertures forming the finger receiving aperture, wherein actuation of the first actuator allows the locking finger to be freely removed from the finger receiving aperture.

4. The securing device according to claim 3, wherein a width of the finger receiving aperture is adjusted upon actuation of the first actuator to thereby allow the locking finger to be freely removed from the finger receiving aperture.

5. The securing device according to claim 1, wherein the first clamping member and second clamping member form a jaw.

6. The securing device according to claim 5, wherein the jaw can include opposing clamping surfaces wherein at least one of the clamping surfaces is ridged.

7. The securing device according to claim 1, wherein the second securing assembly includes an engagement arrangement to retain the first element and the second element in the secured position, wherein the engagement arrangement includes a disengagement actuator which is actuable to allow the second securing assembly to move to the unsecured position.

8. The securing device according to claim 7, wherein the disengagement actuator is located at one or more ends along a longitudinal axis of the securing device which upon actuation, disengages the first element from the second element.

9. The securing device according to claim 8, wherein each disengagement actuator is operative via an applied force directed inwardly and along the longitudinal axis of the securing device.

10. The securing device according to claim 7, wherein each disengagement actuator includes a lug extending from the first element and the respective lug receiving aperture provided in a wall of the second element, wherein each lug is received by the respective lug receiving aperture to form the first clamping member, and upon actuation of each disengagement actuator, the lug disengages from the respective lug receiving aperture to thereby allow the first and second elements to move relative to each other.

11. The securing device according to claim 1, wherein at least one of the first element and the second element include one or more pins to engage the first portion of the restraint in the secured position.

12. The securing device according to claim 1, wherein the body includes a substantially elliptical cross-sectional profile.

13. The securing device according to claim 1, wherein a first portion of the plurality of ribs extend from a first surface of the first securing assembly, and a second portion of the plurality of ribs extend from a second surface of the first securing assembly which opposes the first surface.

14. The securing device according to claim 13, wherein the first portion of the plurality of ribs are staggered relative to the second portion of the plurality of ribs.

15. The securing device according to claim 13, wherein the teeth are provided upon at least one of the first portion of the plurality of ribs and the second portion of the plurality of ribs.

16. The securing device according to claim 13, wherein the first portion of the plurality of the ribs include a concave clamping surface and the second portion of the plurality of the ribs include a convex clamping surface.

17. The securing device according to claim 1, wherein the securing device includes a biasing mechanism to bias the first securing assembly from the secured position to the unsecured position.

18. A securing device having an elongate body, including a first securing assembly connected to a second securing assembly for releasably securing first and second restraint portions, the first securing assembly includes a first clamping member hingedly connected to a second clamping member and hingedly movable between an unsecure position to a secure position to releasably secure the second restraint portion, the first securing assembly includes ribs extending orthogonal to the elongate body which clamp against the second restraint portion in the secure position, the second securing assembly includes a first element hingedly connected to a second element movable between an unsecure and secure position to releasably secure the first restraint portion, the first clamping member being connected to the first element, wherein at least some of the ribs include a plurality of teeth, wherein the second securing assembly includes an engagement arrangement to retain the first element and the second element in the secured position, wherein the engagement arrangement includes a disengagement actuator which is actuable to allow the second securing assembly to move to the unsecured position, wherein the disengagement actuator is located at one or more ends along a longitudinal axis of the securing device which upon actuation, disengages the first element from the second element, and wherein each disengagement actuator is operative via an applied force directed inwardly and along the longitudinal axis of the securing device.

19. A securing device having an elongate body, including a first securing assembly connected to a second securing assembly for releasably securing first and second restraint portions, the first securing assembly includes a first clamping member hingedly connected to a second clamping member and hingedly movable between an unsecure position to a secure position to releasably secure the second restraint portion, the first securing assembly includes ribs extending orthogonal to the elongate body which clamp against the second restraint portion in the secure position, the second securing assembly includes a first element hingedly connected to a second element movable between an unsecure and secure position to releasably secure the first restraint portion, the first clamping member being connected to the first element, wherein at least some of the ribs include a plurality of teeth, wherein the second securing assembly includes an engagement arrangement to retain the first element and the second element in the secured position, wherein the engagement arrangement includes a disengagement actuator which is actuable to allow the second securing assembly to move to the unsecured position, wherein each disengagement actuator includes a lug extending from the first element and the respective lug receiving aperture provided in a wall of the second element, wherein each lug is received by the respective lug receiving aperture to form the first clamping member, and upon actuation of each disengagement actuator, the lug disengages from the respective lug receiving aperture to thereby allow the first and second elements to move relative to each other.

20. A securing device having an elongate body, including a first securing assembly connected to a second securing assembly for releasably securing first and second restraint portions, the first securing assembly includes a first clamping member hingedly connected to a second clamping member and hingedly movable between an unsecure position to a secure position to releasably secure the second restraint portion, the first securing assembly includes ribs extending orthogonal to the elongate body which clamp against the second restraint portion in the secure position, the second securing assembly includes a first element hingedly connected to a second element movable between an unsecure and secure position to releasably secure the first restraint portion, the first clamping member being connected to the first element, wherein at least some of the ribs include a plurality of teeth, wherein a first portion of the plurality of ribs extend from a first surface of the first securing assembly, and a second portion of the plurality of ribs extend from a second surface of the first securing assembly which opposes the first surface, and wherein the first portion of the plurality of the ribs include a concave clamping surface and the second portion of the plurality of the ribs include a convex clamping surface.

21. A securing device having an elongate body, including a first securing assembly connected to a second securing assembly for releasably securing first and second restraint portions, the first securing assembly includes a first clamping member hingedly connected to a second clamping member and hingedly movable between an unsecure position to a secure position to releasably secure the second restraint portion, the first securing assembly includes ribs extending orthogonal to the elongate body which clamp against the second restraint portion in the secure position, the second securing assembly includes a first element hingedly connected to a second element movable between an unsecure and secure position to releasably secure the first restraint portion, the first clamping member being connected to the first element, wherein at least some of the ribs include a plurality of teeth, and wherein the securing device includes a biasing mechanism to bias the first securing assembly from the secured position to the unsecured position.

\* \* \* \* \*